(12) United States Patent
Dilman et al.

(10) Patent No.: US 8,543,862 B2
(45) Date of Patent: *Sep. 24, 2013

(54) DATA CORRUPTION DIAGNOSTIC ENGINE

(75) Inventors: Mark Dilman, Sunnyvale, CA (US); Michael James Stewart, Belmont, CA (US); Wei-Ming Hu, Palo Alto, CA (US); Balasubrahmanyam Kuchibhotla, San Ramon, CA (US); Margaret Susairaj, Sunnyvale, CA (US); Hubert Ken Sun, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/304,563

(22) Filed: Nov. 25, 2011

(65) Prior Publication Data

US 2012/0072770 A1 Mar. 22, 2012

Related U.S. Application Data

(63) Continuation of application No. 12/253,873, filed on Oct. 17, 2008, now Pat. No. 8,074,103.

(60) Provisional application No. 60/981,469, filed on Oct. 19, 2007.

(51) Int. Cl.
 *G06F 11/07* (2006.01)
(52) U.S. Cl.
 USPC .............. 714/6.1; 714/6.13; 714/6.2; 714/42; 707/690

(58) Field of Classification Search
 USPC .................... 714/25; 707/687, 702
 See application file for complete search history.

(56) References Cited

U.S. PATENT DOCUMENTS

| | | | |
|---|---|---|---|
| 4,498,186 | A | 2/1985 | Hwang et al. |
| 4,985,857 | A | 1/1991 | Bajpai et al. |
| 5,210,860 | A | 5/1993 | Pfeffer et al. |
| 5,459,857 | A | 10/1995 | Ludlam et al. |
| 5,463,768 | A | 10/1995 | Cuddihy et al. |
| 5,568,491 | A | 10/1996 | Beal et al. |
| 5,819,292 | A | 10/1998 | Hitz et al. |
| 5,870,762 | A | 2/1999 | Lee |
| 6,049,612 | A | 4/2000 | Fielder et al. |
| 6,266,788 | B1 | 7/2001 | Othmer et al. |

(Continued)

FOREIGN PATENT DOCUMENTS

JP 2006155320 A 6/2006

OTHER PUBLICATIONS

Tiffany, M. "A Survey of Event Correlation Techniques and Related Topics", May 3, 2002, pp. 12.

(Continued)

*Primary Examiner* — Chae Ko
(74) *Attorney, Agent, or Firm* — Silicon Valley Patent Group LLP; Omkar Suryadevara

(57) ABSTRACT

A computer is programmed to execute a diagnostic procedure either on a pre-set schedule or asynchronously in response to an event, such as an error message, or a user command. When executed, the diagnostic procedure automatically checks for integrity of one or more portions of data in the computer, to identify any failure(s). In some embodiments, the failure(s) may be displayed to a human, after revalidation to exclude any failure that no longer exists.

23 Claims, 37 Drawing Sheets

(56) References Cited

U.S. PATENT DOCUMENTS

| | | |
|---|---|---|
| 6,609,182 B1 | 8/2003 | Pedrizetti et al. |
| 6,742,141 B1 | 5/2004 | Miller |
| 6,888,542 B1 | 5/2005 | Clauss |
| 6,931,576 B2 | 8/2005 | Morrison et al. |
| 6,934,904 B2 | 8/2005 | Talagala et al. |
| 7,366,740 B2 | 4/2008 | Sleeman et al. |
| 7,451,167 B2 | 11/2008 | Bali et al. |
| 7,516,438 B1 | 4/2009 | Leonard et al. |
| 7,529,974 B2 | 5/2009 | Thibaux et al. |
| 7,571,351 B2 | 8/2009 | Miyazaki et al. |
| 7,596,718 B2 | 9/2009 | Harvey, Jr. et al. |
| 7,673,291 B2 | 3/2010 | Dias et al. |
| 7,788,540 B2 | 8/2010 | Merriman et al. |
| 2002/0038429 A1* | 3/2002 | Smeets .................. 713/193 |
| 2002/0169995 A1 | 11/2002 | Archibald et al. |
| 2003/0079158 A1 | 4/2003 | Tower et al. |
| 2003/0131291 A1 | 7/2003 | Morrison et al. |
| 2003/0167439 A1 | 9/2003 | Talagala et al. |
| 2004/0073403 A1 | 4/2004 | Hart et al. |
| 2004/0153844 A1 | 8/2004 | Ghose et al. |
| 2004/0221120 A1 | 11/2004 | Abrashkevich et al. |
| 2004/0249610 A1 | 12/2004 | Ohsie et al. |
| 2005/0015667 A1 | 1/2005 | Aaron |
| 2005/0055673 A1 | 3/2005 | Dias et al. |
| 2005/0097400 A1 | 5/2005 | Wu et al. |
| 2005/0114297 A1 | 5/2005 | Edwards |
| 2005/0120267 A1 | 6/2005 | Burton et al. |
| 2005/0138223 A1 | 6/2005 | Clifton et al. |
| 2005/0187984 A1 | 8/2005 | Chen |
| 2005/0188279 A1 | 8/2005 | Gibble et al. |
| 2005/0262399 A1 | 11/2005 | Brown et al. |
| 2005/0278394 A1 | 12/2005 | Oks et al. |
| 2005/0283638 A1 | 12/2005 | Kato |
| 2006/0010275 A1 | 1/2006 | Moon et al. |
| 2006/0123269 A1 | 6/2006 | Forhan et al. |
| 2006/0129876 A1 | 6/2006 | Uemura |
| 2006/0156141 A1 | 7/2006 | Ouchi |
| 2006/0173870 A1 | 8/2006 | Erdmenger et al. |
| 2006/0282471 A1 | 12/2006 | Mark et al. |
| 2007/0067256 A1 | 3/2007 | Zayas et al. |
| 2007/0168726 A1 | 7/2007 | Amos |
| 2007/0168758 A1 | 7/2007 | Kolb et al. |
| 2007/0174682 A1 | 7/2007 | King |
| 2008/0034258 A1 | 2/2008 | Moriya et al. |
| 2008/0109495 A1 | 5/2008 | Herberger et al. |
| 2008/0109683 A1 | 5/2008 | Erwin et al. |
| 2008/0282105 A1 | 11/2008 | Deenadhayalan et al. |
| 2009/0019310 A1 | 1/2009 | Nastacio et al. |
| 2009/0055357 A1 | 2/2009 | Richardson et al. |

OTHER PUBLICATIONS

McKusick, M.K. et al. "Fsck—The Unix File System Check Program", 1994, pp. 23.

Notice of Allowance dated Sep. 17, 2010 in U.S. Appl. No. 12/253,861, 11 pages.
Amendment after Notice of Allowance (1 page) including Specification (3 pages), Claims (6 pages) and Applicant Arguments/Remarks made in an Amendment (2 pages) dated Dec. 17, 2010 in U.S. Appl. No. 12/253,861 (US Pub 2009-0106578 A1), pp. 12.
Response to Amendment dated Feb. 2, 2011 in U.S. Appl. No. 12/253,861 (US Pub 2009-0106578 A1), pp. 16.
Non-Final Rejection dated Mar. 16, 2011 in U.S. Appl. No. 12/253,897 (US Pub 2009-0106327 A1), pp. 32.
Amendment after Non-Final Rejection (1 page) including Specification (4 pages), Claims (5 pages) and Applicant Arguments/Remarks made in an Amendment (5 pages) dated Jun. 16, 2011 in U.S. Appl. No. 12/253,897, (US Pub 2009-0106578 A1), pp. 16.
Examiner's Interview Summary dated Jun. 16, 2011 in U.S. Appl. No. 12/253,897, (US Pub 2009-0106578 A1), pp. 4.
Final Rejection dated Sep. 7, 2011 in U.S. Appl. No. 12/253,897, (US Pub 2009-0106578 A1), pp. 35.
Non-Final Rejection dated Dec. 22, 2010 in U.S. Appl. No. 12/253,873 (US Pub 2009-0106603 A1), pp. 21.
Amendment after Non-Final Rejection (1page) including Specification (1 page), Claims (9 pages) and Applicant Arguments/Remarks made in an Amendment (4 pages) dated May 23, 2011 in U.S. Appl. No. 12/253,873 (US Pub 2009-0106603 A1), pp. 16.
Notice of Allowance dated Jul. 11, 2011 in U.S. Appl. No. 12/253,873 (US Pub 2009-0106603 A1), pp. 14.
Amendment after Notice of Allowance (1 page) including Specification (2 pages), Claims (9 pages) and Applicant Arguments/Remarks made in an Amendment (2 pages) dated Oct. 9, 2011 in U.S. Appl. No. 12/253,873 (US Pub 2009-0106603 A1), pp. 14.
Response to Amendment dated Nov. 9, 2011 in U.S. Appl. No. 12/253,873 (US Pub 2009-0106603 A1), pp. 5.
Amendment filed with RCE (1 page) including Claims (6 pages) and Applicant Arguments/Remarks made in an Amendment (5 pages) dated Jan. 9, 2012 in U.S. Appl. No. 12/253,897, (US Pub 2009-0106578 A1), pp. 12.
Office Action dated Apr. 4, 2012 in U.S. Appl. No. 12/253,897, (US Pub 2009-0106578 A1), pp. 31.
Examiner's Interview Summary dated Jan. 9, 2012 in U.S. Appl. No. 12/253,897, (US Pub 2009-0106578 A1), pp. 2.
Amendment dated Aug. 6, 2012 in U.S. Appl. No. 12/253,897, (US Pub 2009-0106578 A1), pp. 11.
Final Office Action dated Sep. 17, 2012 in U.S. Appl. No. 12/253,897, (US Pub 2009-0106578 A1).
Amendment dated Jan. 17, 2013 in U.S. Appl. No. 12/253,897, (US Pub 2009-0106578 A1).
U.S. Appl. No. 12/253,897, filed Oct. 17, 2008 by Mark Dilman et al.
U.S. Appl. No. 12/253,873, filed Oct. 17, 2008 by Mark Dilman et al.
U.S. Appl. No. 12/253,861, filed Oct. 17, 2008 by Mark Dilman et al.

* cited by examiner

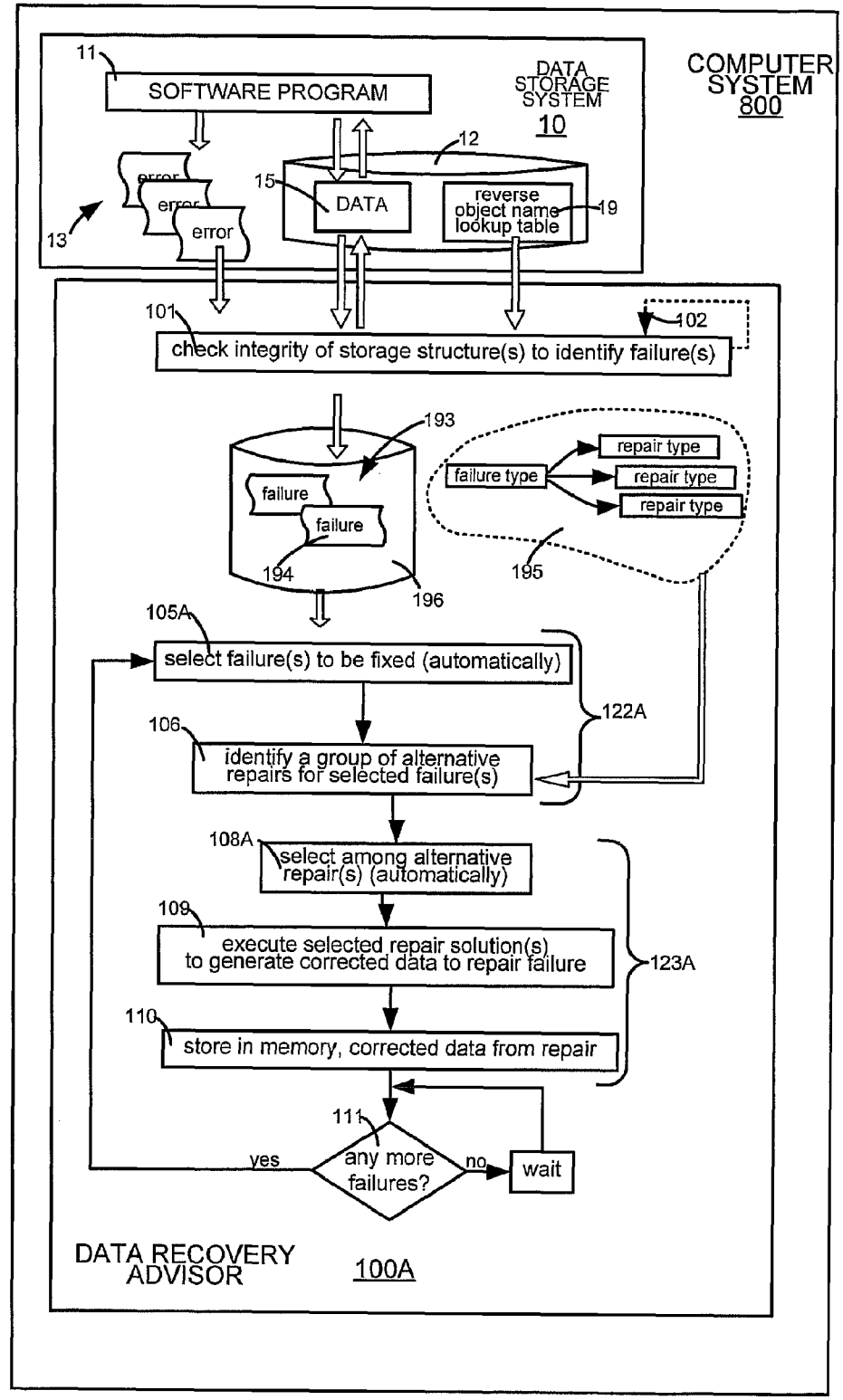

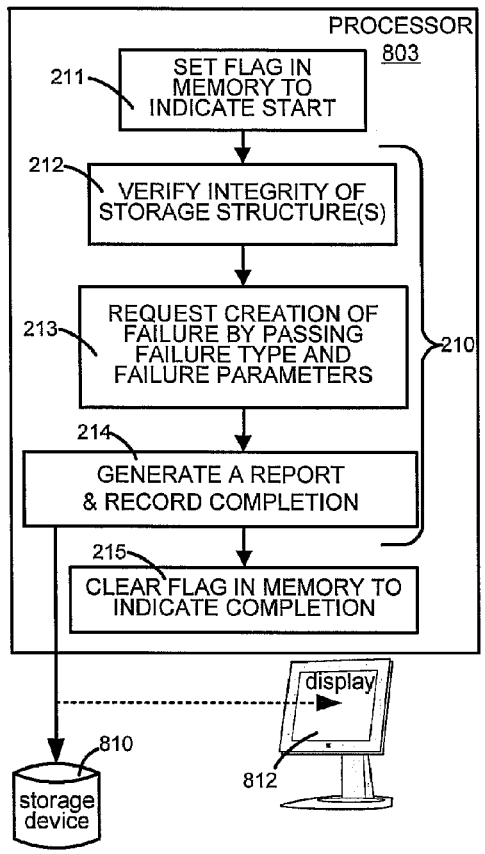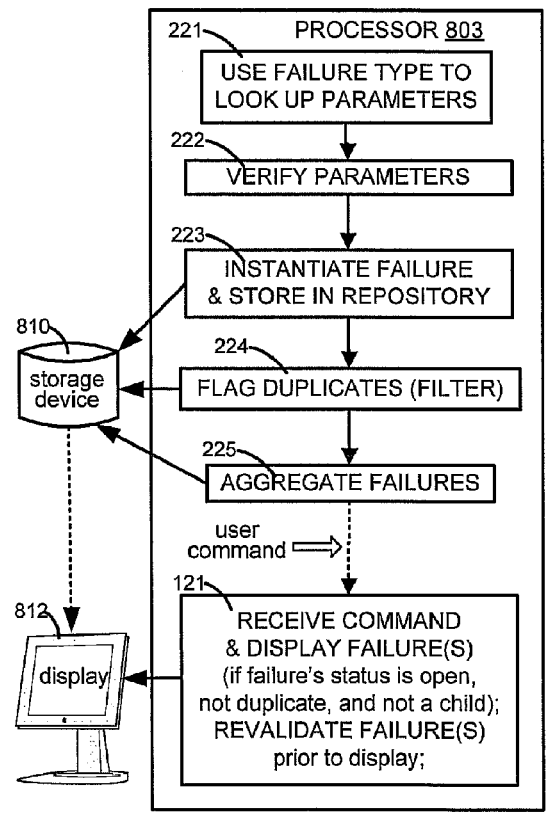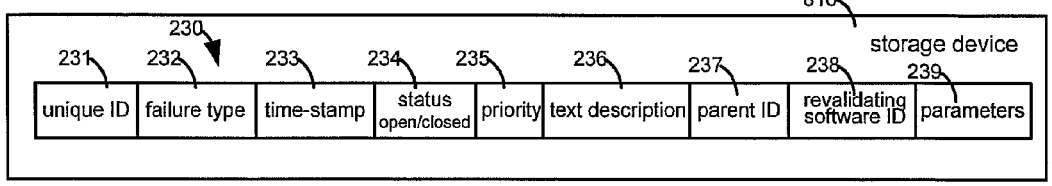

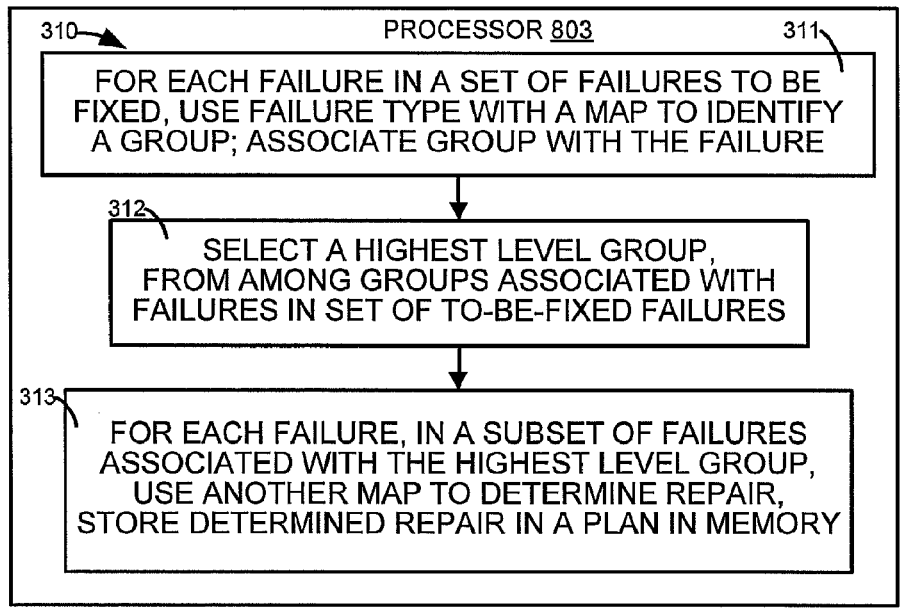
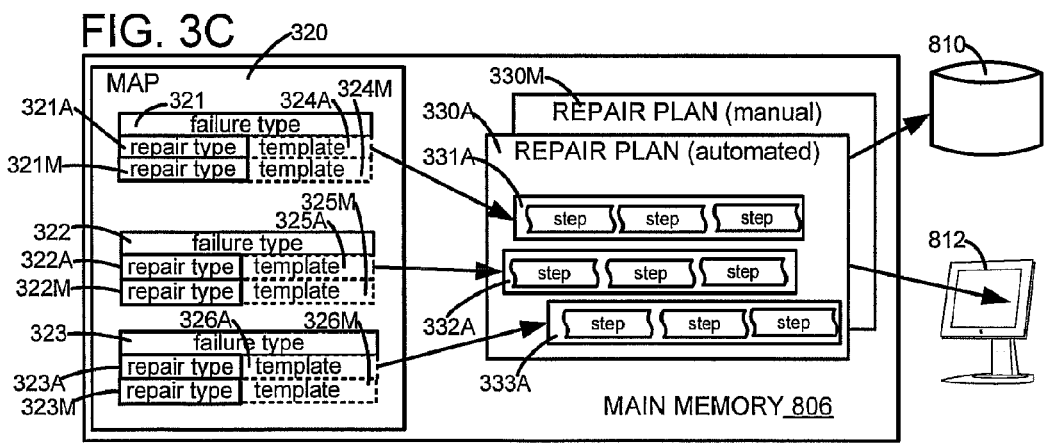

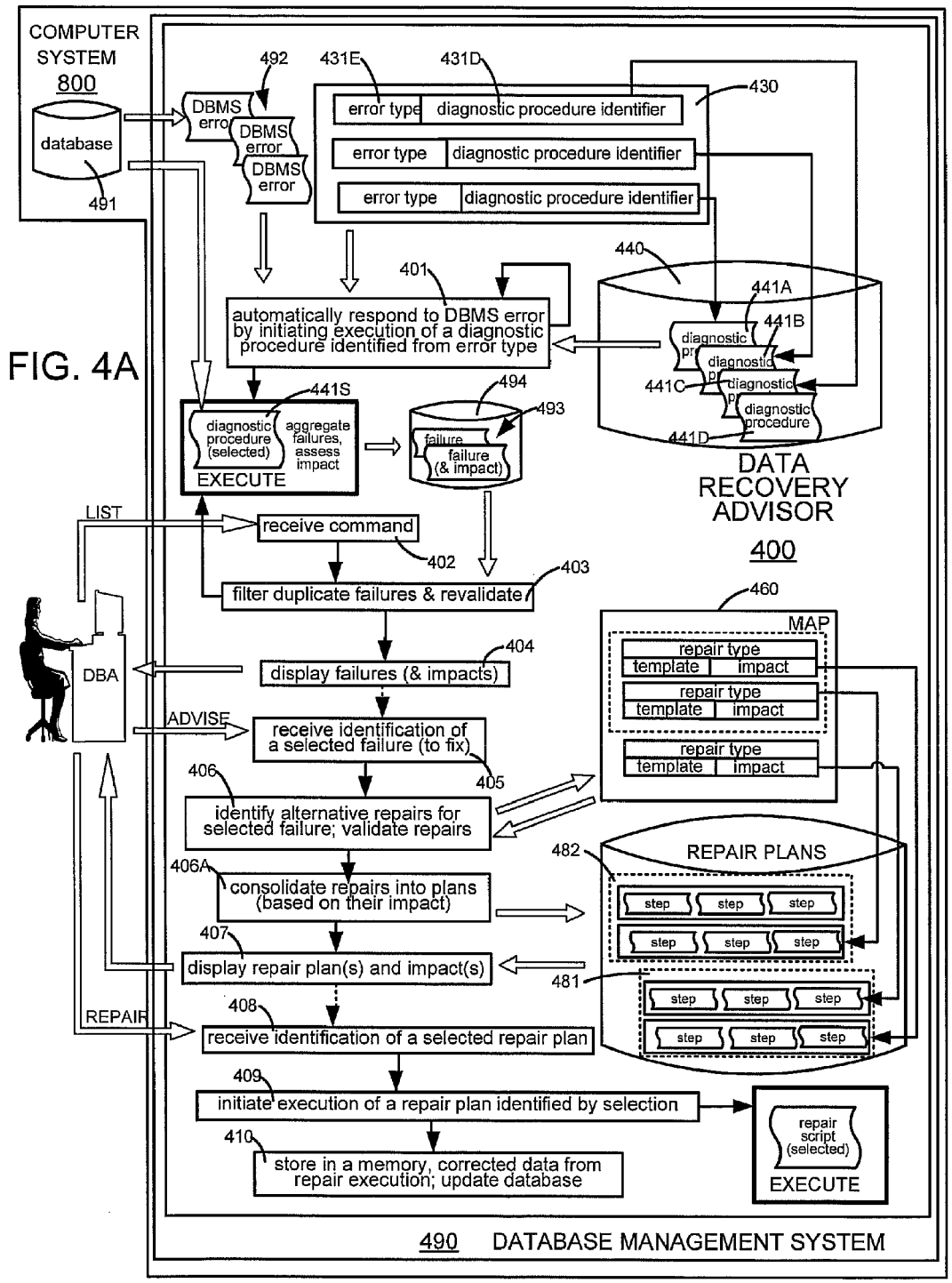

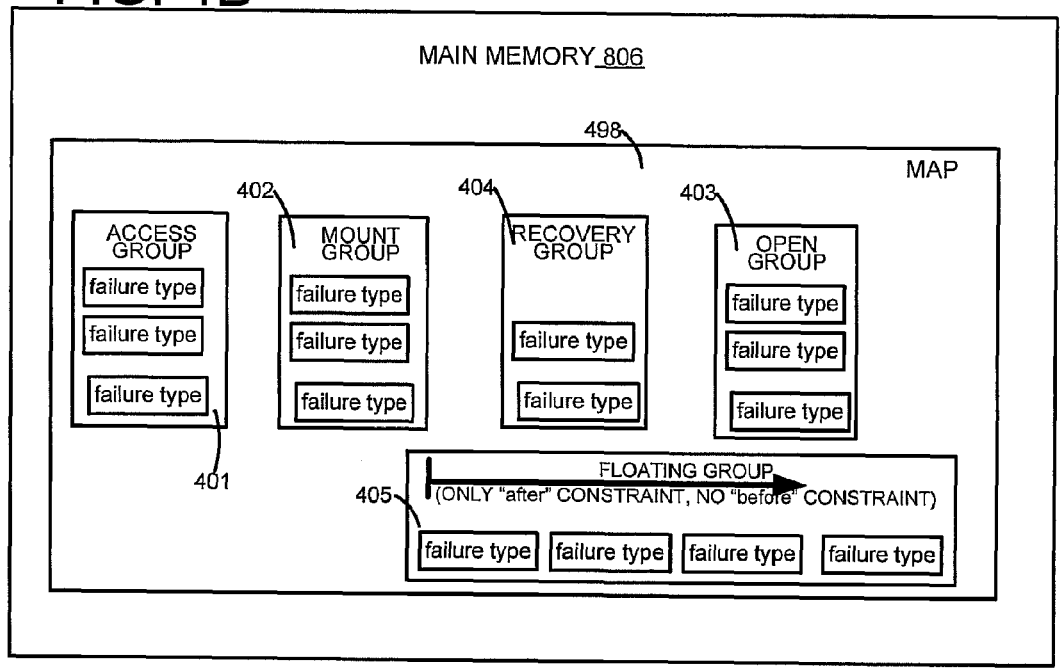
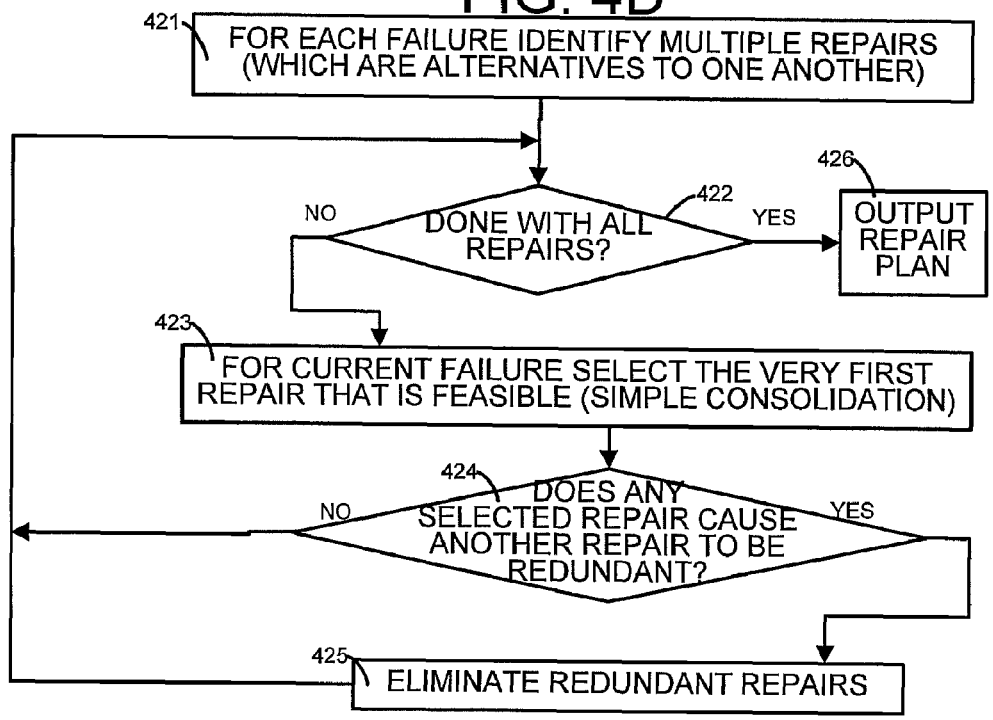

ORACLE Enterprise Manager 11g  Help
Database Control  Database

Database Instance: orcl >

⊗ View and Manage Failures

Last Refresh May 28, 2007 2:47:32 AM EDT

Select dropdown values and optionally enter failure description and impact strings to filter the data that is displayed in your results set.

| Failure Description | Impact | Priority | Status | Time Detected | |
|---|---|---|---|---|---|
| | | CRITICAL or HIGH ▽ | OPEN ▽ | All ▽ | Go |

Select failures and ....  (Advise) (Close) (Set Priority High) (Set Priority Low)

Select All | Select None | Expand All | Collapse All

| ☐ | Select Failure Description | Impact | Priority | Status | Time Detected |
|---|---|---|---|---|---|
| ☑ | ▽ Data Failures | | | | |
| ☑ | ▽ One or more non-system datafiles are missing | See impact for individual child failures | HIGH | OPEN | 2007-05-28 02:39:33:0 |
| ☑ | Datafile 5: "/u01/app/oracle/oradata/orcl/example01.dbf" is missing | Some objects in tablespace EXAMPLE might be unavailable | HIGH | OPEN | 2007-05-28 02:39:33:0 |
| ☑ | Datafile 4: "/u01/app/oracle/oradata/orcl/users01.dbf" is missing | Some objects in tablespace USERS might be unavailable | HIGH | OPEN | 2007-05-28 02:39:33:0 |

FIG. 5J

ORACLE Enterprise Manager 11g [        ]                                                     Help
Database Control                                                                          /Database Database Instance: orcl >

View and Manage Failures

Last Refresh  May 28, 2007 2:55:19 AM EDT

Select dropdown values and optionally enter failure description and impact strings to filter the data that is displayed in your results set.

Failure Description  Impact         Priority              Status        Time Detected
[            ]      [       ]      CRITICAL or HIGH ▽   OPEN ▽        All ▽              (Go)

Select Failures and ....  (Advise) (Close) (Set Priority High) (Set Priority Low)
| Select All | Select None | Expand All | Collapse All |

| Select | Failure Description | Impact | Priority | Status | Time Detected |
|---|---|---|---|---|---|
| ☐ | ▶ Data Failures | | | | |
| ☑ | One or more non-system datafiles are missing | See impact for individual child failures | HIGH | OPEN | 2007-05-28 02:39:33:0 |

⊙ TIP ALL CRITICAL failures must be selected before "Advice". All CRITICAL failures must be unselected before "Set Priority High" or "Set Priority Low"

☐ Use a Recovery Catalog    Recovery Catalog Database  not specified
                              (Edit Recovery Catalog Information)

FIG. 5K

ORACLE Enterprise Manager 11g      Help
Database Control     /Database

Database Instance: orcl >

View and Manage Failures

Last Refresh May 28, 2007 2:56:19 AM EDT

Select dropdown values and optionally enter failure description and impact strings to filter the data that is displayed in your results set.

Failure Description    Impact    Priority    Status    Time Detected

[ ]    [ ]    CRITICAL or HIGH ▷    OPEN ▷    All ▷    (Go)

Select failures and .... (Advise) (Close) (Set Priority High) (Set Priority Low)

| Select All | Select None | Expand All | Collapse All |

| Select | Failure Description | Impact | Priority | Status | Time Detected |
|---|---|---|---|---|---|
| ☐ | ▽ Data Failures | | | | |
| ☑ | ▽ One or more non-system datafiles are missing | See impact for individual child failures | HIGH | OPEN | 2007-05-28 02:39:33:0 |
| ☑ | Datafile 4: "/u01/app/oracle/oradata/orcl/users01.dbf1" is missing | Some objects in tablespace USERS might be unavailable | HIGH | OPEN | 2007-05-28 02:39:33:0 |

💡 TIP ALL CRITICAL failures must be selected before "Advise". All CRITICAL failures must be unselected before "Set Priority High" or "Set Priority Low"

ORACLE Enterprise Manager 11g  Help
Database Control  Database
Database Instance: orcl >

Review ( Cancel ) ( Submit Recovery job )

The Data Recovery Advisor generated recovery advice of : NO DATA LOSS
☑ Open Database after Recovery
The database is currently not open. Open the database after a successful recovery operation.

Failures That Will Be Resolved

| Expand All | Collapse All |

| Failure Description | Impact | Priority |
|---|---|---|
| ▶ Failures That Will Be Resolved | See impact for individual child failures | HIGH |
| ▶ One or more non-system datafiles are missing | | |
| Datafile 4: "/u01/app/oracle/oradata/orcl/users01.dbf" is missing | Some objects in tablespace USERS might be unavailable | HIGH |

RMAN Script restore and recover datafile
restore datafile 4;
recover datafile 4;

FIG. 5N

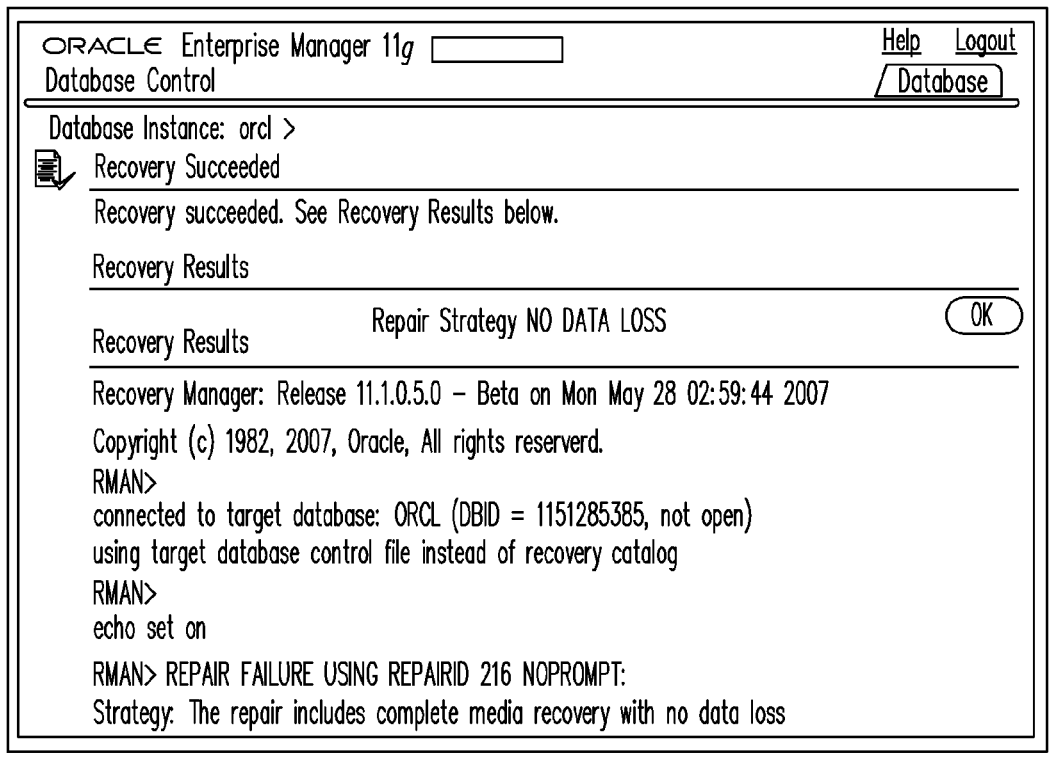

FIG. 5O

```
archived log file name=/u01/app/oracle/flash_recovery_area/ORCL/archivelog/2007_05_28
STAMP=623732389
archived log file name=/u01/app/oracle/flash_recovery_area/ORCL/archivelog/2007_05_28
sequence=22
channel default: deleting archived log(s)
archived log file name=/u01/app/oracle/flash_recovery_area/ORCL/archivelog/2007_05_28
STAMP=623732389
archived log file name=/u01/app/oracle/flash_recovery_area/ORCL/archivelog/2007_05_28
sequence=23
media recovery complete, elapsed time: 00:00:01
Finished recover at 28-MAY-07
repair failure complete
database opened RMAN> exit;
Recovery Manager complete.
```

FIG. 5P

ORACLE Enterprise Manager 11g                                    Setup Reference Help Logout
Database Control                                                              /Database
Database Instance: orcl >
Review
                                                           Cancel    Submit Recovery Job
The Data Recovery Advisor generated recovery advice of: NO DATA LOSS Failures That Will Be Resolved Expand All | Collapse All

| Failure Description | Impact | Priority |
|---|---|---|
| ▼ Failures That Will Be Resolved | | |
| ▼ Datafile 5: "/u01/app/oracle/oradata/orcl/example01.dbf" contains one or more corrupt blocks | Some objects in tablespace EXAMPLE might be unavailable | HIGH |
| Block 36 in datafile 5: "/u01/app/oracle/oradata/orcl/example01.dbf" is media corrupt | Object LOCATIONS owned by HR might be unavailable | HIGH |
| Block 64 in datafile 5: "/u01/app/oracle/oradata/orcl/example01.dbf" is media corrupt | Object EMPLOYEES owned by HR might be unavailable | HIGH |
| Block 12 in datafile 5: "/u01/app/oracle/oradata/orcl/example01.dbf" is media corrupt | Object REGIONS owned by HR might be unavailable | HIGH |

RMAN Script block media recovery for multiple blocks
recover datafile 5 block 12, 36, 64:

FIG. 6E

ORACLE Enterprise Manager 11g

Setup Reference Help Logout

Database Control / Database

Job Run: RECOVERY_ORCL_000001

Page Refreshed May 28, 2007 3:17:17 AM EDT    (Delete Run)  (Edit)  (View Definition)

Summary

Status         Succeeded
Scheduled      May 28, 2007 3:15:43 AM (UTC-04:00)
Started        May 28, 2007 3:15:43 AM (UTC-03:00)
Ended          May 28, 2007 3:16:16 AM (UTC-03:00)
Elapsed Time   32 seconds
Notification   No Type                      Database Recovery
Owner                     SYS
Description               Recovery Job:
Host Username             .....
Database Connect String
Database Username         .....
Database Role
Oracle Home
Oracle SID                orcl
Recovery Script
Run Status                UNKNOWN
Database Name             ORCL Targets
Status  [ All ▽ ]
(Go)

[Expand All] [Collapse All]

| Name | Targets | Status | Started | Ended | Elapsed Time (seconds) |
|---|---|---|---|---|---|
| ▼ Execution orcl | orcl | Succeeded | May 28, 2007 3:15:43 AM (UTC 0400) | May 28, 2007 3:16:15 AM (UTC 0400) | 32 |
|  | orcl | Succeeded | May 28, 2007 3:15:53 AM (UTC 0400) | May 28, 2007 3:15:53 AM (UTC 0400) | 0 |
|  | orcl | Succeeded | May 28, 2007 3:15:59 AM (UTC 0400) | May 28, 2007 3:16:16 AM (UTC 0400) | 15 |

FIG. 6G

```
SQL> select  * from hr.regions;
REGION_ID   REGION_NAME
---------   -----------------------
    1       Europe
    2       Americas
    3       Asia
    4       Middle East and Africa
```

FIG. 6H

```
[oracle@stctestbox05 ~]$ cd $ORACLE_BASE/oradata/orcl
[oracle@stctestbox05  orcl]$ ls
control01.ctl    example01.dbf.old    redo03.log      temp01.dbf
control02.ctl    redo01.log           sysaux01.dbf    undotbs01.dbf
control03.ctl    redo02.log           system01.dbf
[oracle@stctestbox05 orcl]$| mv   example01.dbf.old   example01.dbf
[oracle@stctestbox05  orcl]$ ls
control01.ctl    example01.dbf.       redo03.log      temp01.dbf
control02.ctl    redo01.log           sysaux01.dbf    undotbs01.dbf
control03.ctl    redo02.log           system01.dbf
[oracle@stctestbox05 orcl]$| exit
```

FIG. 7C

```
RMAN> REPAIR  FAILURE  PREVIEW;

Strategy: The repair includes complete media recovery with no data loss
Repair script: /u01/app/oracle/diag/rdbms/orcl/orcl/hm/reco_1127593350.hm contents of repair script:
    # restore and recover datafile
    restore datafile 4;
    recover datafile 4;

RMAN> ▮
```

FIG. 7E

```
RMAN> LIST FAILURE;

List of Database Failures
=========================
Failure ID    Priority    Status    Time Detected    Summary
----------    --------    ------    -------------    -------
122           HIGH        OPEN      28-MAY-07        One or more non-system datafiles are
missing

RMAN> LIST FAILURE DETAIL;

List of Database Failures
=========================
Failure ID    Priority    Status    Time Detected    Summary
----------    --------    ------    -------------    -------
122           HIGH        OPEN      28-MAY-07        One or more non-system datafiles are
missing
List of child failures for parent failure ID 122

Failure ID    Priority    Status    Time Detected    Summary
----------    --------    ------    -------------    -------
313           HIGH        OPEN      28-MAY-07        Datafile 5: "/u01/app/oracle/oradata
/orcl/example01.dbf" is missing
Impact: Some objects in tablespace EXAMPLE might be unavailable 307           HIGH        OPEN      28-MAY-07        Datafile 4: "/u01/app/oracle/oradata
/orcl/users01.dbf" is missing
Impact: Some objects in tablespace USERS might be unavailable

RMAN>
```

FIG. 7A

```
----------  ------  ------  -------------  ----------
122         HIGH    OPEN    28-MAY-07      One or more non-system datafiles are
missing
List of child failures for parent failure ID 122

Failure ID  Priority  Status  Time Detected  Summary
----------  --------  ------  -------------  ----------
313         HIGH      OPEN    28-MAY-07      Datafile  5: "/u01/app/oracle/oradata
/orcl/users01.dbf" is missing
Impact: Some objects in tablespace EXAMPLE might be unavailable
307         HIGH      OPEN    28-MAY-07      Datafile  4: "/u01/app/oracle/oradata
/orcl/users01.dbf" is missing
Impact: Some objects in tablespace USERS might be unavailable analyzing automatic repair options;  this may take some time
allocated channel: ORA_DISK_1
channel1 ORA_DISK_1:  SID=153 device type=DISK
analyzing automatic repair options complete Mandatory Manual Actions
========================
no manual actions available Optional Manual Actions
=======================
1. If file /u01/app/oracle/oradata/orcl/users01.dbf was unintentionally renamed
or moved, restore it
2. If file /u01/app/oracle/oradata/orcl/example01.dbf was unintentionally renamed
or moved, restore it Automated Repair Options
========================
Option Repair Description
------ ------------------
1.     Restore and recover datafile 4; Restore and recover datafile 5
Strategy: The repair includes complete media recovery with no data loss
Repair script:   /u01/app/oracle/diag/rdbms/orcl/orcl/hm/reco_3349465745.hm

RMAN>
```

FIG. 7B

```
List of Database Failures
=========================

Failure  ID   Priority   Status   Time Detected   Summary
-----------  --------   ------   -------------   --------
122          HIGH       OPEN     28-MAY-07       One or more non-system datafiles are
missing
List of child failures for parent failure ID 122

Failure  ID   Priority   Status   Time Detected   Summary
-----------  --------   ------   -------------   --------
307          HIGH       OPEN     28-MAY-07       Datafile  4: "/u01/app/oracle/oradata
/orcl/users01.dbf' is missing
Impact: Some objects in tablespace USERS might be unavailable analyzing automatic repair options;  this may take some time
allocated channel: ORA_DISK_1
channel ORA_DISK_1:  SID=170 device type=DISK
analyzing automatic repair options complete Mandatory Manual Actions
========================
no manual actions available Optional Manual Actions
=======================
1. If file /u01/app/oracle/oradata/orcl/users01.dbf was unintentionally renamed
or moved, restore it Automated Repair Options
========================
Option Repair Description
------ ---------------
1.     Restore and recover datafile 4
Strategy: The repair includes complete media recovery with no data loss
Repair script:   /u01/app/oracle/diag/rdbms/orcl/orcl/hm/reco_1127593350.hm

RMAN>
```

FIG. 7D

```
RMAN> REPAIR FAILURE;

Strategy: The repair includes complete media recovery with no data loss
Repair script:   /u01/app/oracle/diag/rdbms/orcl/orcl/hm/reco_1127593350.hm contents of repair script:
restore and recover datafile
restore datafile 4;
recover datafile 4;

Do you really want to execute the above repair (enter YES or NO)? YES
executing repair script Starting restore at 28-MAY-07
using channel ORA_DISK_1 channel ORA_DISK_1: starting datafile backup set restore
channel ORA_DISK_1: specifying datafile(s) to restore from backup set
channel ORA_DISK_1: restoring datafile 00004 to /u01/app/oracle/oradata/orcl/use
rs01.dbf
channel ORA_DISK_1: reading from backup piece /u01/app/oracle/flash_recovery_area
/ORCL/backupset/2007_05_28/o1_mf_nnndf_TAG20070528T022109_35nx7gfr_.bkp
channel ORA_DISK_1: piece handle=/u01/app/oracle/flash_recovery_area/ORCL/backup
set/2007_05_28/o1_mf_nnndf_TAG20070528T022109_35nx7gfr_.bkp tag=TAG20070528T0221
09
channel ORA_DISK_1: restored backup piece 1
channel ORA_DISK_1: restore complete, elapsed time: 00:00:01
Finished restore at 28-MAY-07

Starting recover at 28_MAY_07
using channel ORA_DISK_1 starting media recovery archived log for thread 1 with sequence 23 is already on disk as file /u01/app/oracle
/flash_recovery_area/ORCL/archivelog/2007_05_28/o1_mf_1_23_35nxqx92_.arc
archived log for thread 1 with sequence 24 is already on disk as file /u01/app/oracle
/flash_recovery_area/ORCL/archivelog/2007_05_28/o1_mf_24_35nxqxff_.arc
```

FIG. 7F

```
archived log thread=1 sequence=22
channel ORA_DISK_1: reading from backup piece  /u01/app/oracle/flash_recovery_area
/ORCL/backupset/2007_05_28/o1_mf_annnn_TAG20070528T022940_35nxpxvp_.bkp
channel ORA_DISK_1: piece handle=/u01/app/oracle/flash_recovery_area/ORCL/backup
set/2007_05_28/o1_mf_annnn_TAG20070528T022940_35nxpxvp_.bkp tag=Tag20070528T0229
40
channel ORA_DISK_1: restored backup piece 1
channel ORA_DISK_1: restore complete, elapsed time: 00:00:01
archived log file name=/uo1/app/oracle/flash_recovery_area/ORCL/archivelog/2007_
05_28/o1_mf_1_19_35o1frg6_.arc thread=1 sequence=19
channel default: deleting archived log(s)
archived log file name=/uo1/app/oracle/flash_recovery_area/ORCL/archivelog/2007_
05_28/o1_mf_1_19_35o1frg6_.arc RECID=22 STAMP=623734392
archived log file name=/uo1/app/oracle/flash_recovery_area/ORCL/archivelog/2007_
05_28/o1_mf_1_20_35o1frhf_.arc thread=1 sequence=20
channel default: deleting archived log(s)
archived log file name=/u01/app/oracle/flash_recovery_area/ORCL/archivelog/2007_
05_28/o1_mf_1_20_35o1frhf_.arc RECID=20 STAMP=623734392
archived log file name=/u01/app/oracle/flash_recovery_area/ORCL/archivelog/2007_
05_28/o1_mf_1_21_35o1frh0_.arc thread=1 sequence=21
channel default: deleting archived log(s)
archived log file name=/u01/app/oracle/flash_recovery_area/ORCL/archivelog/2007_
05_28/o1_mf_1_21_35o1frh0_.arc RECID=19 STAMP=623734392
archived log file name=/u01/app/oracle/flash_recovery_area/ORCL/archivelog/2007_
05_28/o1_mf_1_22_35o1frjy_.arc thread=1 sequence=22
channel default: deleting archived log(s)
archived log file name=/u01/app/oracle/flash_recovery_area/ORCL/archivelog/2007_
05_28/o1_mf_1_22_35o1frjy_.arc RECID=21 STAMP=623734392
archived log file name=/u01/app/oracle/flash_recovery_area/ORCL/archivelog/2007_
05_28/o1_mf_1_23_35nxqx92_.arc thread=1 sequence=23
media recovery complete, elapsed time: 00:00:01
Finished recover at 28_MAY-07
repair failure complete Do you want to open the database (enter YES or NO)? Yes
database opened

RMAN>
```

FIG. 7G

DATA CORRUPTION DIAGNOSTIC ENGINE

CROSS-REFERENCE TO PARENT APPLICATION

This application is a continuation application of U.S. patent application Ser. No. 12/253,873 entitled "DATA CORRUPTION DIAGNOSTIC ENGINE" filed on Oct. 17, 2008 by Mark Dilman et al, which in turn claims priority under 35 USC §119 (e) from U.S. Provisional Patent Application 60/981,469 filed on Oct. 19, 2007 having the title "Recognizing And Repairing Data Failures", filed by Mark Dilman et al., both of which are incorporated by reference herein in their entirety.

CROSS-REFERENCE TO RELATED APPLICATIONS

This application is related to and incorporates by reference herein in their entirety, each of the following two commonly owned applications, both having Mark Dilman as the first named inventor:
 a. U.S. patent application Ser. No. 12/253,861 having the title "Repair Planning Engine For Data Corruptions", now issued as U.S. Pat. No. 7,904,756; and
 b. U.S. patent application Ser. No. 12/253,897 having the title "Data Recovery Advisor".

BACKGROUND

It is well known in the art for computers to encounter faulty hardware and/or software during storage and retrieval of data. For example, an error may arise when the computer unexpectedly encounters a breakdown in hardware, e.g. in magnetic media (such as a hard disk) where the data is stored. In addition to faulty hardware, errors can also arise due to bugs in software, e.g. an application program may overwrite data of another application program or an application program may improperly use an interface (API) of the underlying operating system to cause wrong data to be stored and/or retrieved. These faults are called data corruptions. Therefore, a fault can arise during normal operation in any component of a system. Examples of components are network interface circuitry, disks, operating system, application programs, cache, device driver, storage controller, etc.

Some application programs, such as database management systems (DBMS), may generate errors when data corruptions are detected, e.g. if a previously-stored checksum does not match a newly-calculated checksum. A single fault (also called "root" cause) can result in multiple failures with different symptoms; moreover, a single symptom can correspond to multiple failures. Knowing a symptom or a root cause of a failure is sometimes not enough for a human to formulate one or more recommendations to repair the failed hardware, software or data.

Manually reviewing such errors (by a system administrator) and identifying one or more faults which caused them to be generated can become a complex and time-consuming task, depending on the type and number of errors and faults. Specifically, the task is complicated by the fact that some errors are not generated immediately when a fault occurs, e.g. a fault may cause corrupted data to be stored to disk and even backed up, with errors due to the fault being generated a long time later, when the data is read back from disk. Furthermore, errors due to a single fault do not necessarily appear successively, one after another. Sometimes errors due to multiple faults that occur concurrently are interspersed among one another, which increases the task's complexity. Also, information about some faults is interspersed among different types of information, such as error messages, alarms, trace files and dumps, failed health checks etc. Evaluating such information and correlating them is a difficult task that is commonly done manually in prior art, which is error prone and time consuming. Error correlation can be done automatically instead of manually. Systems for automatic error correlation are commonly referred to as "event correlation systems" (see an article entitled "A Survey of Event Correlation Techniques and Related Topics" by Michael Tiffany, published on 3 May 2002). However, such systems require a user to manually specify correlation rules that capture relationships between errors. Such rules applied to data storage systems that generate many types of errors under many different failure scenarios can be very complex. They are also often based on a temporal ordering of errors that might not be correctly reported by a data storage system. This makes such systems prone to generating wrong results, false positives and false negatives. Moreover, any new error type added to the system or any new failure scenario require reconsideration of the correlation rules that makes them difficult to maintain and, therefore, even less reliable. Finally, an error correlation system is intended to find a "root cause" fault that could be different from the data failure because it does not indicate which data is corrupted and to which extent.

Moreover, even after a fault has been identified correctly by a system administrator, repairing and/or recovering data manually requires a high degree of training and experience in using various complex tools that are specific to the application program. For example, a tool called "recovery manager" (RMAN) can be used by a database administrator to perform backup and recovery operations for the database management system Oracle 10g. Even though such tools are available, human users do not have sufficient experience in using the tools because data faults do not occur often. Moreover, user manuals and training materials for such tools usually focus on one-at-a-time repair of each specific problem, although the user is typically faced with a number of such problems. Also, there is often a high penalty paid by the user for making poor decisions as to which problem to address first and which tool to use, in terms of increased downtime of the application program's availability, and data loss. To sum up, fault identification and repair of data in the prior art can be one of the most daunting, stressful and error-prone tasks when performed manually.

SUMMARY

A computer is programmed in accordance with the invention to use a software tool (called "data corruption diagnostic engine" or simply "diagnostic engine") to automatically check integrity of data in storage accessed by use of one or more structures (called "storage structures") in a data storage system, to identify failures if any, in accessing the data (also called "data failures"). Depending on the embodiment, the just-described integrity checking can be triggered by one or more errors that are routinely flagged by the data storage system, or invoked automatically on a pre-set schedule, or in response to a manual command. Any data failures that are found during the just-described integrity checking are stored in computer memory, which may be non-volatile or volatile, depending on the embodiment. In some embodiments any data failures, which are identified by integrity checking, are displayed to a human.

BRIEF DESCRIPTION OF THE DRAWINGS

FIGS. 1B and 1C illustrate, in high level flow charts, acts performed by two alternative embodiments of the data recovery advisor of this invention.

FIGS. 2A and 2C illustrate, in flow charts, acts performed by a diagnostic module to implement act 101 of FIGS. 1A-1C, in accordance with the invention.

FIG. 2D illustrates how a failure record is created, stored and retrieved.

FIG. 2E illustrates a record for a failure stored in a repository 196 within a storage device 810, by act 101 of FIGS. 1A-1C, in accordance with the invention.

FIG. 3B illustrates, in a high level flow chart, a method 310 that is performed in some embodiments to create a repair plan using the mapping of FIG. 3A.

FIG. 3C illustrates a mapping of repair type to templates for use by the method of FIG. 3B to generate repairs, and a repair plan that is created in some embodiments of the invention.

FIG. 4A illustrates, in another flow chart, acts performed by a data recovery advisor (DRA) in a database embodiment of the invention.

FIG. 4B illustrates a mapping of failure types to six groups, five of which have a predetermined order relative to one another, which are used by the method of FIG. 4A.

FIG. 4D illustrates, in a flow chart, an implementation of consolidation act 406A of FIG. 4A in some embodiments of the invention.

FIGS. 6A-6H illustrate additional screens of the type shown in FIGS. 5A-5P used by the data recovery advisor of FIG. 4A to identify and correct additional failures in the illustrative embodiment of the invention.

FIGS. 7A-7G illustrate use of a command line interface by a database administrator to interface with the data recovery advisor of FIG. 4A to identify and correct the failures described in reference to FIGS. 5A-5P. Note that in FIG. 7B, the display shown is generated by a human user typing an ADVICE command at the command line prompt (not shown).

DETAILED DESCRIPTION

Figure 8:
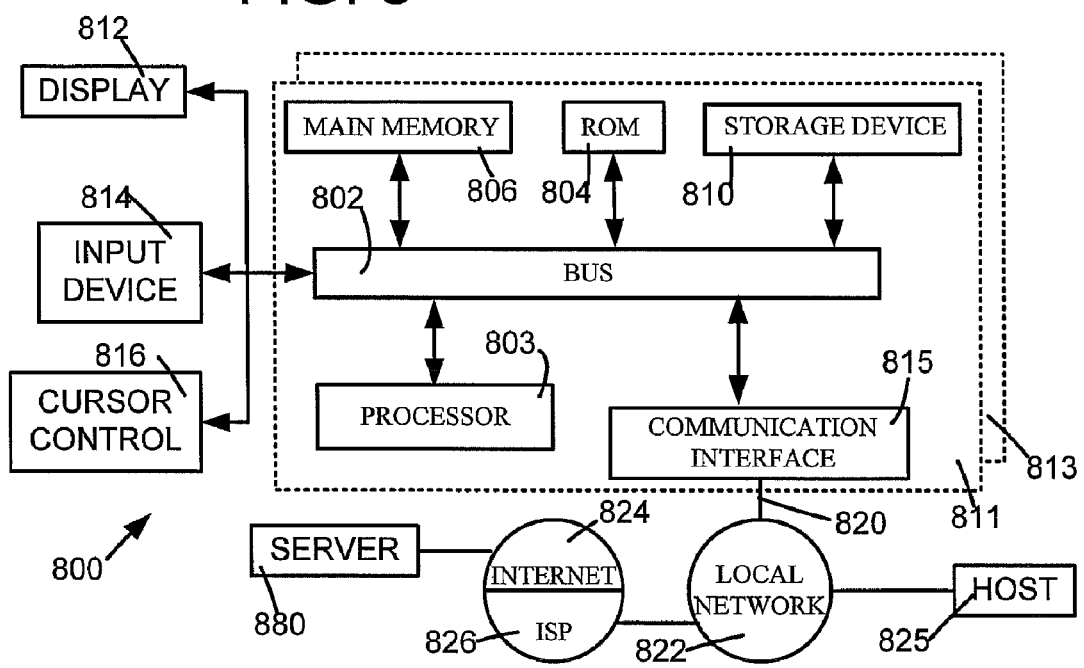
FIG. 8 illustrates, in a high level block diagram, hardware included in a computer that may be used to implement the embodiments of FIGS. 4A and 4B in some illustrative implementations of the invention.

In many embodiments, a data storage system 10 (FIG. 1A) is implemented within a computer system 800 illustrated in FIG. 8, and programmed in accordance with the invention to use a software tool 100, also herein called "data recovery advisor" or abbreviated as DRA. In certain embodiments, the data recovery advisor automatically responds to errors occurring within data storage system 10 by running diagnostic procedures that check integrity of one or more components within data storage system 10. More specifically, in view of one or more reasons described in the Background Section above, a data recovery advisor (DRA) of some embodiments does not rely on correlating errors. Instead the DRA of these embodiments uses errors as a "hint" to start (or trigger) comprehensive integrity checks of system component(s) associated with the error. Such checks (e.g. a data block integrity check) in data storage systems usually can be fast (relative to error correlation) and their execution does not consume a lot of system resources. A medical analogy to certain DRA's integrity checking is as follows: if a CT Scan were cheap, doctors would prefer to always use it to diagnose a disease, and patient's symptoms would just be used to determine which body part(s) to scan.

Examples of data storage system 10 for which a DRA of the type described herein can be used include file systems, storage arrays, file servers, and database management systems. Data storage system 10 includes a software program 11 that stores data 15 persistently in storage device 12 (implemented by storage device 810 in FIG. 8), which may be, for example, a hard disk, a flash memory or a tape. While storing data 15 to storage device 12 and/or during retrieval of data 15 from storage device 12, software program 11 may encounter one or more error(s) 13, such as not being able to access a file normally used by software program 11.

Figure 1A:
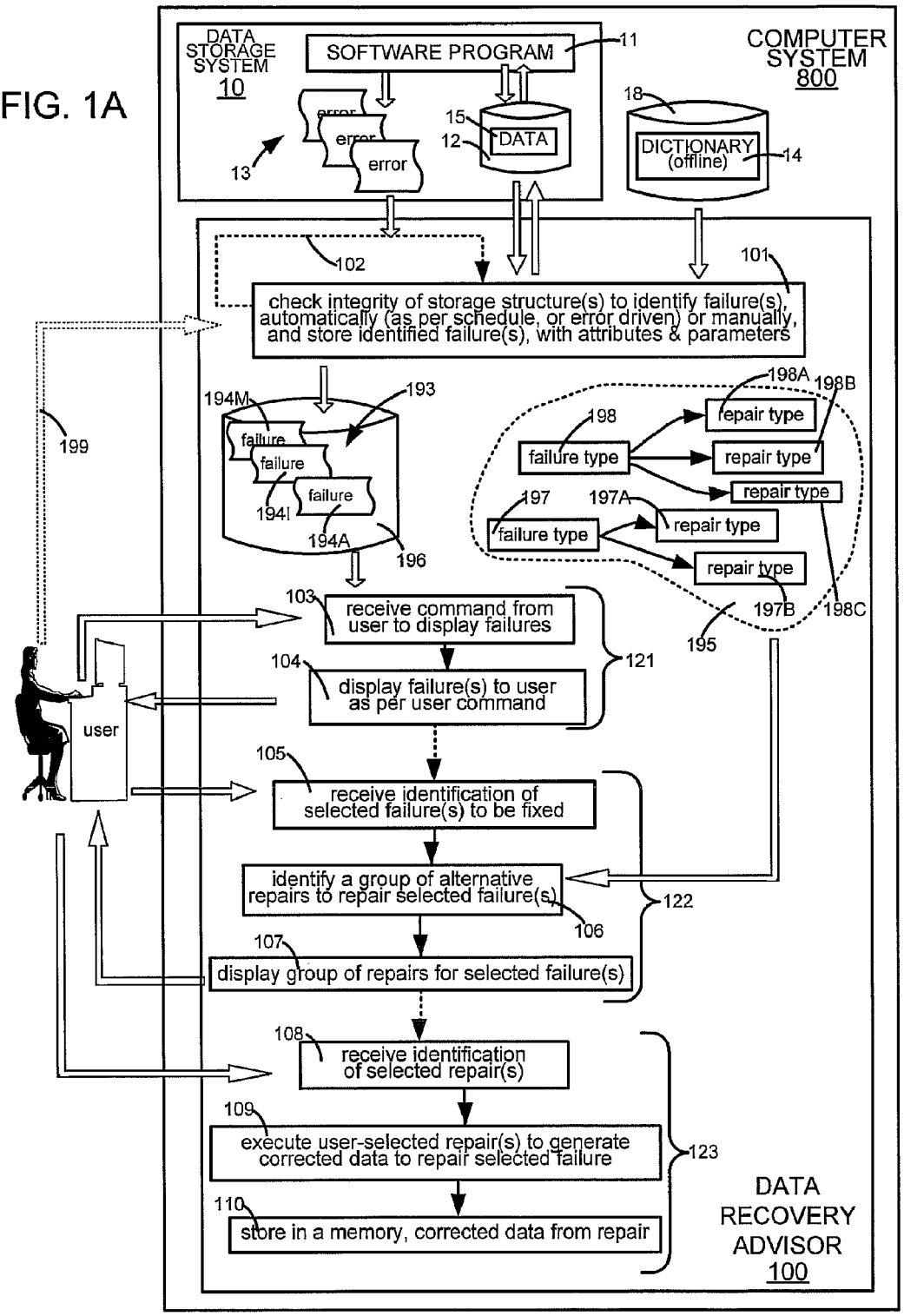
FIG. 1A illustrates, in a high level flow chart, acts performed by a data recovery advisor in some embodiments of the invention, to identify failures and perform recovery of data for any software program.

Note that software program 11 of FIG. 1A may implement any functionality when programmed into computer system 800, such as an operating system, and/or any application program. Accordingly, a data recovery advisor 100 of the type illustrated in FIG. 1A is prepared and used in some embodiments, to repair errors in data accessed by (i.e. read by and/or written by) an operating system (which is the software program 11 of these embodiments). In other embodiments, data recovery advisor 100 is prepared and used in some embodiments, to repair errors in data accessed by an application program, such as video game software (which is therefore the software program 11 of these embodiments).

In some embodiments, errors 13 are persistently stored by software program 11 in a repository (not shown in FIG. 1A; see storage device 810 in FIG. 8), and the stored errors are later used to identify and fix failures 193 and/or to recover data 15 that has become corrupted and/or not available for some reason. In certain embodiments, errors 13 are stored only temporarily for a short period of time (e.g. less than a minute), in volatile memory of computer system 800, such as main memory 806 (FIG. 8). Note that computer system 800 may include one or more computers (illustrated by dashed boxes), depending on the embodiment. The just-described temporarily-stored errors may constitute transient errors, of the type likely to be unavailable in future, and for this reason in some embodiments, an act 101 (FIG. 1A) is performed in response to occurrence of one or more errors, although in other embodiments act 101 can be performed in response to a command from a human user, and alternatively act 101 can be performed on a pre-set schedule.

In act 101, data recovery advisor 100 checks integrity of certain structure(s) which are used to store data 15 in storage device 12, and if any failures are found by integrity checking, then data recovery advisor 100 persistently stores the failure(s) along with one or more attributes and parameters that uniquely define the failure(s) in a record (or other such data structure) in a repository 196 in a storage device 810 of computer system 800, such as a hard disk. Attributes are certain properties which happen to be common to all failures, whereas parameters are other properties which depend on the specific type of failure, with some types of failures having no parameters and other types of failures having any number of parameters (e.g. 1, 3, 5 parameters). Attributes can be, for example, time of occurrence, failure type, failure status (e.g. open/closed), and failure priority (e.g. critical/high/low). Parameters depend on each failure's type, for example a file missing failure may have a single parameter which is a unique identifier of the file, such as file name and location (e.g URL). Similarly, a block corrupt failure may have as its two parameters (a) a unique identifier of the block within a file, and (b) a unique identifier of the file containing the block.

In some embodiments, act 101 uses a reverse object name lookup table 19 which is prepared ahead of time, to associate data blocks back to the objects to which the blocks belong. The reverse object name lookup table is referred to as metadata since it stores information about the data in the storage system. This allows you to tell that block 255 on device 7 is really the jpeg file 'Spain bell tower 2007.jpg'. In some databases, this reverse object lookup table might be part of the metadata that is stored in the data dictionary. Reverse object name lookup table 19 is pre-created by software program 11 so that it is usable off-line, so that the metadata is available to act 101 for use in interpreting errors and/or generating failures based on data 15, even when software program 11 is not running.

Specifically, after logging one or more of errors 13, software program 11 may crash and stop running, or if running may become otherwise inoperable (e.g. "hang"). Accordingly, an off-line dictionary 14 is used by some embodiments of act 101 to lookup metadata that may be required to diagnose errors 13. In other embodiments, the off-line dictionary is not used to diagnose errors, and instead it is used to determine impact of known failures. Off-line dictionary 14 may be kept in a storage device 18 that is different from storage device 12 in which data 15 is kept as shown in FIG. 1A, or alternatively a single storage device may be used to store both data 15 and off-line dictionary 14. Off-line dictionary 14 is also used in some embodiments to formulate repairs to be performed, and/or to perform repairs. In some embodiments, dictionary 14 forms a portion of data 15, although inaccessibility of data 15 causes inability to diagnose some errors 13.

Note that failures are not necessarily found after performance of act 101 by the programmed computer, e.g. there may be no failure if an error that triggered act 101 arose from an underlying fault that becomes fixed when act 101 is performed (fixed either automatically or by human intervention). Alternatively, in some situations, an error that triggered act 101 may have been a false positive, i.e. there may be no underlying fault. Accordingly, performing act 101 in response to an error has the benefit of screening out the error if it happens to be a false positive. In act 101 of some embodiments, data recovery advisor 100 examines one or more structure(s) used to access media 12, to see if all of them are well-formed, as per information (such as each structure's field definition) that is known to data recovery advisor 100. The structures that are used to access data in (i.e. store data to and retrieve data from) storage device 12 are also called "storage structures" as further discussed next.

Storage structures used by data storage system 10 (FIG. 1A) to access storage device 12 can have different formats and field definitions, depending on the embodiment. For example, in cases where data storage system 10 implements a file system/5819292 for an application (such as a browser or an accounting package) that is implemented by software program 11, examples of storage structures include (a) the inode and (b) the file allocation table, or FAT), (c) directories, (d) file system journal, and (e) superblocks. Moreover, in cases where data storage system 10 implements a database management system, such as ORACLE 10gR1 available from ORACLE CORPORATION, examples of storage structures include (a) control file, (b) data file, and (c) log file (such as a redo log). For further details on storage structures in file systems, see U.S. Pat. No. 5,819,292 which is incorporated by reference herein in its entirety.

In some embodiments, an objective of act 101 (FIG. 1A) is to identify a type of failure in media 12, which failure is mapped to a type of repair, and the repair type in turn identifies one or more repairs (to be performed manually or automatically) that can fix data corruption or data unavailability, and restore health and availability of software program 11. Specifically, as per FIG. 1A, each of failures 193 is of a specific type that is associated with one or more repair types, by a map 195 in data recovery advisor 100. Most failures 193 are caused by hardware faults, operating system faults, user errors, and/or bugs (errors in programming logic) of the software program 190. However, not all bugs result in one of failures 193. A software bug by itself is not a failure, unless the bug's symptoms are known data failures, with well-defined repairs. Accordingly, only known problems, which have known repairs, are identified by data recovery advisor 100 of some embodiments, as failures in data storage system 10.

Failures identified by data recovery advisor 100 are distinguished from errors that occur in data storage system 10 as follows. Each failure unambiguously describes a specific problem (which is one of several problems that are known to occur). Determining a root cause of a failure (e.g. faulty disk controller, user error, or a software bug) is not performed in act 101 of most embodiments. Instead, each failure identified by act 101 is pre-selected to be of a type that has one or more known repair(s) which can be used to repair data that is inaccessible or corrupted due to the failure. To better understand the difference between a failure and an error, the inventors of the current patent application recommend the reader to analogize the term "failure" to the term "disease" commonly used in the medical field. In accordance with the just-described medical analogy, errors (e.g. file open error) of a failure (e.g. missing file) are analogous to symptoms (e.g. sneezing/coughing) of a disease (allergy/cold/flu). Accordingly, each of failures 193 represents a specific conclusion of an analysis, about a problem of data storage system 10.

Note that any one of failures 194A . . . 194I . . . 194M (together referred to as failures 193) may manifest itself in a number of observable symptoms, such as error messages, alarms, failed health checks, etc. However, conceptually each failure 194I is different from a symptom itself because each failure 194I represents a diagnosed problem (conclusion as to the source of the symptom), and because each failure must be associated with one or more repairs. Examples of failure(s) 193 detected by act 101 include: (a) inaccessible data file, (b) corrupted data block and so on. Not every fault in computer system 800 is one of failures 193, because a failure 194I only represents a fault that is known. In addition, as noted above, each failure 194I is deterministically identifiable, by performing in act 101 one or more procedure(s) specifically designed for finding the fault, and as noted above the fault must be fixable by performing a deterministic repair involving a manual or automatic action(s). Note that relationships between symptoms, failures and underlying faults can be non-trivial, and as noted above they are determined ahead of time, and appropriately programmed into data recovery advisor 100.

A single fault (which may be a "root" cause) can result in multiple failures with different symptoms; moreover, a single symptom can correspond to multiple failures. Knowing a symptom or a root cause of a failure might not be enough for a human to formulate a specific sequence of acts (e.g. a repair) to be performed (manually or automatically) to repair a failed component of data storage system 10, which component can be any of hardware, software or data. Accordingly, only a fault that indicates the nature of the problem is formulated into a failure (of a particular type) and is associated with a repair type. Specifically, as noted above, in reference to map 195 of FIG. 1A, a failure type may be associated with more than one repair type, if multiple repairs are possible to address a given failure. Despite the fact that in some cases a failure, its symptom and its root cause can be the same or can be confusingly similar, each of them represents a different concept and conceptual differences between them are supported by their different treatment within the software used to program computer system 800 to function as a data recovery advisor 100 of several embodiments.

In performing act 101, data recovery advisor 100 of some embodiments verifies the integrity of storage structure(s) that are used to store the data in storage device 12 by implementing physical check(s) and/or logical check(s) and/or both. Physical checks include checking of one or more attributes of items that are physical entities, such as a file or a block. These attributes (also called "physical attributes") are independent of the data that is contained within the file or block. One example of a physical check is whether a given file exists, which is implemented by making a call to the operating system of computer system 800. Physical checks can be specific to the type of file or type of block. For example, files and directories have different block formats and therefore have different checks. Accordingly, in act 101 a computer 811 (included within computer system 800) is programmed, in some embodiments, to compute and verify a checksum, and verify presence of one or more known fields such as a predetermined number (i.e. a constant). In another such check, depending on the type of file (e.g. as indicated by file name and/or an index) computer 811 checks if a header within a first block of the file has a field whose value indicates the same type.

In addition to (or instead of) checking physical attributes as discussed in the previous paragraph, in some embodiments, the computer (within system 800) is programmed to perform logical checks. Logical checks may include performing range checking. An example of a logical attribute is the list of file names specified in a directory block. A directory block might be correctly formatted, but have an incorrect file name entry. Such a block would pass the physical checks but would fail the logical check. Additional examples of logical checking include: date is valid, size is valid (e.g., does the size stored in the block match the physical size of the block that has been retrieved), and field is within a valid set of values (e.g., if there is a filetype field in the storage structure being verified, make sure the value is one of the valid ones). Logical checks may also check relationships between blocks. For example, if there are references, pointers, or offsets from one block to another (as might exist in a file allocation table or database index), the computer makes sure that the referenced blocks do exist. In some embodiments of the just-described example, the computer reads the actual referenced block, to see if that block is correct. For a directory, the computer checks to make sure that the file entries in that directory exist. Depending on the content, the computer can also be programmed to perform checks on the content of the file or block. For example, XML documents have a well-defined structure that is validated in some embodiments. Some embodiments of the computer also do range checking on application-specific fields.

After verifying the integrity of storage structure(s) as described above in reference to act 101, the programmed computer automatically identifies zero, one or more failures. For example, at the end of act 101, a failure 1941 that caused one or more errors 13 to occur is identified. As noted above, a failure 1941 which is identified by act 101 is of a type that is known ahead of time to act 101, i.e. it is one of a predetermined set of known types of failures. The identified failures 193 are initially stored by computer system 800 in a volatile memory 806 (see FIG. 8), and eventually followed by transfer to a storage device 810 that stores data persistently, such as a hard disk. In some embodiments, performance of act 101 includes execution of any diagnostic software that tests the integrity of an item (such as data, hardware or software) in data storage system 10, to ensure that the item being tested has its structure and function as expected by software program 11.

Note that the above-described integrity checking in act 101 is performed after startup and initialization of software program 11, i.e. during normal operation of data storage system 10. The checking of integrity in act 101 may be initiated and/or repeated (as per act 102) asynchronously in response to an event in data storage system 10, such as a command from the user or an error encountered by software program 11 in reading or writing data to media 12, depending on the embodiment. Performance of acts 101 and/or 102 is scheduled in some embodiments to be periodic (at predetermined time intervals, such as once an hour), or alternatively aperiodic based on user input, e.g. user specifically schedules act 101 to be performed at certain times of the day when data storage system 10 is expected to be underutilized.

As illustrated in FIG. 1A, acts 103 and 104 together form an operation 121 that decouples a human user's interaction (and therefore their experience) from the work performed by computer system 800 in act 101 of several embodiments. Such decoupling has several advantages, as follows. Act 101 is performed automatically asynchronously in the background, so it does not interfere with operation of software program 11 that triggered performance of act 101 (i.e. software program 11 can continue to operate after logging an error). Moreover, performance of operation 121 in response to a user command is also not adversely impacted, as would happen if performance of act 101 is started only in response to (and subsequent to) act 102 (i.e. user does not have to wait while act 101 is being performed). In some embodiments, failures 193 resulting from act 101 are stored in a persistent storage device (such as a hard disk), and arise from an automated response (by act 101) to an error being detected.

Note that a storage device to persistently store failures 193 is not used in certain alternative embodiments which simply store failures in main memory of computer system 800. Moreover, some alternative embodiments perform act 101 only in response to human input (shown by dashed arrow 199). Note that act 103 is performed in the reverse order shown in FIG. 1A relative to act 101 in some embodiments, i.e. act 103 is performed initially and supplies user data to act 101. Also, in the some embodiments of the data recovery advisor 100, act 104 is performed only in response to a command from the user in act 103. However, in alternative embodiments, one or more such acts may be performed automatically as discussed below in reference to FIG. 1B.

In one embodiment, acts that are performed by computer system 800 after act 104 depend on the human user. For example, in several embodiments, computer system 800 is programmed to receive from the human user (as per act 105) a selection from among displayed failures, which selection identifies a specific failure to be corrected. In response to user's identification of a specific failure, computer system 800 automatically identifies (as per act 106) one or more predetermined repairs for corrupted data in storage media 12.

As noted above, any failure to be recognized by data recovery advisor 100 (FIG. 1A) must be associated with repair for fixing the failure. One or more types of repairs are automatically identified in act 106, e.g. by use of map 195 which is implemented in some embodiments as a lookup table. The table (which implements map 195) is static and it is set up ahead of time in a memory of computer system 800, during initialization and startup of data recovery advisor 100. Among the identified types of repairs, each type of repair is alternative to another type of repair, and consequently the corresponding repairs themselves constitute a group of alternative repairs, each of which can fix the specific failure selected by the user. Accordingly, in act 107 (FIG. 1A) computer system 800 displays to the user, multiple alternative repairs, for repairing a user-selected failure.

As illustrated in FIG. 1A, acts 105, 106 and 107 together constitute another operation 122. Operation 122 is shown in FIG. 1A as being coupled (by a dashed arrow) to operation 121 based on the human user's input to computer system 800, in some embodiments. Coupling of operations 121 and 122, via input from a human user has several advantages, as follows. Firstly, a human user may review failures displayed by act 104 and decide to not take any further action to correct any of them at this time (although eventually the user will probably want to fix all data failures), e.g. if the failures are less important than continuing current operation of software program 190. Therefore, performance of operation 122 is entirely under human control in these embodiments. Secondly, awaiting user input by such coupling allows computer 100 to only perform operation 122 on those failures that are selected by the user. Performing operation 122 on selected failures instead of doing so on all failures, saves computing resources in the form of processor time and memory. An experienced user may know how to fix a failure just from the detailed description of a failure provided by act 104, and may then fix the failure manually. After such manual repair, the user can simply issue a command to list failures, which is received in act 102 (discussed above) and a record in the repository, for the failure which was manually fixed, is automatically marked as closed during revalidation in act 103 (i.e. in response command received in act 102).

The acts that are performed by computer system 800 after act 107 in some embodiments depend on the human user. In several embodiments, computer system 800 is programmed to receive from the human user (as per act 108) identification of a selected repair, to fix a corresponding failure. In response to receipt of the user's input in act 108, computer system 800 automatically performs the repair identified by the user as per act 109. Accordingly, corrected data that is obtained from repair is stored in memory (as per act 110), e.g. for later use by software program 190 and/or by other software tools and/or by human users. For example, in some embodiments of act 110, computer system 800 is programmed to use the corrected data from act 109 to overwrite the corresponding corrupted data in media 12.

In the embodiment illustrated in FIG. 1A, manual selection is made in a real time dialogue between a human user and a computer that implements a data recovery advisor 100 of the type described above. However, in other embodiments illustrated in FIG. 1B, a selection is made ahead of time, by a user (it's the customer who decides if they want this behavior) who pre-configures the software of a data recovery advisor 100A. Specifically, a data recovery advisor 100A (described below) is pre-configured in certain embodiments to automatically execute a repair that has no data loss, if such a repair is present in the group of alternative repairs for the failure.

Accordingly, certain alternative embodiments implement a data recovery advisor 100A (FIG. 1B) that automatically performs one or more acts which otherwise require human input, for example as stated above. Note that certain acts performed by data recovery advisor 100A (FIG. 1B) are, in some respects, similar or identical to corresponding acts performed by data recovery advisor 100 (FIG. 1A), unless described below. For this reason, identical reference numerals are used in FIGS. 1B and 1A to identify corresponding acts in the two figures.

Referring to FIG. 1B, human input is not required by data recovery advisor 100A prior to operation 122 in some embodiments, which are programmed to directly perform an operation 122A automatically, without performing operation 121. Such embodiments are also referred to herein as "automated" embodiments of data recovery advisor. In operation 122A (FIG. 1B) data recovery advisor 100A automatically selects one or more failures in repository 196, e.g. at random, in act 105A. In certain embodiments, data recovery advisor 100A is programmed, to use one or more predetermined criteria and/or predetermined logic for failure selection, to automatically select one or more of failures 193 from repository 196.

In some embodiments failures are selected (either automatically or with manual input as illustrated in FIGS. 1B and 1A respectively) based on priority, with the highest priority failures being always selected. Specifically, each of failures 193 is assigned a priority (e.g. critical, high, and low) when created. For example, a predetermined criterion used in act 105A is to select all failures that are of highest priority. Note that priority levels are assigned to failures in act 101, by use of a table (not shown) that maps each failure type to a corresponding failure priority. In the certain embodiments, if any failures 193 in repository 196 are of priority "critical," then these failures are automatically selected (in the automated embodiment of FIG. 1B) or forced to be selected (in the manual-input embodiment of FIG. 1A).

Failures with critical priority require immediate attention because they make software program 11 unavailable. Moreover, failures with high priority make software program 11 partly unavailable or make data 15 partly unrecoverable, and usually have to be repaired in a reasonably short time (e.g. within a day). Examples of low-priority failures include data block corruptions in files that are not needed for operation of software program 11, as well as non-fatal I/O errors. Repair of failures that are of low priority failures can be delayed, until other failures are fixed (delayed either automatically or by the user). Moreover, some embodiments provide support for a human user to review and change priorities of failures 193 stored in repository 196. Certain embodiments limit such support, e.g. do not allow lowering of priorities, or do not allow lowering the priority of any critical failures.

Referring to the automated embodiment of a data repair advisor illustrated FIG. 1B, if there are no critical failures in repository 196 then act 105A selects all failures of priority level high. In some embodiments, act 105A additionally selects one or more failures 193 that do not have as a prerequisite, fixing of any other failure in repository 196 that has not yet been selected. To perform such additional selection, information about one or more dependencies between each failure and any other failure is included in data recovery advisor 100A of some embodiments, e.g. in a two dimensional table (not shown in FIG. 1B).

In the automated embodiment of FIG. 1B in addition to operation 122A, operation 123A is also performed automatically, i.e. all acts of the data recovery advisor 100A (see acts 105A, 106, 108A, 109, 110 and 111 in FIG. 1B) are performed automatically without any human input whatsoever. As will be apparent to the skilled artisan, other embodiments may mix and match acts of FIG. 1A with acts of FIG. 1B, for example as follows. In several embodiments, after acts 105A and 106 of FIG. 1B are performed, an act 107 (FIG. 1A) is then performed to display various alternative repairs to a human as illustrated by the embodiment shown in FIG. 1C, followed by acts 108, 109 and 110 as described above, which is then followed by act 111 (described below). Accordingly, in the just-described embodiment illustrated in FIG. 1C, human input is sought only for selection of a repair by performance of acts 107 and 108 of FIG. 1A, and otherwise performing the acts shown in FIG. 1B. As will be apparent, other embodiments may perform acts 104 and 105 of FIG. 1A to obtain human input on the failures to be fixed, and then perform acts 106, 108A, and 109-111 automatically. Hence, numerous such combinations will be apparent to the skilled artisan in view of this disclosure.

After acts 105A and 106 are performed by an automatic data recovery advisor 100A as discussed above in reference to FIG. 1B, and furthermore in some embodiments acts 108A, and 109-111 are also performed automatically as follows. Specifically, in act 108A, a repair is automatically selected by data recovery advisor 100A, based on one or more predetermined criteria and/or predetermined logic for repair selection. For example, in some embodiments, any repairs that do not result in data loss by performing repair on the data in storage device 12 are selected automatically in act 108A. Thereafter, acts 109 and 110 are performed in the above-described manner, followed by an act 111 as follows.

In act 111, automatic data recovery advisor 100A checks if there are any failures in repository 196 that need to be fixed (e.g. identified by status of "open"). If the answer is yes, then automatic data recovery advisor 100A returns to act 105A (described above). If the answer is no, then automatic data recovery advisor 100A waits and then returns to act 111. The waiting by automatic data recovery advisor 100A is set by a database administrator in some embodiments although in other embodiments the duration is of a fixed amount (e.g. 1 second) built into the software of automatic data recovery advisor 100A (e.g. hard coded therein).

The specific programming of software within data recovery advisor 100 and/or 100A will be apparent to the skilled artisan in view of this disclosure. However, for illustrative purposes, additional details of such programming are discussed below, in the context of a database management system (DBMS), although it should be readily apparent that DBMS is merely an illustrative example of a data storage system 10, and other data storage systems, such as file systems, are also implemented in the manner described herein.

In several embodiments, a computer is programmed to check integrity of data in a storage structure from which an error arises in response at least partially to occurrence of the error during access of the data. Specifically, on occurrence of each error, a method 200 of the type illustrated in FIG. 2A is performed by computer system 800 to implement flood control at two levels, to account for duplicate errors (within a time period) and for duplicate performance (within another time period) of act 101. As noted above in reference to FIGS. 1A-1C, act 101 performs one or more physical and/or logical checks on data 15. One or more acts 201-208 of method 200 may be performed within software program 11 that uses storage structures to access data 15, or alternatively one or more of these acts may be performed by data recovery advisor 100/100A/100B, depending on the embodiment.

Specifically, in some embodiments, after an error arises in data storage system 10 (hereinafter "current error"), the computer automatically performs act 201 to record occurrence of the current error with a time and date stamp in a log (also called "first log"). The first log is used in act 203 as discussed below; and the log is purged on a periodic basis. After act 201, the computer checks a predetermined set of errors, to see if the current error is of interest as per act 202, and if not of interest then returns from method 200.

If in act 202, the computer determines that the current error is of interest, then it goes to act 203. In act 203, the computer checks in the first log whether any prior error recorded therein (as per act 201) is identical to the current error (e.g. same type and same parameter values), and if so whether that prior error satisfies a predetermined condition relative to the current error. For example, the computer checks if the prior error occurred at least within a first time period of occurrence of the current error, with the first time period being set at, for example, 5 minutes.

If the answer in act 203 is yes, then the current error is flood controlled, i.e. it does not perform act 101. If the answer in act 203 is no, the computer goes to act 204 to implement the performance of act 101. In some embodiments, act 101 is performed by execution of a procedure (called "diagnostic procedure") in a process that is separate and distinct from the process in which the error arose. Note that in other embodiments, the computer does not execute a diagnostic procedure, and instead the integrity checking is done in an in-line manner by performance of act 101 by the same process that identifies the error. However, decoupling a first process that detects an error from a second process that uses the error to diagnose a failure is advantageous because the first process can continue execution without waiting for the second process to finish execution.

Figure 2A:
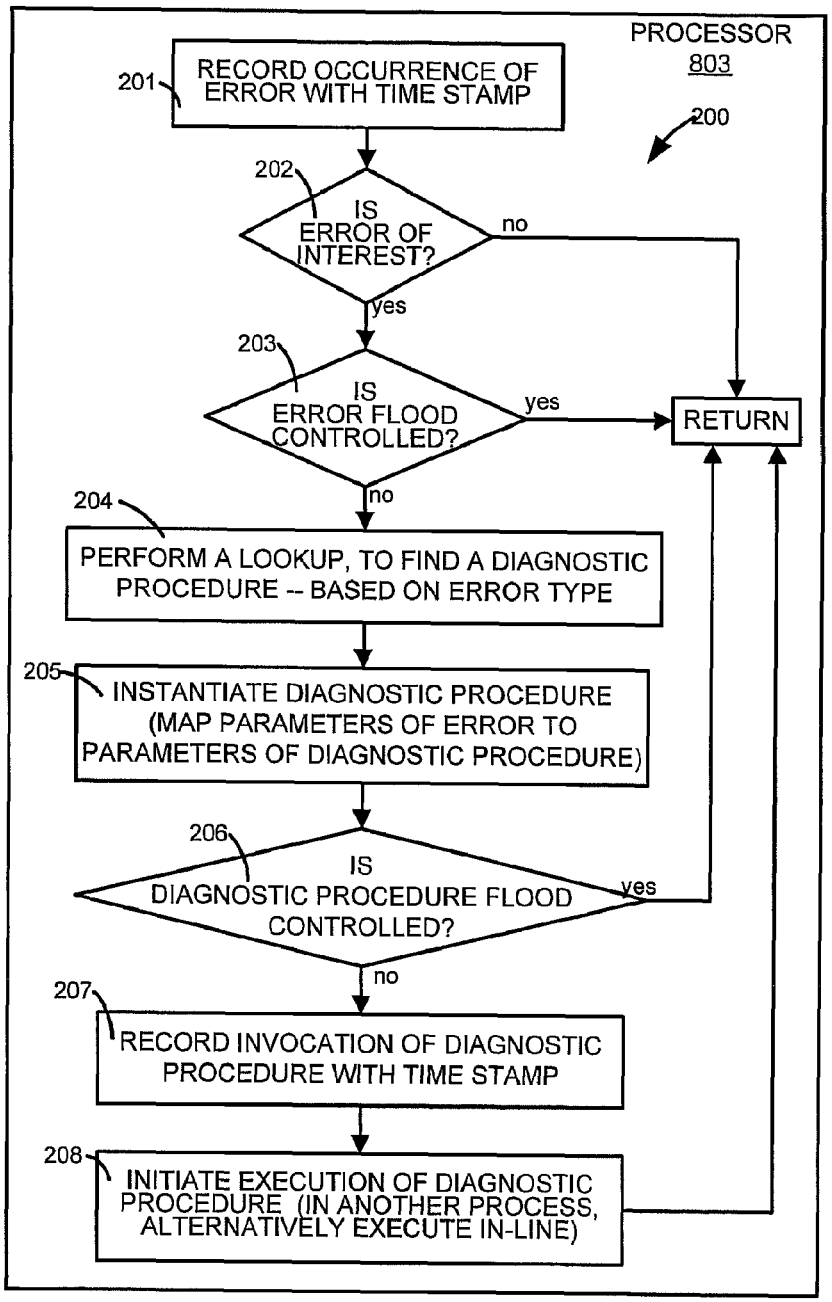
Figure 2B:
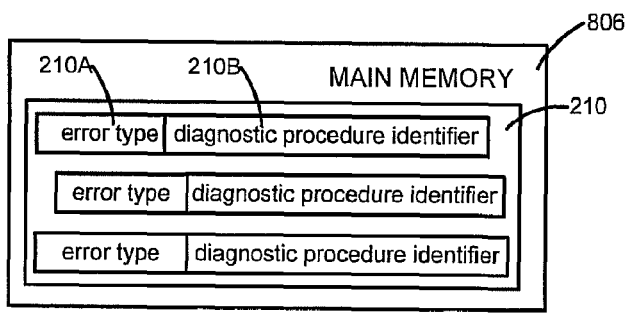
FIG. 2B illustrates a mapping in main memory, of error types to identifiers of diagnostic procedures, used by act 101 of FIGS. 1A-1C, in accordance with the invention.

Accordingly, in act 204 some embodiments use a type of the error that arose to look up a predetermined table 210 (FIG. 2B), and find the identity of a diagnostic procedure to be executed. Note that in act 203, instead of (or in addition to) flood controlling of an error based on a single occurrence with a given time period, other embodiments perform flood control based on the number of occurrences of the error within a first window of time, e.g. 2 times in 10 minutes. Next, in act 205, the diagnostic procedure is instantiated. Specifically, various parameters related to the current error are automatically matched, by the computer performing act 205, to parameters of the diagnostic procedure.

Then in act 206, the computer checks to see if the diagnostic procedure identified in act 204 has been previously performed within a second time period, e.g. 1 minute and also checks if the diagnostic procedure is currently executing. Whether the diagnostic procedure is currently executing is determined from the value of a flag, which flag is set at the beginning of execution of the diagnostic procedure as per act 211 in FIG. 2C (described below). Note that in performing act 206 (in a manner similar to act 203), instead of (or in addition to) flood controlling execution of a diagnostic procedure based on its single performance in a given time period, other embodiments perform flood control based on the number of performances of the diagnostic procedure within a second window of time, e.g. two times within 2 minutes.

If the result in act 206 is no, then the computer automatically goes to act 207 and records, in a second log, an identity of the diagnostic procedure being invoked and the time and date of invocation. This second log is used in act 206 (described above), in a manner similar to the above-described use of the first log in act 203. After act 207, the computer performs act 208 to initiate execution of the diagnostic procedure, e.g. by sending to a background process, a message containing the diagnostic procedure's identity and its parameters.

FIG. 2C illustrates various acts performed by act 101 when performed by a background process that executes a diagnostic procedure in operation 210. Specifically, in act 211, the computer sets a flag to indicate start of the diagnostic procedure that has been identified by method 200. Next, in act 212, the computer verifies the integrity of data accessed by certain storage structures, which storage structures are known to result in the error type that triggered the diagnostic procedure. In executing the diagnostic procedure, if any failure is found, the computer goes to act 213 and generates a request to create in the failure repository, a failure identified by the failure type and one or more parameters specific to that failure type. In some embodiments, one of the parameters describes an impact of the failure, such as a specific object in stored data 15 that is not currently available due to the failure. Values for the parameters of the failure are determined by the diagnostic procedure based on information (e.g. from an off-line dictionary) that is specific and unique to each failure. Note however, that in certain embodiments, the just-described parameter values are not determined from an off-line dictionary, and instead these values are determined from an on-line dictionary. Instead in the certain embodiments, an off-line dictionary is used only for impact information. Next, in act 214, the computer generates a report of the failures that have been found and records in the second log an event indicating completion of the diagnostic procedure. Thereafter, in act 215, the computer clears the flag that had been set in act 211 and then waits (in the background process) for another message from the process of method 200, to execute another diagnostic procedure.

Accordingly, a diagnostic procedure is run in some embodiments of operation 210 to find out what, if any, problems may be present in certain data components of computer system 800 that may cause an error within software program 11. As noted above, the diagnostic procedure typically uses technical information about specific data, hardware or software whose integrity is being checked. For example, a diagnostic procedure for data 15 (FIG. 1A) in storage device 12 may contain one or more data structures (which define data types of one or more fields) used by software program 11 to access data 15. In this example, the diagnostic procedure type-checks and/or limit-checks data 15, by use of predefined storage structure(s), to determine whether a particular field therein has an error.

Also depending on the embodiment, a diagnostic procedure that is executed in operation 210 can be configured to diagnose just one failure (e.g. one procedure per failure), or configured to diagnose multiple failures (e.g. a single procedure for certain failures of a particular type or particular layer of software, or even a single procedure for all failures). Moreover, in embodiments that use multiple diagnostic procedures, the same failure can be diagnosed by several different diagnostic procedures, any one or more of which may be performed in operation 210. Note that in some embodiments, each failure is diagnosed by only one diagnostic procedure, although that one diagnostic procedure itself diagnoses multiple failures.

Figure 1C:
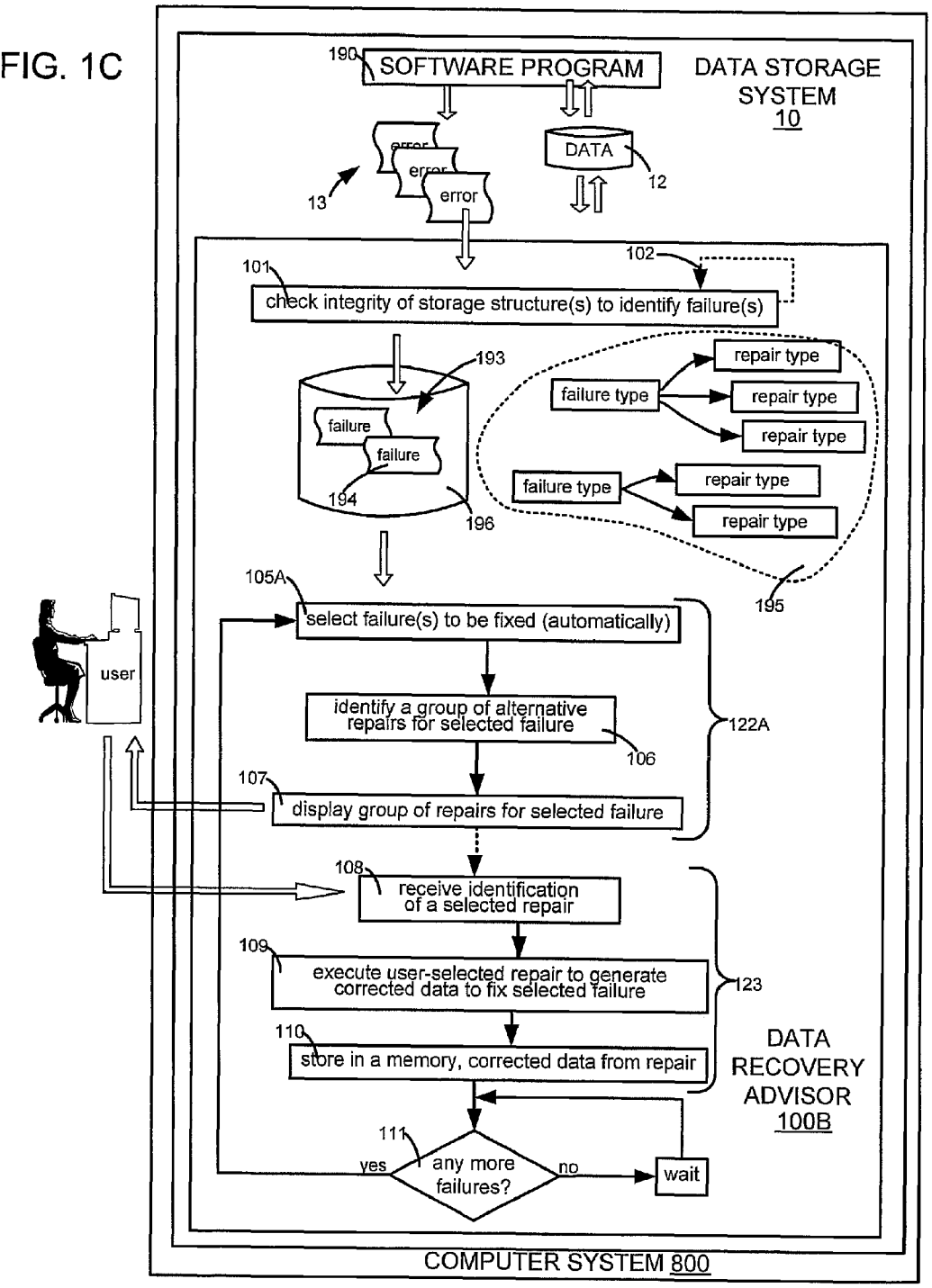

Further depending on the embodiment, a diagnostic procedure can be explicitly invoked either by the user or by computer system 800 as part of a scheduled evaluation of data in storage device 12 (FIGS. 1A-1C). In certain embodiments, execution of a diagnostic procedure in operation 210 is automatically started based on occurrence of a corresponding error in software program 11, e.g. by computer system 800 using an activation table (not shown in FIG. 1A) that associates errors with corresponding diagnostic procedures. Moreover, execution of a diagnostic procedure can be triggered by the output of another diagnostic procedure in operation 210, e.g. by indication of an error.

The specific diagnostic procedures that are used by a DRA of the type described herein will be readily apparent to the skilled artisan. In particular, the skilled artisan will be able to use utilities commonly available in the industry to check file systems and databases for consistency. Moreover, specific repairs depend on the specific data storage system, and may include getting data (backups, log of changes, etc.) from external sources such as a backup server or storage/filesystem/database replica. Accordingly, a DRA for file systems in accordance with this invention is superior to a prior art utility called "fsck". Without the ability to access external sources, such a prior art utility experiences data loss, which can be avoided by a file system DRA of the type described herein. One or more of the integrity checking techniques used by a file system DRA of the type described herein for UNIX can be implemented in a manner similar or identical to fsck, as described in, for example, an article entitled "Fsck—The UNIX† File System Check Program" by Marshall Kirk McKusick and T. J. Kowalski published Oct. 7, 1996 that is incorporated by reference herein in its entirety. Also, integrity checking techniques used by the file system DRA for Windows XP (available from Microsoft Corporation) can be to invoke the operating system utility "Chkdsk". Moreover, a database DRA may invoke the checks supported by a database management system, such as DBCC CheckDB.

In some embodiments, a framework within the computer receives the request generated in act 213 (described above), and performs the method illustrated in FIG. 2D. Specifically, in act 221, the computer uses a failure type identified in the request to look up a table (not shown) and identify all parameters of the failure. Next, in act 222 the computer verifies the parameters, e.g. by checking if the value (received with the request) of each parameter is between predetermined limits (max, min) on legal values for that parameter. Next, in act 223, the computer instantiates a failure, by storing in failure repository 196 a record for the failure identified by a unique identifier (which is a sequence number that is monotonically changing, e.g. an integer count that is incremented by 1 for each failure). An illustrative record for a failure in storage device 810 is illustrated in FIG. 2E as discussed next.

In some embodiments, the computer stores for each failure 230 (FIG. 2E), values of several attributes, such as identifier 231 (a unique number), a failure type 232 (a value that is one of several predefined values), creation time 233 (current time and date when failure is stored), status 234 ("open" initially, and when failure is fixed, changed to "closed"), priority 235 (for example, critical, high, low), text description 236 (a detailed statement of the failure, to specifically describe the nature of the problem encountered by software program, to enable manual selection of one of several repairs for fixing the failure), parent identifier 237 (to identify a parent failure into which the current failure can be aggregated), and revalidation software's identification 238. Identification 238 is used whenever the computer needs to check if the current failure is still valid (i.e. data storage system 10 still has the current failure).

Although certain failure attributes have been described and illustrated in FIG. 2E as being stored for each failure 230, fewer attributes or even more attributes may be stored depending on the embodiment. For example, the revalidation software's identification 238 is not stored in some embodiments, with each failure. Instead, the revalidation software's identification 238 is stored associated with one or more failure types, and accordingly each failure's type is used to look up the revalidation software's identification 238.

In addition to the just-described attributes, a failure may also have one or more parameters 239 (as discussed above). Failure attributes, parameters, and their values can differ in different systems.

After performing act 223, the computer flags (in act 224) a current failure as a duplicate if the same failure was previously recorded in failure repository 196. Specifically in some embodiments of act 224, the computer searches the repository for the failure and if a duplicate failure exists (e.g. same type and same parameter values) and if its' status is open then the current failure is marked as a duplicate. For example, if a diagnostic procedure C is executed by act 101 at time M and detected Failure B. Then some time later at time N (N>M), diagnostic procedure C is executed by act 101 again and detected Failure B again. Adding Failure B the second time around creates duplicates, which are marked in repository 196 by some embodiments as being duplicates. However, certain embodiments do not create duplicate failures in repository 196. For example, a current failure is simply discarded if a duplicate is found in repository 196. As another example, when a diagnostic procedure C starts execution, procedure C automatically closes any failures in repository 196 that were previously detected by itself (i.e. by procedure C), so that only newly found failures are recorded which are unique (as any previously recorded duplicates have been closed).

In certain embodiments, the computer is further programmed to aggregate two or more failures into a single "aggregated" failure (also called "parent failure"). Hence, when multiple files (or alternatively blocks) used by software program 11 are corrupted, then the user initially receives a display of only a parent failure that summarizes multiple file corruptions (or alternatively multiple block corruptions). In some embodiments, a human user obtains a display of individual failures that have been aggregated, by making a further request to display each failure that has been aggregated (also called "child" failure) individually.

Accordingly, in act 225 (FIG. 2D) of some embodiments, two or more failures of the same type but different parameter values are used to formulate a parent failure that is added to repository 196 if the parent failure didn't already exist therein. If the parent failure already exists, then it is updated with parameter values from the two or more failures being aggregated by act 225. A parent failure's parameter values are derived from its child failures. For example, if block 2 is identified as corrupt by one child and block 9 is identified as corrupt by another child, the parent failure identifies blocks 2,9 as being corrupt. Alternatively, if the two blocks are both in the same file X, the parent failure may simply state that "file X contains one or more block corruptions."

After one or more failures are recorded in repository 196 by act 223, they may be displayed to a human user, e.g. in response to a user command to list failures. Specifically, in act 121 (FIG. 2D), the computer of some embodiments retrieves all failures in repository 196 and for each failure retrieved automatically checks if a failure's status is open, and further confirms that the failure is not duplicated, and that the failure is not a child of another failure, and if these conditions are satisfied, displays the failure. Note that in some embodiments, each child failure has as an attribute thereof, a pointer to the parent failure and vice versa. Accordingly, if the user command is to list failure details, in certain embodiments the parent failure is displayed simultaneously with a display of that parent's child failures. In some embodiments, the failures are displayed in priority order, with highest priority failure being displayed at the top of display 812 (FIG. 8), followed by the next highest priority failure, and so on.

In some embodiments, failures identified in act 121 (FIG. 2D) for display to a human are revalidated prior to display. During revalidation in act 121 (FIG. 2D), computer system 800 invokes the software identified by use of the failure type to look up a revalidation software identifier for a given failure in a map, to verify that the failure still exists in data storage system 10 (FIGS. 1A-1C), and marks as "closed" any failure that no longer exists. The software identified by revalidation software identifier 238 in certain embodiments is a portion of the software that originally diagnosed the failure. For example, a portion of a given diagnostic procedure that is triggered in response to an error is re-executed during revalidation, to ensure that the failure still exists. Certain alternative embodiments do not perform a lookup in a map to find the diagnostic procedure for a failure based on failure type, and instead the diagnostic procedure of the alternative embodiments initializes (as per act 223 in FIG. 2D) in attribute 238 (see FIG. 2E), an identifier of a software portion within the diagnostic procedure, for use in revalidation of the failure in act 121 (FIG. 2D). Some embodiments support performing revalidation in response to a user's command, while other embodiments perform revalidation automatically at certain times, e.g. after repair of data 15 in storage device 12 (FIGS. 1A-1C).

One of the functionalities provided by DRA is automatic generation of a consolidated repair plan for multiple failures. Specifically, there is often a need to repair multiple failures at the same time for the following reasons: (a) a single fault (a hardware problem or a user error) can cause multiple data failures; (b) system administrators usually postpone fixing of non-critical failures until a maintenance window or more appropriate time, and by doing this, accumulate multiple failures that require repair; (c) often failures are latent and do not manifest themselves until the user tries to use the affected component, but they might be detected by a diagnostic check started because of a different reason.

Devising a successful and efficient repair strategy for multiple failures can be much more complicated than fixing a single failure. There are two reasons for the complexity. The first one is dependencies in between repairs and failures that should be taken into account when determining the order of failure repairs. These dependencies are specific to the application. The following types of dependencies can exist for a database:

a. Dependency in between repairs: a repair might not make sense if another repair has to be executed as well, e.g. a complete recovery of a component might not make sense if a point-in-time recovery of the database has to be executed after.

b. Dependency in between failure objects, e.g. a table corruption should be fixed before an index corruption if the index belongs to the table.

c. Dependency of repair feasibility on another repair, e.g., repair of filesystem structures may be feasible only after repair of the volume manager data structures.
d. Dependency of repair feasibility on failure, e.g. feasibility of a datafile repair cannot be determined if the control file is missing.
e. Failure depends on repair: failure can be closed (or become irrelevant) after a repair execution for another failure, e.g. a block corruption might disappear after a datafile recovery.
f. Dependency on a manual repair: if one of the failures has a manual repair, it has to be fixed first and then automated repairs should be considered.

In the first three cases a consolidated repair for all failures can be generated because all failures have feasible repairs. However, a certain order of repairs should be enforced. In the last three cases it is not known at repair generation time whether all failures can/should be repaired and how. The only repair for these cases, in some embodiments is to separate failures that can be repaired at the time, generate a consolidated repair for them and recommend to the user to repair these failures first and then repeat the failure-diagnosis and repair-recommendation cycle.

Another reason for the complexity of a consolidated repair generation is that usually there are many alternative ways to repair a set of failures, and determining the best alternative can be non-trivial. For example, if failure F1 can be fixed by repairs R1, R2 or R3, failure F2—by R2, R3, or R4 and F3—by R3 or R5, there might be multiple ways to fix all the failures together: 1) R1, R4, R5; 2) R2, R5; 3) R3. The more failures are in the set, the more alternatives should be considered and analyzed.

Therefore, in general, generation of a consolidated repair for multiple failures consists of the following steps:
a. given a set of failures determine which of them can be repaired at this time
b. for these failures, determine a correct order in which they should be repaired
c. consider the failures in this order and for each of them determine the best repair (minimizing time and data loss)
d. optimize the set of selected repairs by:
  (a) removing repairs that will become not feasible or redundant because of a previously executed repair;
  (b) replacing repairs for multiple child failures with a single repair for the parent failure (e.g. recovery of 20 data blocks with a file recovery) if this repair can be executed faster;
  (c) other optimizations maybe possible in particular data storage systems To execute these steps all dependencies between failures and repairs as well as guidelines for choosing optimal repairs are specified in advance, in some embodiments, by designers of the DRA. Such specification, in general, may consist of a significant number of complicated rules and needs to be reconsidered every time a new failure of repair type is added to the system. This might not be feasible for some data storage systems.

The process of repair generation for multiple failures is simplified in some embodiments by dividing up all possible failure types 321-323 (FIG. 3C) into a number of groups 301-305 (FIG. 3A), separately generating consolidated repair for each group and possibly merging generated consolidated repairs into a single repair. The just-described "divide and conquer" approach is built into a DRA of many data storage systems by dividing up failures into the following three groups: first group 301 is an "access" group for failures related to accessing an input-output component, such as file resides in an inaccessible file system, file system not mounted, file does not have right access permissions, file is locked, or operating system (OS) limit on number of open files reached, or OS out of resources needed to access file, etc. Second group 302 is a "physical" group for failures related to physical data consistency, such as missing and/or corrupt and/or mutually inconsistent physical components like files or blocks. Third group 303 is a "logical" group for failures related to data consistency, such as missing/corrupt/inconsistent logical objects like directories, file extent information, tables, rows, indexes, etc.

If software program 11 uses only one storage device 12, then access group 301 is at a higher level in the relative priority 399 relative to all other groups because no other failures can be fixed until software program 11 can access storage device 12. Specifically, failures in any group (including physical group 302) can be fixed only after failures in access group 301 are fixed. Hence, physical group 302 may be set (by the human designer) at a lower level in the priority 399, relative to access group 301.

Note, however, that although three groups have been described as being illustrative for an example of a map, this does not mean that these three groups have to be present in any given system in order to practice this invention. Instead, other embodiments group failures differently, because failure grouping is an optimization that depends on the configuration and components of the data storage system, and does not have to be part of DRA. Accordingly, the number of groups, contents of the groups, and the ordering of groups (relative to one another) can be different in different embodiments. For example, some embodiments have only two groups (e.g. an "access" group and a "physical" group), while other embodiments have four groups, five groups, or even ten groups.

Some failure groups (called "floating") 304 (FIG. 3A), do not have strict ordering constraints. The only requirement for the floating groups is that they have to be processed after a certain failure group, but there is no "before" constraint (e.g. no requirement to process before any group). In a database example, log group members can be repaired any time after a database is mounted. Hence log group members must be repaired after any repairs that are needed to mount the database, but can be repaired simultaneously with other repairs that are possible when the database is mounted.

Figure 3A:
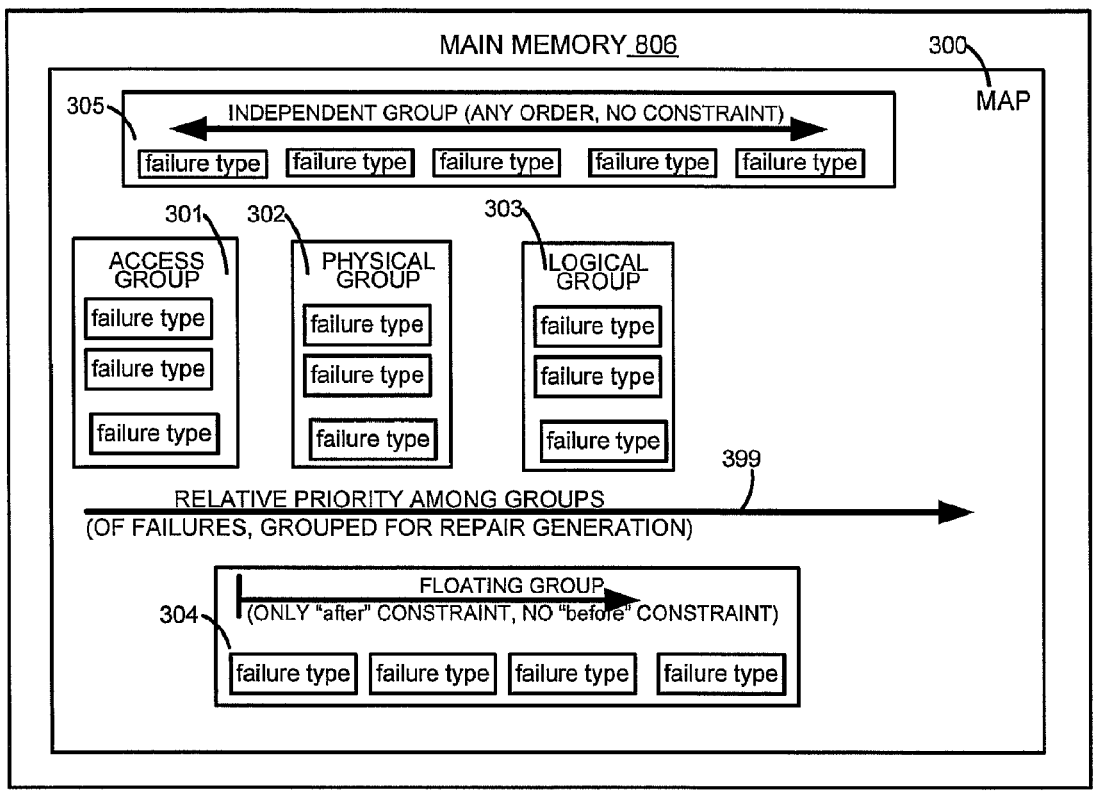
FIG. 3A illustrates a mapping of failure types to three groups that have a predetermined order relative to one another, for use in formulating a sequence of repairs to satisfy prerequisites arising from dependencies between repairs, in certain embodiments of the invention.

Finally, there could be failures for which repair generation is not constrained by any other failures or repairs and can be done at any time. Such failures are combined into the "independent" failure group 305 (FIG. 3A). A bad block in a user file is an example of an independent failure in a file system. Depending on the embodiment, not all failures must be grouped into one of the groups of the relative priority 399 (FIG. 3A), e.g. some failures may be kept ungrouped, or may be grouped into another group that is processed independently of the predetermined order.

In the above-described example illustrated in FIG. 3A, map 300 in addition to groups 301-303 may also contain a group (not shown on the figure), namely a "transaction" group, which is specific to transactional data storage systems, e.g. databases. Transaction group contains one or more failure types related to inability to process data during otherwise normal functioning of software program 11. An example in this group is a failure in performing a transaction on a database due to inability to secure a lock on an object. As noted above, failures in any group (including transaction group) can be fixed only after failures in access group 301 are fixed. Moreover, a transaction group failure cannot be fixed in some cases unless software program 11 is initialized and running.

Furthermore, in some embodiments, a single fault can result in failures in multiple groups (e.g. in all three groups 301, 302 and 303), and fixing a failure in a higher level group also fixes one or more failure(s) in other group(s) that are lower than the higher level group (in the relative priority 399).

In some embodiments, a data recovery advisor performs method 310 (FIG. 3B) to create a repair plan. Specifically, in act 311, the computer uses the failure type, of each failure in a set of failures that are to be fixed, with map 300 (FIG. 3A) to identify the group to which each failure in repository 196 (FIGS. 1A-1C) belongs. Also in act 311, the computer stores each identified group in memory, in an associate with the corresponding failure. Next, in act 312, the computer selects the highest level group, from among the identified groups that are associated with the failures to be fixed. For example, if there are only two failures to be fixed, and one failure is in the logical group and another failure is in the transaction group, then the open group is selected in act 312.

Thereafter, in act 313, some embodiments automatically prepare at least one repair plan, for the failures associated with the selected highest level group, by use of one or more additional map(s). Specifically, in several embodiments of act 313, computer 811 uses a mapping of failure types to repair types (see map 195 in FIGS. 1A-1C) to identify the repair types applicable to each specific failure in the selected highest level group. Next, computer 811 uses the identified repair type(s) with another mapping of repair types to repair templates (see map 320 in FIG. 3C) to identify at least one repair template in memory for each specific failure. Computer 811 then instantiates an identified repair template, using one or more parameters 239 (FIG. 2E) to create the specific repair for each specific failure.

In some embodiments, each failure type is associated with multiple repair types, and the multiple repair types are pre-arranged in a relative priority with respect to one another, which priority is used to select a repair (from among repairs that are feasible, for a given failure). The priorities are set so that "no data loss" repairs have a higher priority than "data loss" repairs, and faster repairs have a higher priority than slower repairs. In one illustrative example, if a repair results in no data loss for fixing a given failure, that repair's repair type is prioritized ahead of other repairs that result in loss of data. In several embodiments, one of the repair types is automatically selected in act 313 for each failure type, and the selected repair type is used to prepare a repair plan. Depending on the embodiment, selection of a repair type (and consequently the repair) may be based on feasibility of each of the multiple repairs and/or impact on data 15. In the above-described illustrative example of this paragraph, if a no-data loss repair is feasible, it is automatically selected for fixing the given failure, but if it is not feasible then a data loss repair is selected (if feasible). Hence, if a "no data loss" repair for each failure is feasible, then all such repairs are selected and used to prepare a repair plan (which as a whole results in "no data loss"). At least one repair plan, which includes repairs to fix all failures in the selected highest level group is therefore created and stored in memory 806 of computer system 800 at the end of act 313.

In some embodiments, in addition to the above-described repair plan, an additional repair plan is also prepared and stored in memory 806, in a similar manner, although the additional repair plan contains repairs that are alternatives to corresponding repairs for the same failures in the above-described repair plan. Hence, there are at least two alternative repair plans in memory 806, in these embodiments, for failures in the selected highest level group. Repairs for the two alternative repair plans of such embodiments may be deliberately selected based on whether or not they require assistance from a human, i.e. one repair plan may consist of only repairs that can be executed automatically whereas the other repair plan may consist of repairs that require human assistance. In such embodiments, each repair type is also marked (e.g. in map 195) with a flag which explicitly indicates whether or not the corresponding repair requires human assistance, which flag is used in preparing the two types of repair plans.

In some embodiments, the repair plans are limited to failures in the selected highest level group, although in other embodiments the repair plans may include one or more failures from other groups, e.g. failures whose repairs are not dependent on repair of failures in any other group. Also, some embodiments prepare repair plans to fix failures in two or more successive groups, e.g. a highest level group, a second group that is immediately below the highest level group, and a third group immediately below the second group. As noted elsewhere herein, the just-described groups are certain of those groups (from among groups 301-303) which have been identified as containing failures currently logged in repository 196 (FIGS. 1A-1C).

In some embodiments, map 320 in main memory 806 associates each failure type with multiple repair types that are used to generate multiple repair plans. As illustrated in FIG. 3C, a failure type 321 is associated in map 320 with two repair types 321A and 321M that are alternatives to one another. Specifically repair type 321A requires no human involvement to execute steps for repair identified in a corresponding template 324A. On the other hand, repair type 321M requires human assistance, e.g. to load a backup tape, to execute the repair steps identified in the corresponding template 324M. During repair creation in act 313 (of method 310 shown in FIG. 3B), each of repair templates 324A, 325A and 326A is customized with parameters 239 (FIG. 2E) of the corresponding failures being fixed, to create the corresponding repairs 331A, 332A and 333A.

After repairs are identified, each repair's feasibility is checked and on being found feasible, the repairs are added to a repair plan 330A in main memory 806. Each repair 331A, 332A and 333A consists of one or more steps (not labeled in FIG. 3C), which steps are to be performed in the specified sequence by computer system 800, with the sequence being identified in repair templates 324A, 325A and 326A. Note that the sequence is inherently identified in some embodiments, by the order in which steps are specified in a repair template. In some embodiments, a repair 331A also includes a detailed description of the actions to be done for display to a human user (e.g. in act 359). Act 313 of some embodiments chooses a repair description to include in each repair, from a set of predefined descriptions which are associated with the corresponding repair templates. Similarly, another repair plan 330M is also created in act 313, by use of the repair types 321M, 322M and 323M to identify the corresponding templates 324M, 325M and 326M and customize them with failure parameters of the failures being fixed to create the respective repairs (not individually shown).

Accordingly, repair plan 330M and repair plan 330A are alternatives to one another, and although only two repair plans are illustrated in FIG. 3C, any number of such repair plans may be prepared as described herein. Such alternative repair plans are consolidated in some embodiments, to remove any duplicates and/or redundancies in their repair steps. Thereafter the repair plans are presented to a human user by manual-input embodiments of data repair advisor (see FIG. 1A), which then awaits the human's input on selecting one of the plans. Other embodiments of data repair advisor automatically select one of the repair plans based on one or more predetermined criteria, e.g. whether all repairs in a plan can be done automatically. Although feasibility and impact are used in some embodiments to select one of multiple repair plans, other embodiments may use other factors, to select repairs to be performed.

Figure 3D:
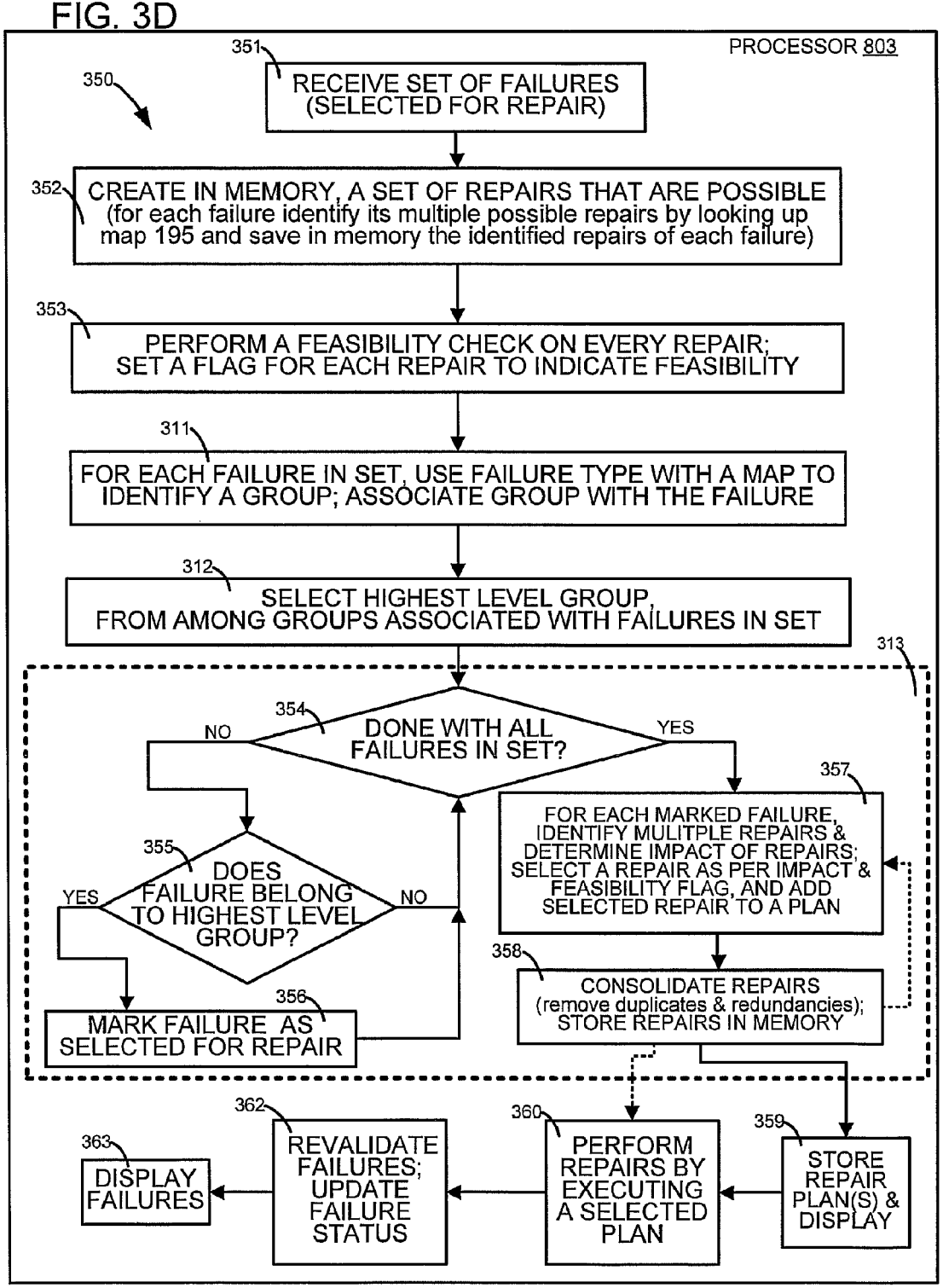
FIG. 3D illustrates, in an intermediate level flow chart, one illustrative implementation of the method 310 of FIG. 3B.

In certain embodiments, processor 803 implements method 300 by performing a number of additional acts, such as acts 351-353 (see method 350 in FIG. 3D) prior to above-described act 311, and subsequent to above-described act 312 performing acts 354-358 to implement act 313. Method 350 also includes several additional acts 359-363 subsequent to above-described act 313. Referring to FIG. 3D, in act 351, processor 803 receives a set of failures that are selected for repair, followed by act 352. In act 352, the computer creates in main memory 806, a set of repairs that are possible for each failure. Specifically, for a current failure, the computer identifies multiple repairs that are associated with the current failure's type, by looking up a map 195 (described above), and saves the multiple repairs to memory 806, in a temporary structure (such as a list) for the current failure.

Next, in act 353 (FIG. 3D), the computer performs a feasibility check, on every repair in the temporary structure (e.g. list) for each failure in the set of to-be-fixed failures, and sets a flag for each repair indicating if the repair is feasible or not. To check feasibility of a repair, the computer checks, for example if the repair involves copying a file that the file to be copied exists in storage device 12 (FIGS. 1A-1C). Certain repairs are not feasible at certain times or may become infeasible due to certain conditions, e.g. at the time of act 107 automatic repair of a file may be not feasible if the entire file itself is missing in the computer and no backups are available (e.g. due to its deletion by a virus), and accordingly an automatic repair for this failure is marked as being not feasible. On the other hand, a repair plan 330 (FIG. 3C) may be prepared to include a manual repair, which may be feasible. The manual repair may require, for example, restoration of the missing file from an offsite backup, which commands may be identified in a template for the repair. After act 353, acts 311 and 312 are performed in the manner described above in reference to FIG. 3B.

After completion of act 312, the computer of some embodiments performs act 313 by using a relative priority 399 of groups of failures (illustrated in map 300 in FIG. 3A) to identify a sequence in which certain failures are to be fixed in a current iteration and remaining failures are left unfixed until a future iteration. Briefly, in act 313, computer 811 identifies failures of highest level group that is selected to be fixed in a current iteration (followed by failures of a next highest level group in a future iteration). Specifically, to identify failures to be fixed in the current iteration, the computer performs acts 354-356 in a loop followed by acts 357 and 358 in another loop, as follows. In act 354, the computer checks the received set of failures (as per act 351) to see if all failures have been processed in the loop and if not, goes to act 355. In act 355, the computer checks if the failure belongs to a highest level group, and if not returns to act 354 (described above). If the result in act 355 is yes, then the computer goes to act 356 to mark the current failure as being selected for repair, and thereafter returns to act 354. In act 355, if the result is yes, then the computer exits the loop and in several embodiments enters a loop around acts 357 and 358 (described next).

In some embodiments, the computer is programmed to determine (in act 357) multiple repairs for every marked failure (selected based on its grouping), by use of map 320 (described above in reference to FIG. 3C). Thereafter, the computer (in act 357) checks a feasibility flag (set in act 353) for each of the multiple repairs, and infeasible repairs are dropped from further consideration. From among feasible repairs, the computer is programmed to select (for a given repair plan) one of several alternative repairs for each failure, based on impact of each repair. For example, some embodiments prepare a repair plan in which all repairs have "no data loss" as their impact. A repair's impact on loss of data is identified by, for example, performing a lookup of a map 320 using the repair type of each repair.

Additionally, each repair's impact on the duration of down time (i.e. unavailability) of software program 11 (or a specified component therein) is automatically computed in some embodiments, based on estimates of the size of data in a backup file, and speed of input/output peripherals of computer system 800, and/or speed in processing of the backup file. For example, the time required to read an off-line backup file is computed by dividing file size by speed of input-output peripheral (e.g. a tape drive). Some embodiments prepare estimates of repair duration using heuristics that are based on statistics from a previous repair, e.g. of the same repair type. Certain embodiments also take into account parallelism, such as the number of threads currently available, number of I/O channels. Several embodiments further account for the bandwidth of the storage device and/or I/O peripheral that contains the backup file. The just-described estimate of repair duration is displayed to the user merely to provide a rough indication of the order of magnitude of the down time to enable the user to make a selection from among multiple repair plans. Accordingly, the estimate of down time duration is adequate if accurate to within a single order of magnitude of actual time required to execute the repair.

Some repairs may have minimal impact or no impact on data 15 (FIGS. 1A-1C), e.g. the repairs may cause no data loss and such repairs are selected automatically in some embodiments to be included in a repair plan 330. Alternatively, in certain embodiments, repairs having one type of impact (e.g. no data loss) are added to one repair plan while repairs having another type of impact (e.g. no down time for software program 11) are added to another repair plan. As noted above, the repair plan(s) are stored in main memory 806 and may be saved to storage device 810 at an appropriate time (e.g. when completed).

A computer 811 is further programmed, as per act 358 of method 350 (FIG. 3D), to consolidate repairs in a repair plan, to avoid duplicate repairs and/or redundant repairs. Map 195, which maps failure types to repair types, is used in act 358 to determine if any repairs in the repair plan(s) are redundant relative to one another, and if so only one copy of the repair is kept in the repair plan(s) and duplicate copies of that repair are deleted. Moreover, a repair plan may contain repairs of different types (for a given impact, e.g. loss-less repair or data-loss repair). A data-loss repair for a failure may also fix one or more other failures thus making other repairs for these other failures redundant. For example, if a file is inaccessible and will be replaced to fix one failure, any repairs to fix corruption failure(s) within that file are made redundant. Hence, in act 358, any redundant repairs are also eliminated. As noted above, acts 357 and 358 are repeated in a loop, until all known duplicates and redundancies are eliminated. After repairs for all failures of the highest level group have been added to the repair plan(s), implementation of act 313 is completed and the computer proceeds to acts 359-363 as discussed next.

In some embodiments of method 350, computer 811 uses the repair steps identified in a repair plan to generate a repair script for executing the repairs and store the script (as per act 359) in a repository on disk. Computer 811 of some embodiments additionally writes the repair to the repository, including the repair's description and a pointer to the repair script. Computer 811 also writes to the repository, a consolidated list of suggestions of manual steps to be performed by a user, and the list of failures actually fixed by the repair.

Computer 811 is further programmed in some embodiments, to display as per act 359, the repair plan(s) resulting from act 313 (described above). Display of multiple repair plans enables computer 811 to obtain from a human a selection of one of the repair plans, followed by performing act 360 to execute the selected plan. Alternatively act 359 is not performed in some embodiments that automatically select the repair plan, e.g. to contain repairs that cause no data loss. In the alternative embodiments, control passes from act 358 directly to act 360. Computer 811 is further programmed, to perform act 362 (after act 360), wherein the data recovery advisor verifies successful completion of the repairs in the repair plan, and automatically updates the status to "closed" for any failures that have been fixed by the repair. Hence, failures that are closed (by being fixed) are removed from a current display of open failures as per act 363.

In one illustrative embodiment, a data recovery advisor is included as one component of certain software (called "recovery manager") within a database management system (DBMS) which is included in a software program 11 of this embodiment. This embodiment (also called "database embodiment") is illustrated in FIG. 4A by data recovery advisor 400 which is included as a portion of a DBMS 490 implemented (in whole or in part) by software in computer system 800. Accordingly, the human user in this database embodiment is a database administrator (DBA). Data recovery advisor 400 automatically diagnoses failures in database 491, and generates a repair plan for fixing as many of the failures as possible, taking into account dependencies of repairs on one another, and determining an order for repairs that are included in the repair plan. If not all failures of database 491 can be addressed by the repair plan, data recovery advisor 400 recommends performing the repairs in the repair plan in one iteration, followed by another iteration by returning to act 402 (FIG. 4A). DBMS 490 of some embodiments is a relational database management system which responds to queries from the DBA, expressed in the structured query language (SQL), such as ORACLE® 11 g Release 1 (11.1), available from ORACLE CORPORATION, Redwood Shores, Calif. (hereinafter simply ORACLE®). Note that the just-described DBMS is referred to below as "ORACLE® 11gR1".

Although the description below refers to databases and DBMS, several of the concepts described below (either individually or in combination with one another) are used in other embodiments for repairing the data of any software programs which are not DBMSs, such as software program 11 which has been described above, in reference to FIGS. 1A-1C. Data recovery advisor 400 of an illustrative database embodiment which is shown in FIG. 4A automatically diagnoses data failures in database 491, determines and displays to the database administrator (DBA) appropriate repairs, and then executes a DBA-selected repair. Use of data recovery advisor 400 eliminates the need for the DBA to manually correlate various symptoms (such as errors) in database 491 in order to diagnose a failure. Note that certain acts performed by data recovery advisor 400 (FIG. 4A) are, in some respects, similar or identical to corresponding acts performed by data recovery advisor 100 (FIG. 1A). Hence, reference numerals in FIG. 4A are derived from corresponding reference numerals in FIG. 1A, by adding 300.

Referring to FIG. 4A, acts 402-410 are performed by data recovery advisor 400 in a manner similar or identical to the corresponding acts 102-110 (described above). As a repair of a failure might potentially have an impact on the availability, integrity and performance of database 491, some embodiments of DRA 400 are deliberately designed to require human input (by someone with DBA privileges) to decide on which failures to repair in a current iteration, and which specific repair mechanisms to use during the repair. Accordingly, DRA 400 includes acts 402, 405 and 408 which are described below for some embodiments in the context of a "LIST" command, a "ADVISE" command and a "REPAIR" command respectively. Data repair advisor 400 can be used either through a graphical user interface (called "Enterprise Manager" in ORACLE® 11 gR1) or through a command line interface (in recovery manager software called "RMAN" in ORACLE® 11 gR1) of a database management system (DBMS).

In the embodiment of FIG. 4A, one or more errors 492 that are encountered by DBMS 490 in using database 491 are used as triggers by data recovery advisor 400 to automatically initiate in act 401, the execution of one or more diagnostic procedures 441, whose executable software is available in a storage device 440 (FIG. 4A) included within a computer system 800 (FIG. 8). More specifically, in the embodiment illustrated in FIG. 4A, data recovery advisor 400 uses a first map 430 (stored in memory 806 of computer system 800) with an error's identifier as index to look up a corresponding diagnostic procedure's identifier. Thereafter, data recovery advisor 400 uses the diagnostic procedure's identifier to initiate execution of diagnostic procedure 441S. When diagnostic procedure 441S completes, it stores one or more failures in a repository 494 in a storage device of computer system 800 (FIG. 8).

Many embodiments of the data recovery advisor 400 include a number of diagnostic procedures 441A-441N to check for the integrity of the various storage structures of database 491. Functions performed by each of diagnostic procedures 441A-441N depend on specific details of how DBMS 490 is implemented, e.g. specific memory management techniques and/or storage structures. Note that details of implementation of data recovery advisor 400 for a specific DBMS 490 are not critical to practicing the invention. Nonetheless, certain descriptions herein refer to examples that are implemented for a DBMS available from ORACLE® CORPORATION, such as ORACLE® 11 gR1, which are intended to be illustrative and instructive examples, and are not necessary to practice the invention.

Certain embodiments of data recovery advisor 400 include a diagnostic procedure 441A that verifies the integrity of database files and reports failures if these files are inaccessible, corrupt or inconsistent. An example of diagnostic procedure 441A is a database integrity check procedure for a database management system available from ORACLE®. Such a database integrity check procedure may check if a control file exists for database 491, and if so open the control file and check for physical-level corruption, e.g. whether or not a newly-computed checksum matches a checksum retrieved from storage. The database integrity check procedure also checks the relationship of the control file with other files, e.g. when other files were last updated relative to the control file.

In one illustrative example, a sequence number associated with the control file is checked against a corresponding sequence number of a data file, to ensure both files have the same sequence number. If the two sequence numbers from the control file and the data file are different, then an appropriate failure is generated, e.g. control file too old or data file too old. An example of a sequence number is a system change number or SCN in a database accessed with the database management system ORACLE® 11 gR1. Some embodiments also check for version compatibility, e.g. that the current version number as identified by database 491 is same as or greater than a version number within a header in the file being checked (at a predetermined location therein).

A database integrity check procedure may also perform additional checks (similar to the just-discussed checks for the control file) on each file that is identified within control file. For example, DRA may check for the existence of every datafile that is identified in the control file. Moreover, DRA may verify that the header information recorded in the datafiles match the corresponding information recorded for those files within the control file.

Several embodiments of the data recovery advisor 400 include another diagnostic procedure 441B to check for integrity of data blocks. In an example, diagnostic procedure 441B detects corruptions in the disk image of a block, such as checksum failures, checks for the presence of predetermined numbers (constants), and whether block number matches that block's actual offset from the beginning of the file. Most corruptions in the example can be repaired using a Block Media Recovery (BMR) function of the type supported by a DBMS from ORACLE®. In the just-described example, corrupted block information is also captured in a database view. Note that diagnostic procedure 441B of some embodiments responds to the finding of a failure by checking if other related failures exist. For example, in some embodiments, diagnostic procedure 441B, on finding one block corruption in a file, proceeds to check if there are additional block corruptions in the same file within a predetermined address range around the corrupted block (e.g. within 10 MB on either side of the corrupted block). Diagnostic procedure 441B may also be programmed to similarly sample a few blocks in other files on the same disk to further check for block corruption.

Certain embodiments of the data recovery advisor 400 include yet another diagnostic procedure 441C to check for integrity of a file that holds information needed for recovery from a problem in database 491. This diagnostic procedure 441C looks for the file's accessibility and corruption and reports any issues. In an illustrative example, diagnostic procedure 441C checks files for redo logs maintained by a DBMS from ORACLE®, as well as the files for archive logs, if available. In the just-described example, diagnostic procedure 441C reports failures in, for example, archive log and/or redo log.

Figure 4C:
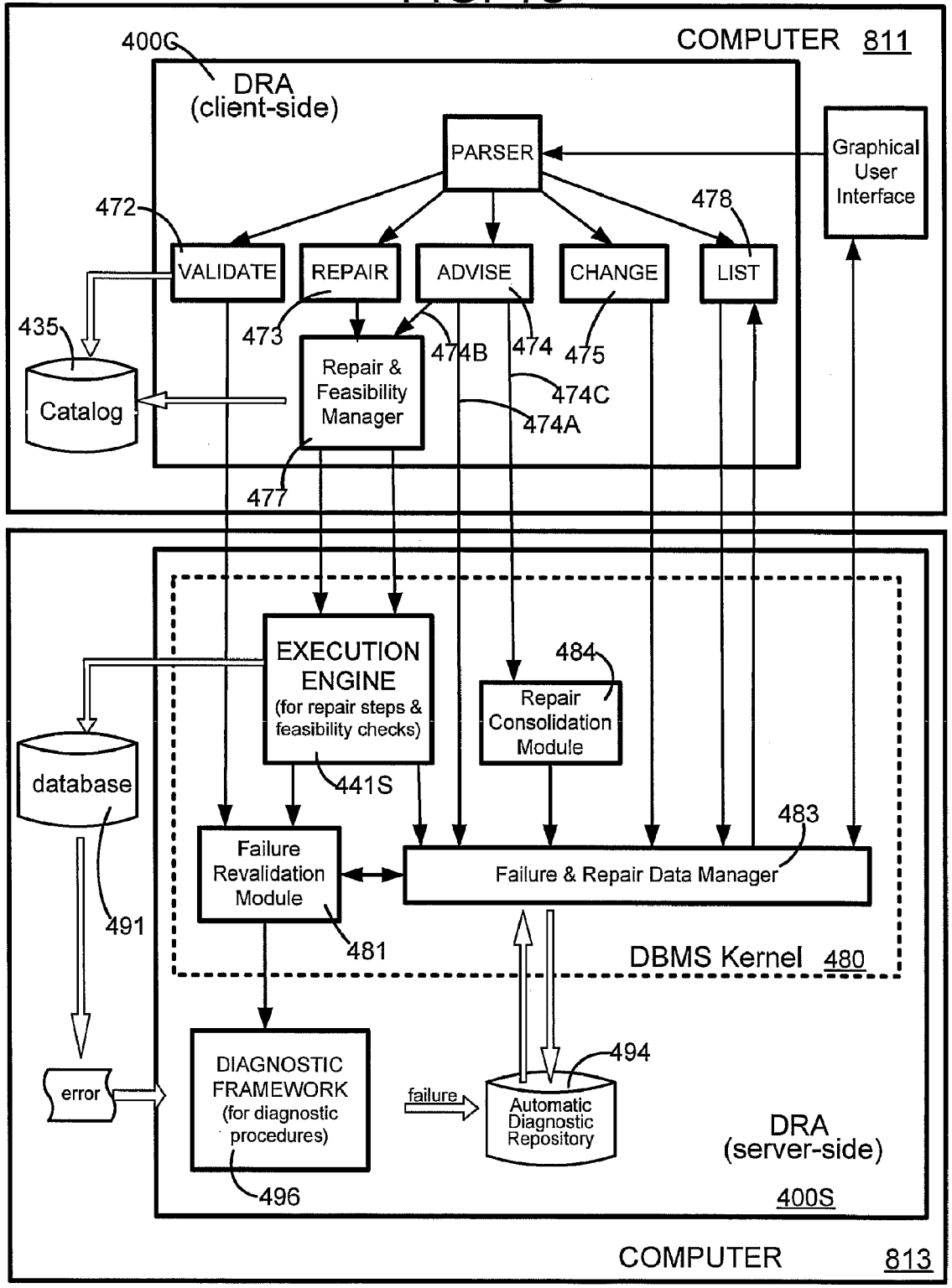
FIG. 4C illustrates, in a block diagram, various components that are used to implement two portions, namely a server-side portion and a client-side portion of the data recovery advisor (DRA) of FIG. 4A.

Furthermore, in some embodiments, when a diagnostic procedure completes execution, failures that are newly identified are aggregated if appropriate, with one or more failures 493 that are preexisting in failure repository 494, by a diagnostic framework 496 (FIG. 4C). Prior to aggregation, a preexisting failure in repository 494 that is to be aggregated is revalidated, taking into account any dependencies of the failure. For example, for a database that is maintained by a DBMS from ORACLE®, corruption of a data file is only relevant if that data file is a part of the database. Hence, revalidation checks that the data file's entry is present in a control file of database 491, but if it's not then the failure (about this data file) is closed.

After a diagnostic procedure completes execution, diagnostic framework 496 (FIG. 4C) performs an impact analysis, for example, to identify one or more objects in database 491 that are unavailable due to the newly identified failure(s). Specifically, in some embodiments, impact of failures is assessed to identify what, if any, user-defined objects are affected, e.g. to identify in database 491, a table to which a corrupted data block belongs. The table may be identified from lookup table 19 or an off-line dictionary 14 in (FIGS. 1A, 1B) which is deliberately stored outside of database 491, to ensure that the dictionary is available in the event that database 491 is unavailable. In some embodiments, a diagnostic procedure 441A (rather than framework 496) includes functionality to perform impact analysis for the failures that it diagnoses, and information about impact is stored in the failure repository 494, in association with the failure being stored therein.

Also, in the embodiment of FIG. 4A, data recovery advisor 400 uses a second map 460 (also stored in memory 806 of computer system 800) with a failure's type in act 406, to identify multiple repair types. As noted above, the multiple repair types are alternatives to one another. Each repair type has a static association in map 460 with multiple templates, and one of the templates is selected and instantiated to create a repair (if feasible) in a given repair plan. Hence, the second map 460 is used in act 406A of certain embodiments, to create multiple repair plans 481, 482 that are alternatives to one another. Accordingly, the same failures are fixed by each of plans 481 and 482, which plans are alternatives to one another. After display of repair plans 481 and 482 (in act 407) to the user (who's a DBA), a selected repair plan (e.g. plan 481) is received in act 408, followed by execution of the selected repair plan in act 409. Corrected data resulting from execution of such repairs is stored in memory in act 410 followed by updating the database 491, thereby to eliminate the errors that triggered act 401 (diagnosis of failures).

In a DRA for a database, the failure groups are ordered sequentially according to the sequence of state transitions that the database makes, e.g. from a "mounted" state to a "recovery" state to an "open" state. Correspondingly, in such embodiments, failures that prevent mounting the database and belong to the "mount" group are repaired before failures that belong to the "open" group and prevent opening of the database. See FIG. 4B. However, the database can be neither mounted nor open if the database's files are not accessible from a non-volatile storage medium on which they are persistently stored. Therefore, failures that prevent file access (e.g. network or disk problems) are fixed before any other failures. Thus these three failure groups are processed in a relative priority (FIG. 4B): Access, Mount, Recovery, Open.

As described earlier, there are many dependencies. In view of the above-described dependencies, data recovery advisor 400 of several database embodiments uses five groups 401-406 of failure types as illustrated in FIG. 4B. Examples of database failures in mount group 302 are that control information is (a) missing or (b) corrupt or (c) old (relative to another file of database 491 such as a data file used by the DBMS for system data). Group 404 is arranged within a relative priority (FIG. 4B) immediately below group 402 Group 402 has higher priority than Group 404. Fixing failures in Group 404 requires certain information including unique identifiers (such as a file name and path name within the computer, or alternatively a uniform resource locator (URL)) of files of database 491. Without the information from storage structures accessible through 402, such as a control file for a DBMS from ORACLE® Corporation, it may not be possible to even identify which files belong to database 491 as needed to fix failures in Group 404. Identity of files in database 491 is needed, for example, to revalidate certain failures, e.g. if a data file is missing. Hence, failures related to control information in group 402 need to be fixed before any other failures of database 491 are fixed, but after group 401 failures outside of database 491 are fixed.

Note that the number of groups and what is within each group is very specific to the system that is to be repaired. The following sections give some examples of the failure groups used by a DRA for the Oracle database. There is no significance to the naming of the groups. The names are selected for easy reference to the DRA implementation for the Oracle database.

Referring to FIG. 4B, group 404 is for database failures related to recovery information for database 491, such as a redo log for a DBMS from ORACLE®. Examples of database failures in group 404 are that recovery information is (a) missing or (b) corrupt or (c) old (relative to another file of database 401). Recovery group 404 is arranged within relative priority (FIG. 4B) above open group 403 because recovery information is necessary in order to perform repairs of certain failures that prevent opening the database 491.

Also, map 498 (FIG. 4B) for a database embodiment further includes a floating group 405 for failures whose repairs depend only on Access group 401, and for this reason data recovery advisor 400 is programmed to include as many of these repairs as can be added to any repair plan for groups 402-404, e.g. during consolidation in act 406A. Examples of failures in floating group 406 for a database embodiment include a failure in a file which has an identical copy immediately available in computer system 800, such as a file that is a log member (e.g. redo logs for a DBMS from ORACLE)). The missing file can be restored at any time (assuming it is accessible), because the DBMS can continue to operate using the identical copy which is available.

In some embodiments, map 195 (FIGS. 1A-1C) associates each failure type with multiple repairs (as per act 421 in FIG. 4D), based on repair types that are mapped to the failure type in a predetermined map. In one example, a failure is that a block is corrupt, then the following three repairs are possible (in a database accessible through a DBMS from ORACLE®) as follows: (a) block media recovery (BMR) which recovers that particular block from backup; (b) data file restore and recover, which replaces the entire data file which contains the corrupted block; and (c) database restore and recover which replaces all files of database 491. Accordingly, these three repairs are associated with the block corrupt failure type in the following specific order (a), (b), and (c), to minimize the amount of work to be done if each of them is feasible, for example. The next step that is done in such embodiments is simple consolidation for all repairs of failures within a group (as per act 422 in FIG. 4D), wherein for each failure the very first repair which is feasible is selected (as per act 423). Accordingly, multiple repairs of a number of objects (such as blocks of a file or files of a database) can be replaced with a single repair of a higher level object (such as the file, or the database respectively) within which the number of objects are contained, if the single repair is faster.

Simple consolidation (as per act 423) assists data recovery advisor 400 of some embodiments to rapidly determine (as per act 424), whether there are loss-less repairs for the failures to be fixed, or if a data loss repair needs to be done to fix one of them (even though loss-less repair is the goal). Further to the above-described example in the previous paragraph, if another failure is that a redo log group is unavailable, then the following two repairs are possible (in a database accessible through a DBMS from ORACLE®) as follows: (a) restore the redo log from somewhere else; (b) database restore and recover up until the missing redo which loses some data. Accordingly, these two repairs are associated with the redo log group unavailable failure type in the following specific order (a), and (b), so that the loss-less repair (a) has higher priority than the data loss repair (b) if each is feasible. Hence, if a selected repair is a data loss repair then it means that there exists no loss-less repair that is feasible, for the given failure type.

Accordingly, in some embodiments, a failure may require a feasible repair that may render redundant other repairs for other failures. As another example, block corruption repairs are made redundant (1) by a full database restore and recover repair, and also (2) by a full database restore and recover to a previous point-in-time (i.e. database point-in-time recovery). Accordingly, as per act 425, data recovery advisor 400 of some embodiments eliminates redundant repairs, and returns to act 422 to check if all repairs have been processed. If the result of act 422 is yes, then the repair plan is output, e.g. written to a repository 494, and eventually displayed to a database administrator via a graphical user interface GUI) on display 812 (FIG. 8).

Note that in some embodiments, simple consolidation of the type described above is performed in creating a repair plan for only certain groups, i.e. not all groups. For example, for a database accessible through a DBMS from ORACLE®, simple consolidation is not used to generate a repair plan for repairs of failures in access group 301 and in control group 304 (see FIG. 4B). The repairs are arranged in the repair plan in an appropriate sequence, which in some cases may be based on a temporal order in which the failures were created in repository 492 while in other cases the repairs are automatically re-arranged relative to one another, to make the repair plan as a whole comply with a predetermined set of rules on the sequence.

In certain embodiments when more than a predetermined number (e.g. 1000) of block media repairs need to be done for a single file, they are consolidated into the single data file's restore and recover. Moreover, in the just-described embodiments, since the final outcome of this consolidation is a data file restore and recover, this consolidation is performed prior to the data file consolidation described in the previous paragraph.

Referring to FIG. 4A, data recovery advisor 400 of some embodiments consolidates repairs (see act 406A), based on impact. For example repairs whose impact creates no data loss are all consolidated into a single repair plan. Also in act 406A, data recovery advisor 400 identifies specific user objects that are impacted by repair, and such impacts are displayed to the human user (who's a DBA) in act 407. An example of identifying a specific object in displaying impact in act 407 is "The Employee table will be offlined".

Although in some embodiments groupings of failures are used to create repairs that are included in a repair plan, in other embodiments such groups are not used. For example, a repair template is associated in certain embodiments with a specific failure type only and with none others, in which case a repair is created (by instantiating the template) at the same time as the failure to which it corresponds. Therefore in some embodiments, repairs are uniquely associated with specific failures for which they were created, without reference to groups of the type illustrated in FIG. 4B.

Data repair advisor 400 of some embodiments is implemented in multiple computers in some embodiments according to a client-server model. In such embodiments, data repair advisor 400 includes at least two portions, namely client side software 400C and server side software 400S (see FIG. 4C). Client side software 400C (also called "client-side DRA") which interfaces with a human (i.e. a DBA) to provide a display of detailed information on failures and alternative repairs, for use by the human in making informed decisions. Specifically, client-side DRA 400C responds to commands received from a DBA, either through a command line prompt (see FIG. 7A) or via a graphical user interface (see FIG. 5A). For example, the database management system "ORACLE® 11gR1" supports a command line prompt via a Recovery Manager (RMAN), and a graphical user interface via an Enterprise Manager (EM) both of which are used to implement a client-side DRA.

Client-side DRA 400C of some embodiments also manages the generation, feasibility checking, and execution of certain repairs. In several embodiments, client-side DRA 400C interfaces to a catalog 435 which contains information on which portions of database 491 have been backed up, into which backup files, and information about a storage medium (e.g. tape) that contains the backup files. Note that catalog 435 is physically included in a computer 811 (see FIG. 8) that executes client side software 400C. In addition, another computer 813 executes server side software 400S that works with client-side DRA 400C to recognize and repair data failures in database 291.

Server side software 400S (also called "server-side DRA") includes software (called "diagnostic framework" 496) which receives errors that are generated by a database management system (DBMS) in computer 813 while accessing database 491, and responds by running one or more diagnostic procedures as necessary. Diagnostic framework 496 stores any failure that is identified by the diagnostic procedures it executes, into repository 494 and in doing so, aggregates failures if appropriate, by creating or updating a parent failure. Diagnostic framework 496 may also not store a failure into repository 494, if that failure has already previously been stored therein.

Accordingly, diagnostic framework 496 avoids storing duplicate failures in some embodiments of repository 494, whereas other embodiments do store duplicate failures which are marked as such in repository 494. In some embodiments, a portion of a diagnostic procedure is re-executed by diagnostic framework 496 to revalidate stored failures prior to usage (e.g. to display them to the DBA and/or use them to generate repairs). Hence, server-side DRA 400C also includes a failure revalidation module 481 that triggers execution of the revalidation software by diagnostic framework 496 appropriately as described herein. One example of repository 494 is an automatic diagnostic repository (ADR) which is supported by the database management system "ORACLE® 11gR1".

Client-side DRA 400C of some embodiments includes a parser (not labeled) that parses a user's input and invokes one of several functional components, which are implemented as individual drivers for each of the following commands: LIST command 476, CHANGE command 475, ADVISE command 474, REPAIR command 473 and VALIDATE command 472. Specifically, the driver for LIST command 476 interacts with software (called failure & repair data manager) 483 (which is included in server-side DRA 400S) and provides an interface to repository 494 that holds failures. Accordingly, the driver for LIST command 476 is able to instruct server-side DRA 400S to prepare a list of one or more failures that are currently present in repository 494. The list of failures which is generated by server-side DRA may be limited, based on information supplied by LIST command 476, e.g. to only critical failures or only to failures related to a specific component of database 491.

Similarly, other above-described commands are also supported by failure & repair data manager 483. For example, arrow 474A illustrates support to the ADVISE command 474 provided by failure & repair data manager 483 in response to one or more failures selected to be fixed (e.g. by the DBA). Failure & repair data manager 483 responds with repairs (including steps and descriptions) to fix the identified failure(s) which are then displayed by client-side DRA 400C to the DBA. Thereafter, for each repair, the driver for ADVISE command 474 invokes (as shown by arrow 474B) certain software (called "repair and feasibility manager") 477 that is included in client-side DRA 400C to check feasibility of the proposed repair.

Note that in some embodiments, repair and feasibility manager 477 optimizes performance of multiple feasibility checks that involve the same database object, by performing one feasibility check for that database object and then copying the result for the remaining feasibility checks. For example if one repair is 'BMR on datafile 5 block 10' wherein BMR is an abbreviation for block media recovery which is a command supported by a DBMS from ORACLE®, and another repair is 'BMR on datafile 5 block 11', then repair and feasibility manager 477 performs a single check for feasibility of BMR on datafile 5, and then marks both repairs with the same result.

When a repair is found to be feasible, the driver for ADVISE command 474 invokes software in server-side DRA 400S called "repair consolidation module" 484, as shown by arrow 474C. Repair consolidation module 484 in turn consolidates repairs that are to be included in a repair plan and stores them in repository 494 which thereafter supplies the repairs back to client computer 811 for display to the DBA, e.g. via the graphical user interface. Repairs selected by the DBA are processed by the driver for the REPAIR command 473, which supplies the repair for execution to repair and feasibility manager 477.

Repair and feasibility manager 477 is responsive to repairs, and if invoked by the driver for the ADVISE command performs feasibility checks that can be performed locally within client computer 811 to confirm that the repair is feasible (e.g. checks if the file needed for repair is present in catalog 435). Specifically, repair and feasibility manager 477 checks if any backup files needed for the repair are identified in catalog 435. Repairs may also be supplied to repair and feasibility manager 477 by a driver for REPAIR command 273, in which case the corresponding repair steps are executed (either locally in computer 811 or remotely in server computer 813). For any repairs whose feasibility cannot be checked, or which cannot be executed locally within client computer 811 repair and feasibility manager 477 supplies the repairs to certain software within server-side DRA 400S called "execution engine" 441S.

Execution engine 441S (FIG. 4C) initiates feasibility checks with server computer 813 to see if a repair (specified by repair ID) is feasible. Execution engine 441S supplies the results of feasibility checking to software (called failure & repair data manager) 483, and in certain embodiments the results are stored in volatile memory while other embodiments store the results in repository 494. Note that execution engine 441S also executes repair steps, by performing various transactions on database 291. Additionally, server-side DRA 400S also includes software (called repair consolidation module) 484 that retrieves all feasible repairs (from memory or from repository as appropriate, depending on the embodiment) to consolidate them to create one or more repair plans (as per acts 358 and 406A described above in reference to FIGS. 3D and 4A respectively). In creating repair plans, repair consolidation module 484 implements use of groups of failures (as per FIG. 4B) to identify the failures to be fixed in a current iteration.

Diagnostic framework 496 is implemented in a modular manner in some embodiments of the invention, to enable a human developer of server-side DRA 400S to specify an error and its corresponding diagnostic procedure, in a set of source code files that is compiled into maps and data structures that are accessible by DRA at runtime. This simplifies the process of preparing and maintaining server-side software 400S. Note that multiple errors can be specified for diagnosis using the same diagnostic procedure.

The specific manner in which data repair advisor 400 is compiled into an executable (software and data separated into individual files or data hardcoded into and interspersed within software) relates to implementation details that change depending on the embodiment, and are not important to practicing the invention. Also not important to practicing the invention are details about the language in which data repair advisor 400 is written (e.g. as macro calls or as C language function calls).

In some embodiments, a repair plan that is created by repair consolidation module 484 is modified by client-side DRA 400C as may be necessary prior to execution. For example, if a data file is to be restored or recovered from backup, a repair manager (RMAN) in a database management system available from ORACLE® may be designed to automatically include an initial command to offline the data file prior to the repair, a command to perform the repair, followed by a final command to online the data file.

Figure 5A:
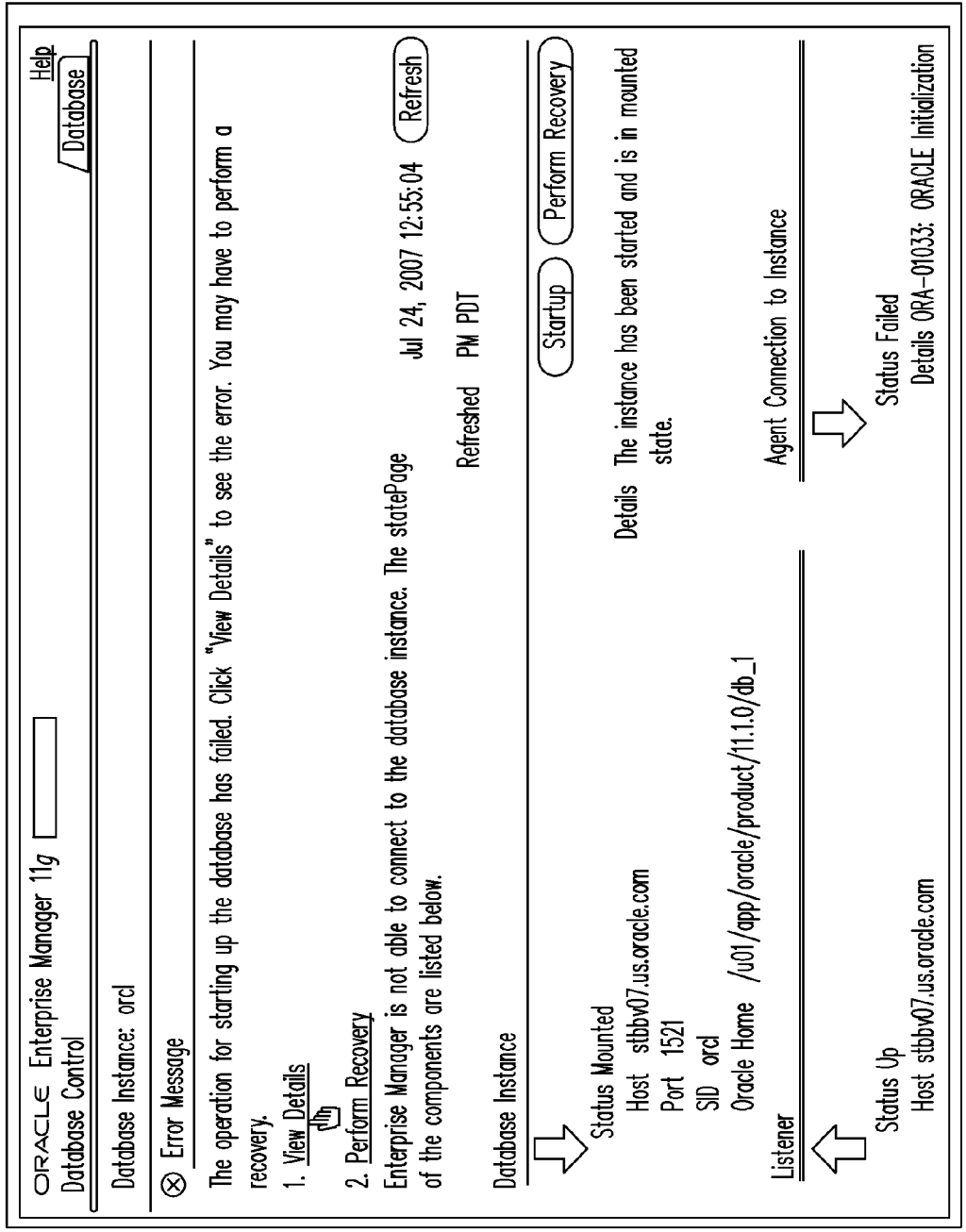
FIGS. 5A-5P illustrate screens of a graphical user interface that are used by a database administrator to interact with the data recovery advisor of FIG. 4A to identify and correct exemplary failures in an illustrative embodiment of the invention. Note that in FIG. 5M of an alternative embodiment, the text after " . . . generated recovery advice of: "is made more descriptive, to says "The repair includes media recovery with no data loss" instead of just "NO DATALOSS" as shown in FIG. 5M.
Figure 5B:
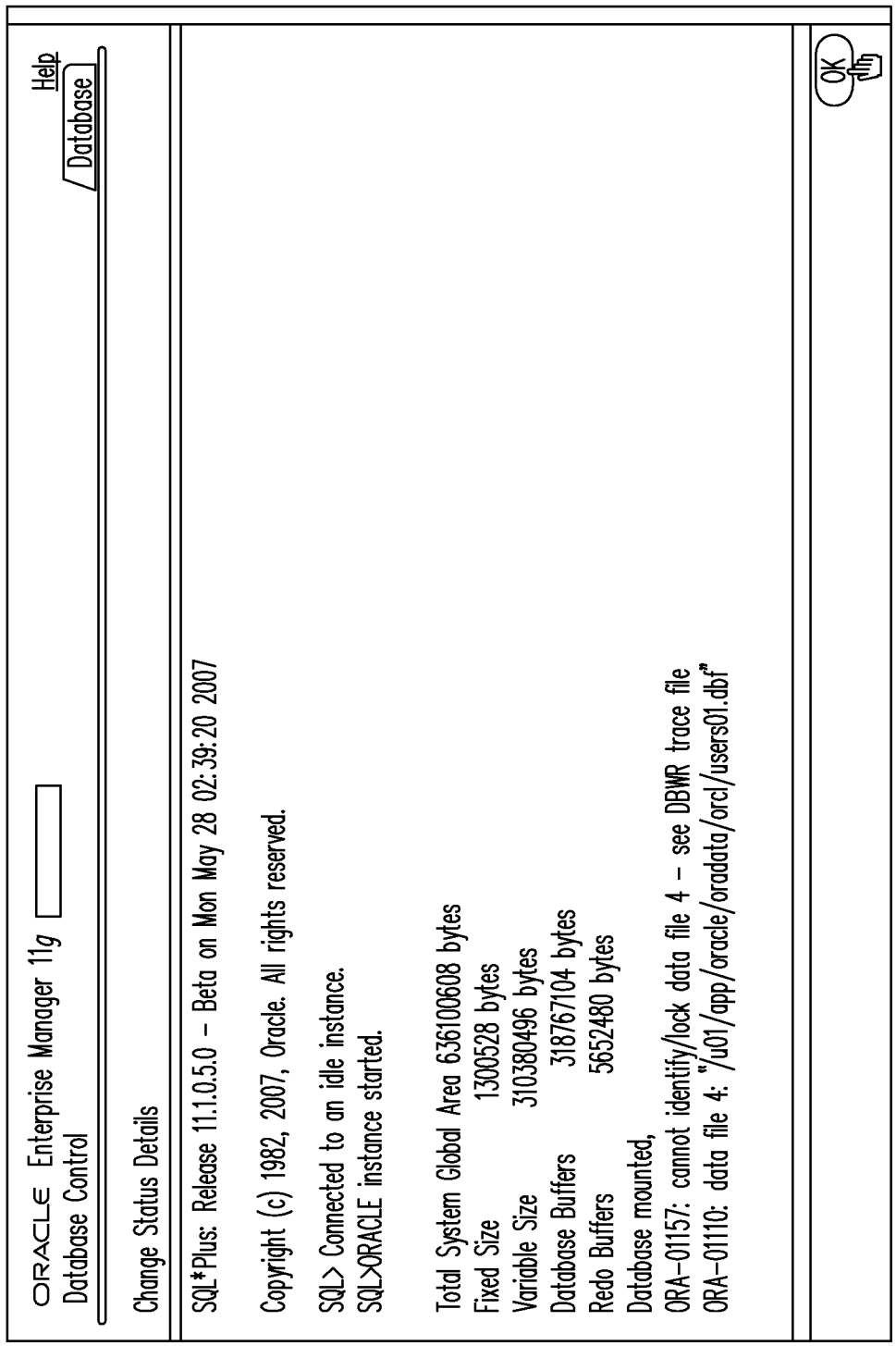
Figure 5C:
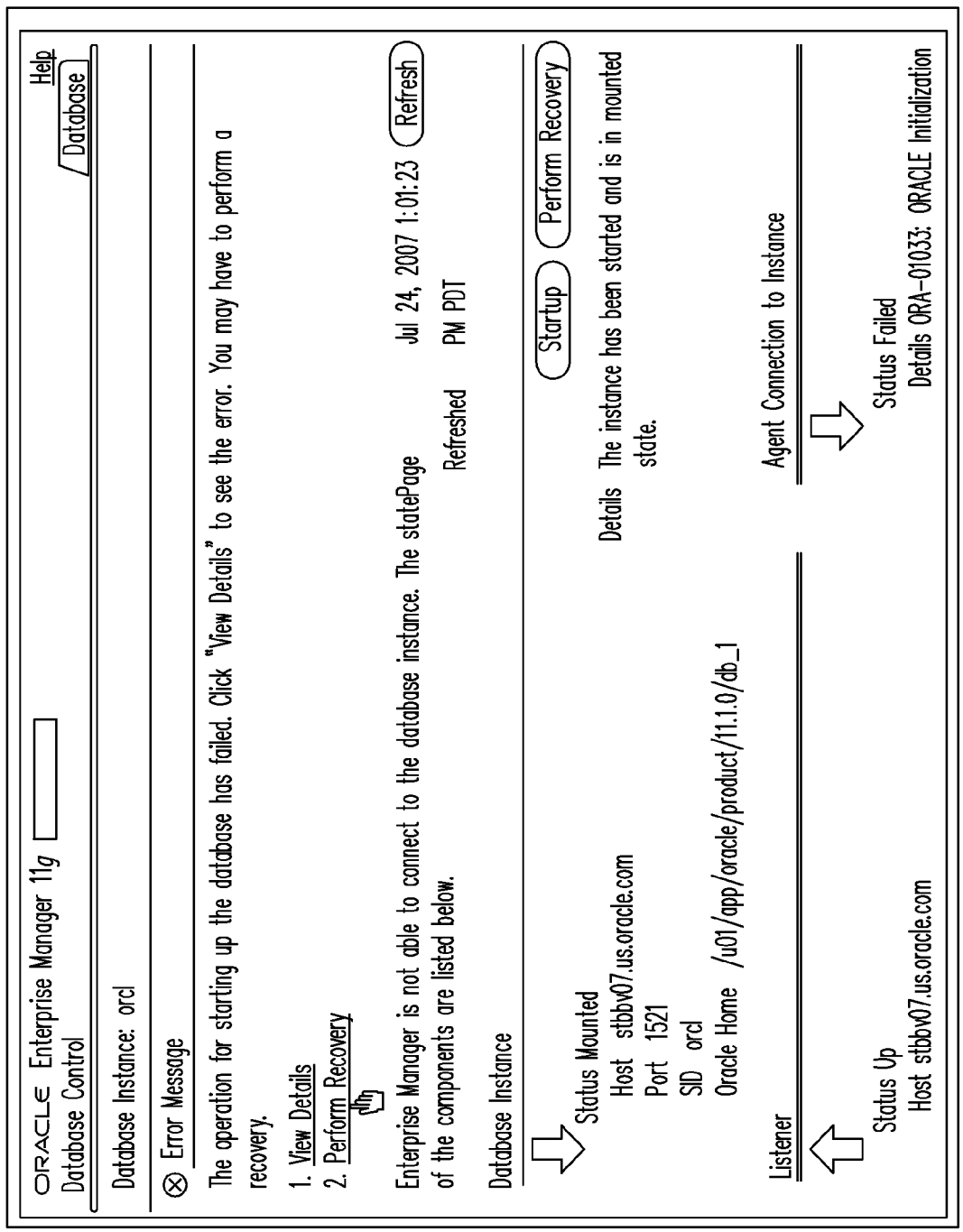
Figure 5D:
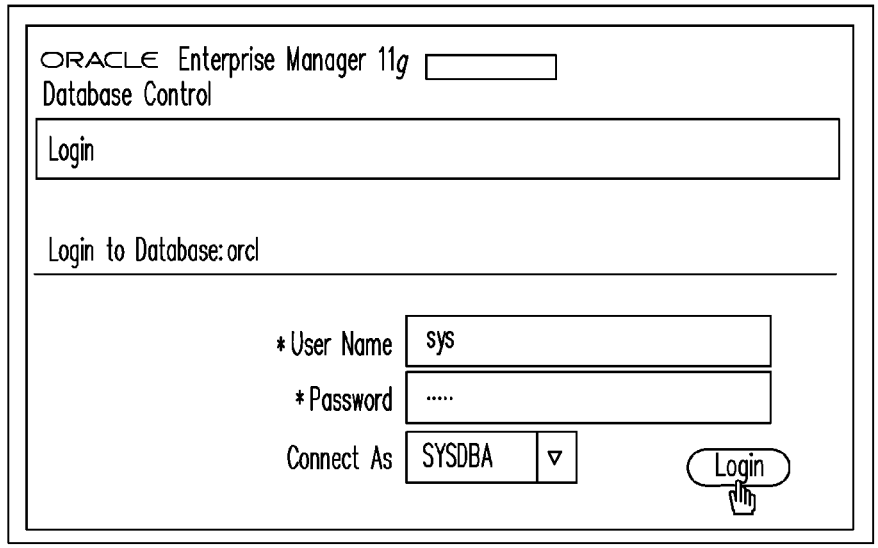

Use of a data repair advisor to fix a failure is now described in reference to FIGS. 5A-5P which illustrate screens that are displayed to a DBA in some embodiments (whereby the screens are generated by Enterprise Manager in a database management system available from ORACLE®). Specifically, in these embodiments, after an error occurs, the DBA may view the screen of FIG. 5A, which shows the error message 'The operation for starting up the database has failed. Click "View Details" to see the error. You may have to perform a recovery.' In response, the DBA may click on the View Details hyperlink as shown in FIG. 5A, which results in display of the screen illustrated in FIG. 5B. After reviewing status details and error messages (such as " . . . cannot identify/lock data file 4."), the user clicks the OK button at the bottom right corner of this screen. In response, the DBA is shown the screen illustrated in FIG. 5C, wherein the DBA may click on the "Perform Recovery" hyper link. After doing so, the DBA is shown the screen of FIG. 5D, wherein they must enter their user name and password.

Figure 5H:
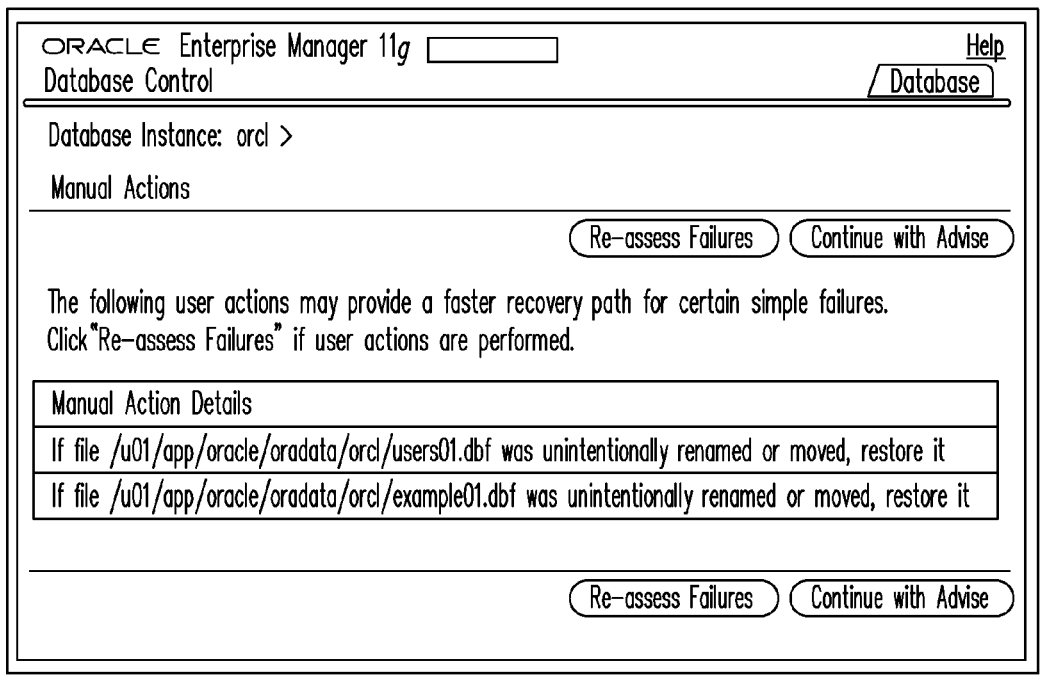
Figure 5E:
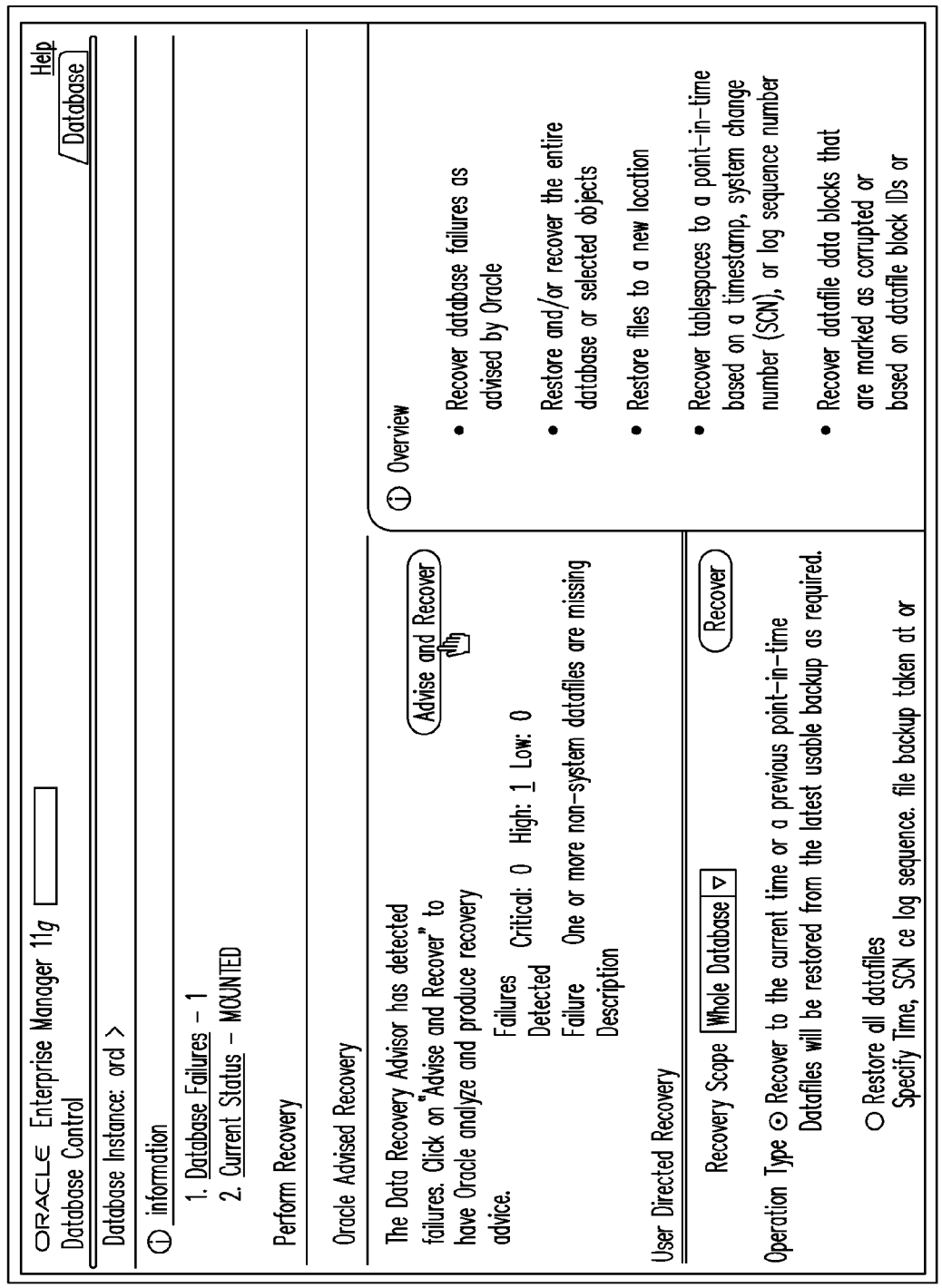
Figure 5F:
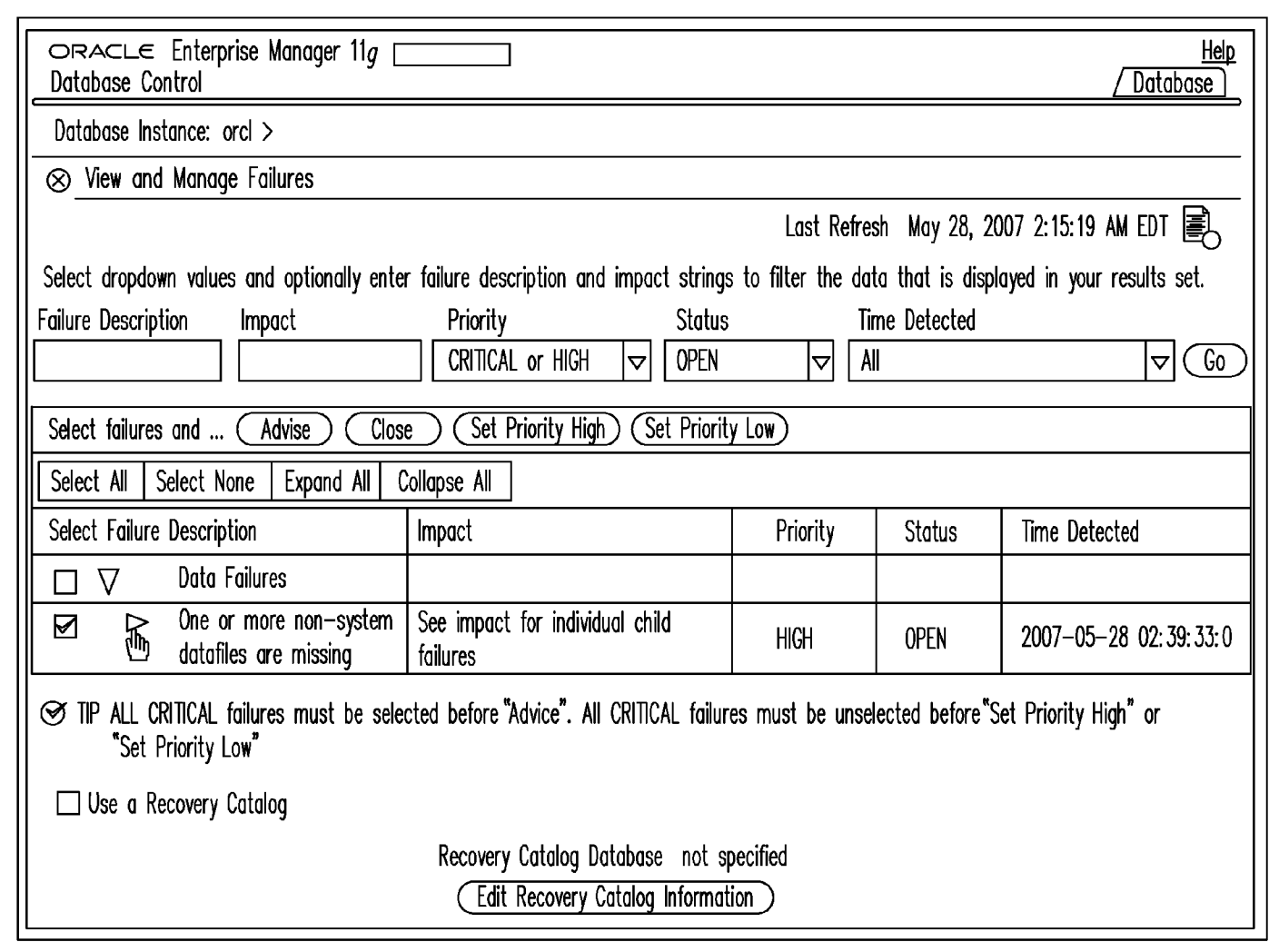

Thereafter, the screen of FIG. 5E is displayed, showing that a high priority failure has been diagnosed by data repair advisor 200. The DBA is prompted to click on the "Advise and Recover" button, and on doing so the screen of FIG. 5F is displayed. Note that the failure is described as "One or more non-system data files are missing." This is an aggregate failure, and accordingly the DBA may click on a "+" icon under the Failure Description to request a detailed display of the individual failures. On doing so, the screen of FIG. 5G is displayed, wherein three failures are all identified as being of high priority. To view the repair strategy recommended by data repair advisor 200, the DBA must click on the "Advise" button.

Figure 5I:
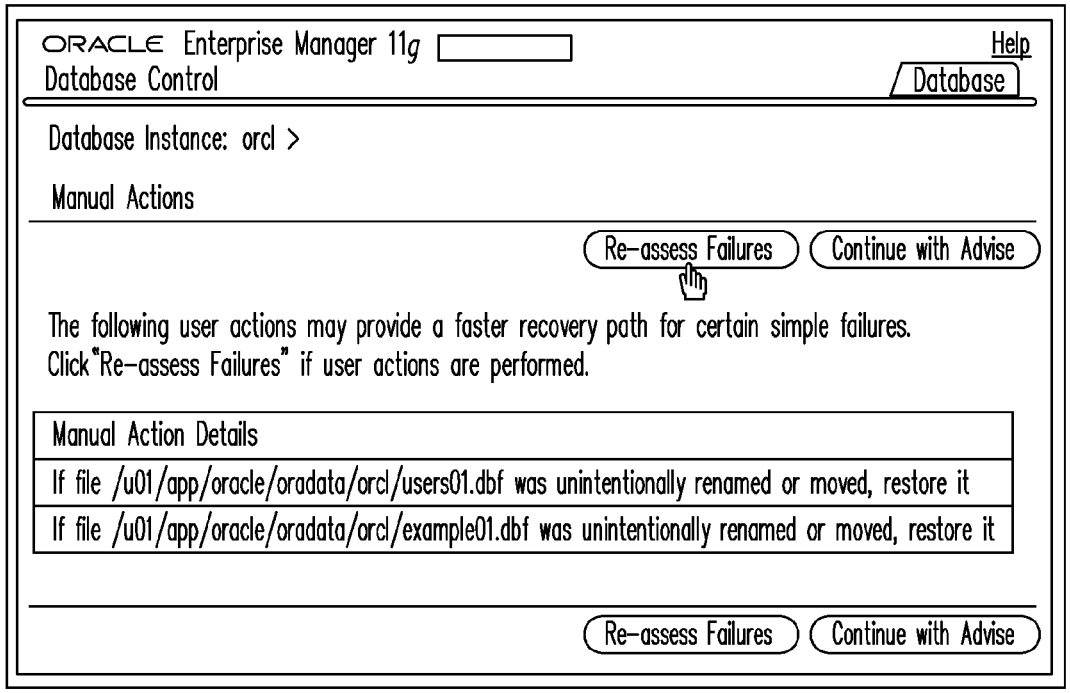

On clicking the "Advise" button, the data repair advisor 200 displays (as per FIG. 5H) two recommendations for repair, both of which ask the DBA to consider manual repairs. Specifically, two files are to be renamed as specified in FIG. 5H. In this example, assume the DBA does the requested changes manually, and returns to the screen display as per FIG. 5I. At this stage the DBA may click on the Re-assess Failures button, to see if the manual operations were sufficient. On doing so, data repair advisor 200 revalidates all failures and closes any failure that has been repaired. Thereafter, the screen of FIG. 5J is displayed, and the DBA may once again click on the + icon to view details of the aggregated failure, which are shown in FIG. 5K.

Figure 5L:
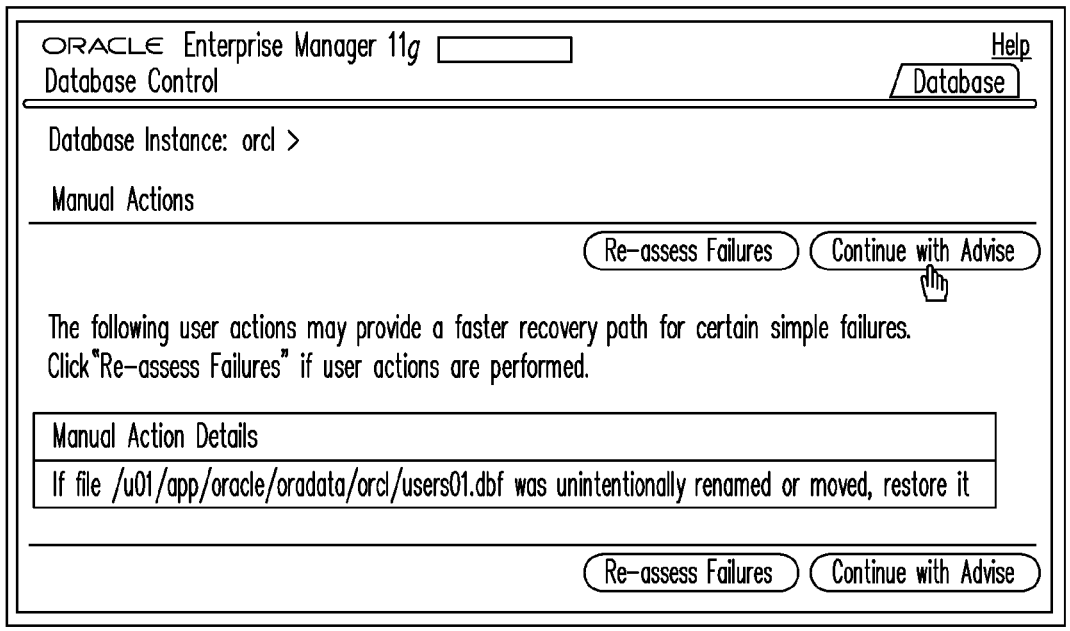
Figure 5M:
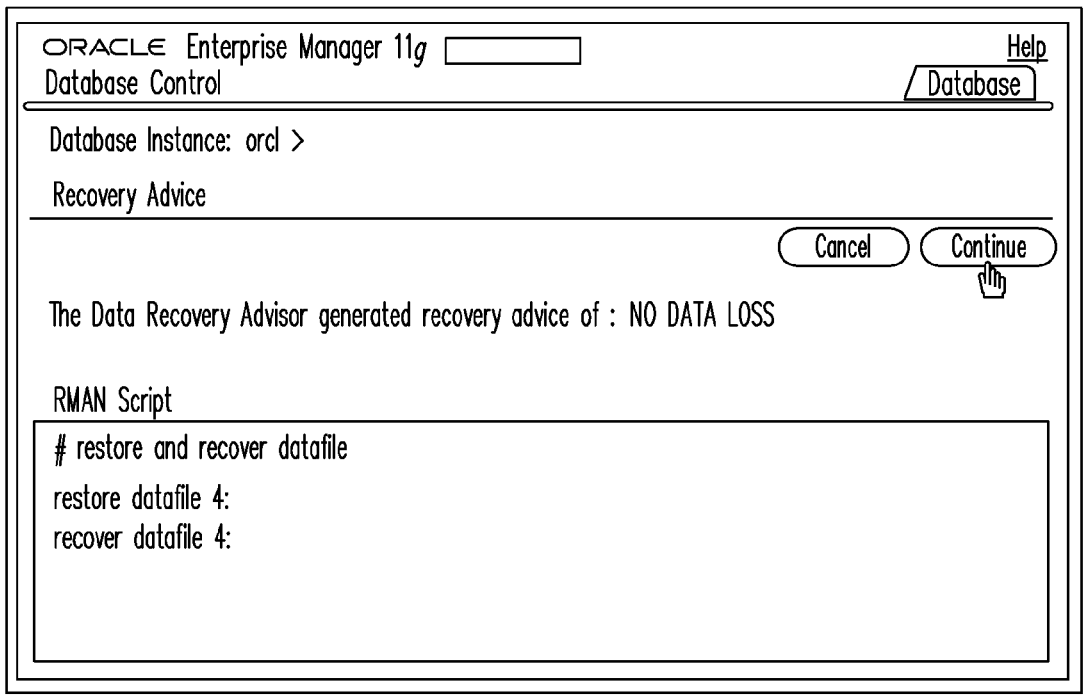

In the screen of FIG. 5K, the DBA may one again click on the "Advise" button and on doing so, the screen shown in FIG. 5L is displayed. Another file needs to be renamed or moved manually, as per FIG. 5L. Here, assume the user does not wish to do this task manually, then they may click on the "Continue with Advise" button, in which case the screen of FIG. 5M is displayed. As shown in FIG. 5M, data repair advisor 200 has generated an RMAN script. The DBA may click on the "Continue" button in FIG. 5M which causes the screen of FIG. 5N to be displayed.

As shown in FIG. 5N, the user may review the script to be executed, and its impact and if acceptable, click on the "Submit Recovery job" button. On doing so, data repair advisor 200 waits for repair script to execute and then displays the results as per FIGS. 5O and 5P. At this stage, as the repair was successful, the database has been opened. The DBA may next click the "OK" button (in the screen of FIG. 5P) and on doing so they are prompted to log into the Enterprise Manager. The DBA may then proceed with use of the Enterprise Manager in the normal manner, because the database has started operating with no errors, at this stage.

Figure 6D:
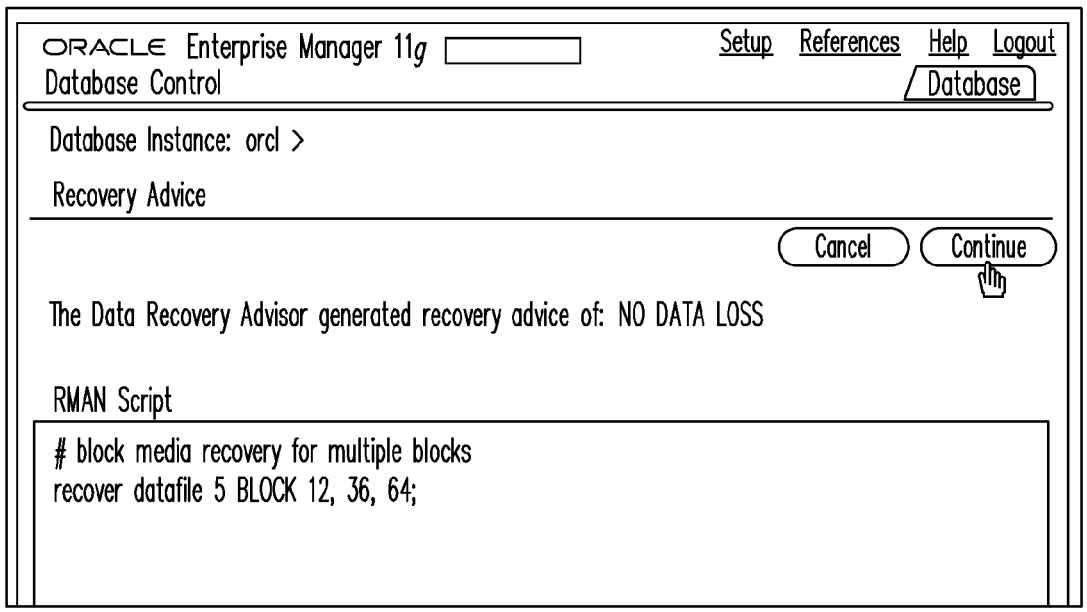
Figure 6A:
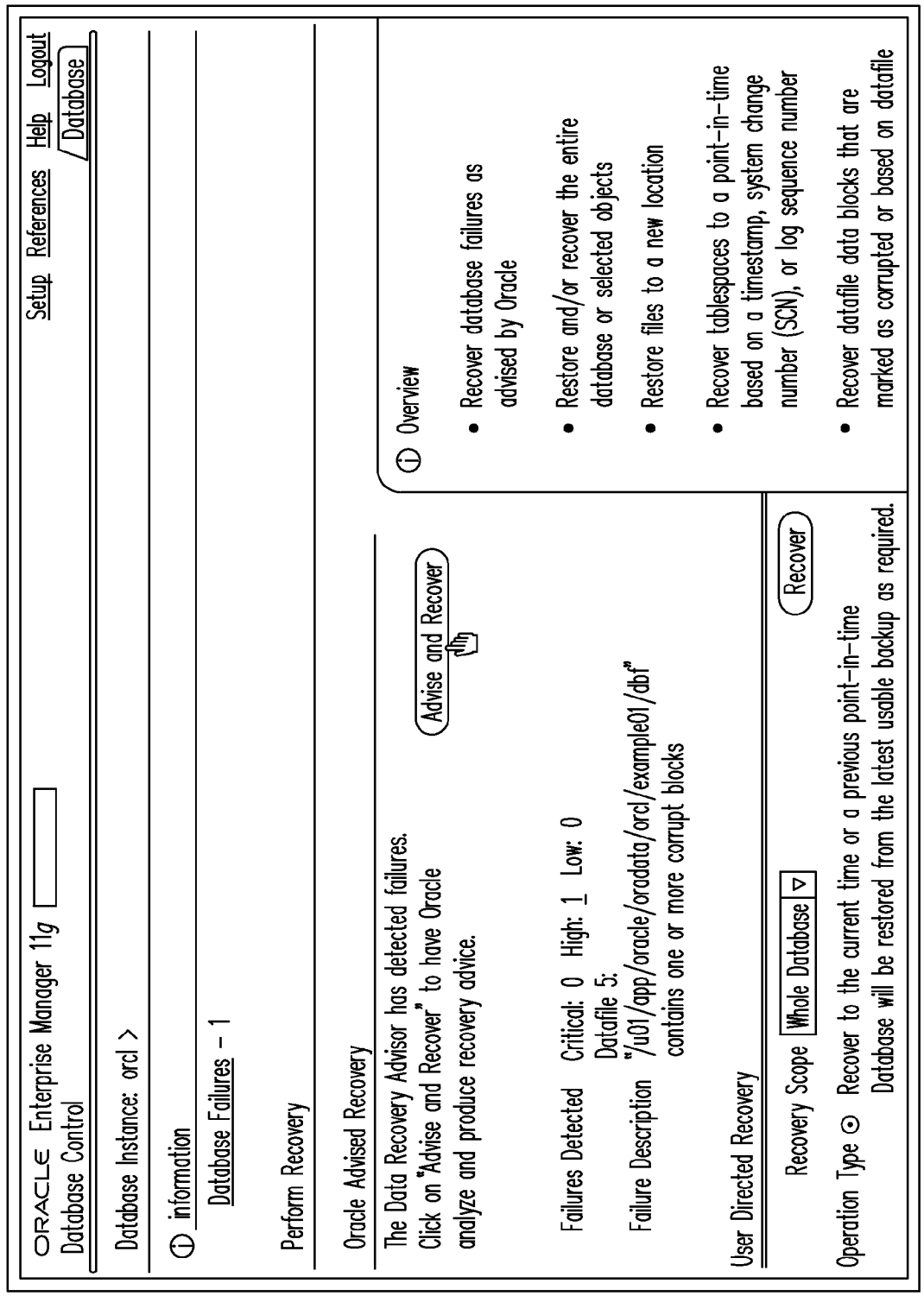
Figure 6B:
Figure 6C:
Figure 6F:

FIGS. 6A-6H illustrate screens for an example in which the DBA uses data repair advisor 200 to diagnose and repair block corruption. Specifically, FIG. 6A is similar to FIG. 5E described above, except that the failure in FIG. 6A is for one or more corrupt blocks. In this screen, the DBA may click on the "advise and repair" button as noted above, and on doing so the screen of FIG. 6B is displayed and clicking the + icon here displays the individual failures as shown in FIG. 6C. The DBA again clicks on the "Advise" button, resulting in the display of the RMAN script illustrated in FIG. 6D. On clicking the "continue" button, the repairs are displayed, with the impact of each repair, as shown in the screen of FIG. 6E. On clicking the "submit recovery job", the screen of FIG. 6F is displayed. After the job has executed, the DBA may click on the "View Results" button in FIG. 6F to see the job's successful completion in the screen of FIG. 6G. Finally, FIG. 6H illustrates use of a sql query by the DBA to confirm that the block corruption has been repaired.

FIGS. 7A-7G illustrate the above-described example in reference to FIGS. 5A-5P, except that in FIGS. 7A-7G the DBA uses data repair advisor 200 via the RMAN command prompt.

Data recovery advisor 200 may be implemented in some embodiments by use of a computer (e.g. an IBM PC) or workstation (e.g. Sun Ultra 20) that is programmed with an application server, of the type available from Oracle Corporation of Redwood Shores, Calif. One or more such computer(s) 811, 813 can be implemented by use of hardware that forms a computer system 800 as illustrated in FIG. 8. Specifically, computer system 800 includes a bus 802 (FIG. 8) or other communication mechanism for communicating information, and a processor 804 coupled with bus 802 for processing information. Each of computers 811, 813 includes a processor, e.g. computer 811 includes processor 803 while computer 813 includes another processor (not shown). Moreover, computers 811 and 813 are coupled to one another by any transmission medium that transfers information therebetween, such as a local area network or a wide area network.

Computer system 800 also includes a main memory 806, such as a random access memory (RAM) or other dynamic storage device, coupled to bus 802 for storing information and instructions to be executed by processor 803. Main memory 806 also may be used for storing temporary variables or other intermediate information during execution of instructions to be executed by processor 803. Computer system 800 further includes a read only memory (ROM) 804 or other static storage device coupled to bus 802 for storing static information and instructions for processor 803. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 803 and for controlling cursor movement on display 812. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 800 in response to processor 803 executing instructions programmed to perform the above-described acts and contained in main memory 806. Such instructions may be read into main memory 806 from another computer-readable medium, such as storage device 810. Execution of instructions contained in main memory 806 causes processor 803 to perform the process steps described herein. In alternative embodiments, hard-wired circuitry may be used in place of or in combination with software instructions to implement an embodiment of the type illustrated in any of FIGS. 1A-1C (described above). Thus, embodiments of the invention are not limited to any specific combination of hardware circuitry and software.

The term "computer-readable medium" as used herein refers to any non-transitory medium that participates in providing instructions to processor 803 for execution. Such a computer-readable medium may take many forms, including but not limited to, at least two kinds of non-transitory storage media (non-volatile storage media and volatile storage media). Non-volatile storage media includes, for example, optical or magnetic disks, such as storage device 810. Volatile media includes dynamic memory, such as main memory 806. Common forms of storage media include, for example, a flash memory, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory medium of storage from which a computer can read.

Various forms of non-transitory computer-readable media, such as a storage device 12 (FIGS. 1A-1C) may be involved in supplying the above-described instructions to processor 803 (FIG. 8) to implement an embodiment of the type illustrated in FIG. 2A. For example, such instructions may initially be stored on a magnetic disk of a remote computer. The remote computer can load such instructions into its dynamic memory and send the instructions over a telephone line using a modem. A modem that is local to computer system 800 can receive such instructions on the telephone line and use an infra-red transmitter to convert the received instructions to an infra-red signal. An infra-red detector can receive the instructions carried in the infra-red signal and appropriate circuitry can place the instructions on bus 802. Bus 802 carries the instructions to main memory 806, in which processor 803 executes the instructions contained therein. The instructions held in main memory 806 may optionally be stored on storage device 810 either before or after execution by processor 803.

Computer system 800 also includes a communication interface 815 coupled to bus 802. Communication interface 815 provides a two-way data communication coupling to a network link 820 that is connected to a local network 822. Local network 822 may interconnect multiple computers (as described above). For example, communication interface 815 may be an integrated services digital network (ISDN) card or a modem to provide a data communication connection to a corresponding type of telephone line. As another example, communication interface 815 may be a local area network (LAN) card to provide a data communication connection to a compatible LAN. Wireless links may also be implemented. In any such implementation, communication interface 815 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 828. ISP 828 in turn provides data communication services through the world wide packet data communication network 828 now commonly referred to as the "Internet". Local network 822 and network 828 both use electrical, electromagnetic or optical signals that carry digital data streams. The signals through the various networks and the signals on network link 820 and through communication interface 815, which carry the digital data to and from computer system 800, are exemplary forms of carrier waves transporting the information.

Computer system 800 can send messages and receive data, including program code, through the network(s), network link 820 and communication interface 815. In the Internet example, a server 830 might transmit a code bundle through Internet 828, ISP 828, local network 822 and communication interface 815. In accordance with the invention, one such downloaded set of instructions implements an embodiment of the type illustrated in FIGS. 1A-1C. The received set of instructions may be executed by processor 804 as received, and/or stored in storage device 810, or other non-volatile storage for later execution. In this manner, computer system 800 may obtain the instructions in the form of a carrier wave.

Numerous modifications and adaptations of the embodiments described herein will be apparent to the skilled artisan in view of the disclosure.

Referring to FIG. 2A, repositories 220, 230, 240, 260 and 293 may be located outside of database 291 in some embodiments, to ensure their availability even when a control file of database 291 becomes corrupted. Also one or more of repositories 220, 230, 240, 260 and 293 may be combined with one another and/or co-located, depending on the embodiment. For example, all repositories 230, 240, 260 and 293 may be located on a disk that is separate and distinct from the disk on which database 291 is located. As another example, all of repositories 230, 240, 260 and 293 may be located in a file that is separate and distinct from files of database 291, although all these files may be located on the same disk. In the just-described example, the underlying file system ensures that a corruption in a database file does not affect the file containing repositories 230, 240, 260 and 293. Also, each of repositories 230, 240, 260 and 293 may itself be located in a separate file, depending on the embodiment. Furthermore, repositories 230 and 240 that contain software code may be maintained in a different media relative to repositories 260 and 293 that contain data.

Accordingly numerous such modifications and adaptations are encompassed by the attached claims.

Following Subsections A-D are integral portions of the current patent application and are incorporated by reference herein in their entirety. Subsections A-D describe new commands that implement a data repair advisor of the type illustrated in FIGS. 4A-4D, within a recovery manager in one illustrative embodiment of a database management system in accordance with the invention. Note that the word "you" in the following attachments refers to a database administrator (DBA).

Subsection A (of Detailed Description)
Advise Failure
Purpose

Use the ADVISE FAILURE command to display repair options for the specified failures. This command prints a summary of the failures identified by the Data Recovery Advisor and implicitly closes all open failures that are already fixed.

The recommended workflow is to run the following commands in an RMAN session: LIST FAILURE to display failures, ADVISE FAILURE to display repair options, and REPAIR FAILURE to fix the failures.

Prerequisites

RMAN must be connected to a target database. See the CONNECT and RMAN commands to learn how to connect to a database as TARGET.

The target database instance must be started. The target database must be a single-instance database and must not be a physical standby database, although it can be a logical standby database.

In the current release, Data Recovery Advisor only supports single-instance databases. Oracle Real Application Clusters (Oracle RAC) databases are not supported.

Usage Notes

Data Recovery Advisor verifies repair feasibility before proposing a repair strategy. For example, Data Recovery Advisor checks that all backups and archived redo log files needed for media recovery are available. The ADVISE FAILURE output indicates the repair strategy that Data Recovery Advisor considers optimal for a given set of failures. The ADVISE FAILURE command can generate both manual and automated repair options.

Manual Repair Options

Manual repair options are either mandatory or repair optional. The repair optional actions may fix the failures more quickly or easily than automated repairs. In other cases, the only repair options are manual because automated repairs are not feasible. For example, I/O failures often cannot be repaired automatically. Also, it is sometimes impossible to diagnose a failure because insufficient data is returned by the operating system or the disk subsystem.

Automated Repair Options

Each automated repair option is either a single repair or a set of repair steps. When a repair option has a script that contains multiple repair steps, ADVISE FAILURE generates the script so that the repair steps are in the correct order. A single repair always fixes critical failures together. You must repair critical failures, but you can also repair noncritical failures at the same time. You can repair noncritical failures in a random order, one by one, or in groups.

Oracle RAC and Data Recovery Advisor

If a data failure brings down all instances of an Oracle RAC database, then you can mount the database in single-instance mode and use Data Recovery Advisor to detect and repair control file, SYSTEM datafile, and dictionary failures. You can also initiate health checks to test other database components for data failures. This approach will not detect data failures that are local to other cluster instances, for example, an inaccessible datafile.

Syntax

ADVISE FAILURE [{{ALL|CRITICAL|HIGH|LOW|failureNumber[, failureNumber]...}}...][EXCLUDE FAILURE failureNumber[, failureNumber]...]

Semantics

| Syntax Element | Description |
| --- | --- |
| ADVISE FAILURE | Displays information for all CRITICAL and HIGH priority failures recorded in the automatic diagnostic repository.<br>You can only use ADVISE FAILURE with no repair options when a LIST FAILURE command was previously executed in the current session.<br>Note: If a new failure has been recorded in then diagnostic repository since the last <u>LIST</u> FAILURE command in the current RMAN session, then RMAN issues a warning before advising on CRITICAL and HIGH failures. |
| ALL | Lists repair options that repair all open failures together. |
| CRITICAL | Lists repair options that repair only critical failures. |
| HIGH | Lists repair options that repair only failures with HIGH priority. |
| LOW | Lists repair options that repair only failures with LOW priority. |
| failureNumber | Lists repair options that repair only the specified failures. |
| EXCLUDE FAILURE failureNumber | Excludes the specified failures from the list. |

Advise Failure Command Output

The ADVISE FAILURE output includes the LIST FAILURE output, which is described in ATTACHMENT B below. RMAN presents mandatory and repair optional manual actions in an unordered list. If manual repair options exist, then they appear before automated repair options. Following table describes the output for automated repair options.

| Automated Repair options | |
| --- | --- |
| Column | Indicates |
| Repair option | The identifier for the automated repair option. |
| Strategy | A strategy to fix the failure with the REPAIR FAILURE command.<br>The Data Recovery Advisor always presents an automated repair option with no data loss when possible. Automated repair options fall into the following basic categories:<br>Repair with no data loss<br>Repair with data loss, for example, Flashback Database<br>Note: The ADVISE command maps a set of failures to a the set of repair steps that Data Recovery Advisor considers to be optimal. When possible, Data Recovery Advisor consolidates multiple repair steps into a single repair. For example, if the database has corrupted datafile, missing control file, and lost current redo log group, then Data Recovery Advisor would recommend a single, consolidated repair plan to restore the database and perform point-in-time recovery. |
| Repair Description | A description of the proposed repair. For example, the proposed repair could be to restore and recover datafile 17. |
| Repair Script | The location of an editable script with all repair actions and comments. If you do not choose an automated repair, then you can review this script and edit it for use in a manual recovery strategy. |

Examples
Example of Displaying Repair options for All Failures using Recovery Manager.

This example shows repair options for all failures known to the Recovery Data Advisor, based on use of the Recovery Manager, which provides the command prompt 'RMAN>'. The example indicates two failures: missing datafiles and a datafile with corrupt blocks.

```
RMAN> LIST FAILURE;
                   List of Database Failures
Failure ID   Priority   Status   Time Detected   Summary 142          HIGH       OPEN     23-APR-07       One or more
non-system datafiles are missing
101          HIGH       OPEN     23-APR-07       Datafile 1:
'/disk1/oradata/prod/system01.dbf'
                                                 contains
one or more corrupt blocks
RMAN> ADVISE FAILURE;
                   List of Database Failures
Failure ID   Priority   Status   Time Detected   Summary 142          HIGH       OPEN     23-APR-07       One or more
non-system datafiles are missing
101          HIGH       OPEN     23-APR-07       Datafile 1:
'/disk1/oradata/prod/system01.dbf' contains one or more
corrupt blocks analyzing automatic repair options; this
may take some time using channel ORA_DISK_1
analyzing automatic repair options complete
                   Mandatory Manual Actions no manual actions available
                   Repair optional Manual Actions 1. If file /disk1/oradata/prod/users01.dbf was
unintentionally renamed or moved, restore it
                   Automated Repair options
Repair       option Repair Description 1            Restore and recover datafile 28; Perform block
media recovery of
             block 56416 in file 1
   Strategy: The repair includes complete media recovery
with no data loss
   Repair script:
/disk1/oracle/log/diag/rdbms/prod/prod/hm/reco_66050018
4.hm
```

Subsection B (of Detailed Description)
List Failure
Purpose

Use the generic LIST command to display backups and information about other objects recorded in the Recovery Manager (RMAN) repository.

Prerequisites

Execute LIST only at the RMAN prompt. Either of the following two conditions must be met: (1) RMAN must be connected to a target database. If RMAN is not connected to a recovery catalog, and if you are not executing the LIST FAILURE command, then the target database must be mounted or open. If RMAN is connected to a recovery catalog, then the target database instance must be started. (2) RMAN must be connected to a recovery catalog and SET DBID must have been run.

Usage Notes

With the exception of the LIST FAILURE command, the generic LIST command displays the backups and copies against which you can run CROSSCHECK and DELETE commands.

The LIST FAILURE command displays failures against which you can run the ADVISE FAILURE and REPAIR FAILURE commands.

RMAN prints the LIST command's output to either standard output or the message log, but not to both at the same time.

Syntax

LIST {DB_UNIQUE_NAME {ALL|OF DATABASE [[']database_name [']]}|EXPIRED {listObjectSpec [{{maintQualifier|recoverableClause}}. . . ]|recordSpec} [forDbUniqueNameRepair option]|FAILURE [{{{ALL|CRITICAL|HIGH|LOW|failureNumber [, failureNumber]. . . }|CLOSED}}. . . ][EXCLUDE FAILURE failureNumber [, failureNumber]. . . ][DETAIL]|INCARNATION [OF DATABASE [[']database_name [']]]|{{listObjectSpec [{{maintQualifier|recoverable Clause}}. . . ]|recordSpec}|RESTORE POINT restore_point_name|RESTORE POINT ALL}[forDbUniqueNameRepair option]|[{ALL|GLOBAL}]SCRIPT NAMES}

Semantics

| Syntax Element | Description |
| --- | --- |
| FAILURE | Lists failures recorded by the Data Recovery Advisor. The database to which RMAN is connected must be a single-instance database and must not be a physical standby database. |
| | The Data Recovery Advisor can detect and repair a wide variety of physical problems that cause data loss and corruption. Physical corruptions are typically caused by faulty I/O subsystems or human error. The Data Recovery Advisor may not detect or handle some types of logical corruptions. Corruptions of this type require help from Oracle Support Services. |
| | In the context of Data Recovery Advisor, a failure is a persistent data corruption that is mapped to a set of repair actions. Data failures are detected by checks, which are diagnostic procedures that asses the health of the database or its components. Each check can diagnose one or more failures, which are mapped to a set of repairs. |
| | The typical use case is to run LIST FAILURE to list any failures, then use ADVISE FAILURE to display repair options, and REPAIR FAILURE to fix the failures. Run these commands in the same RMAN session. |
| | If no repair options are specified on LIST FAILURE, then the comman lists only the highest priority failures that have status OPEN. Therefore, CRITICAL and HIGH failures are always listed in the command output if they exist. Failures with LOW priority are listed only if no CRITICAL or HIGH priority failures exist. Failures are sorted in reverse order of occurrence, with the most recent failure listed first. |
| | The LIST FAILURE command does not initiate checks to diagnose new failures; rather, it lists the results of previously executed assessments. Thus, repeatedly executing LIST FAILURE will reveal new failures only if the database automatically diagnosed them in response to errors that occurred in between command executions. However, LIST FAILURE revalidates all exisiting failures when the command is issued. If a user fixed failures manually, or if the failures were transient problems that disappeared, then Data Recovery Advisor removes these failures from the LIST FAILURE output. |
| ALL | Lists failures with all priorities and status OPEN. |
| CRITICAL | Lists only critical failures with status OPEN. |
| HIGH | Lists only failures with HIGH priority and status OPEN. |
| LOW | Lists only failures with LOW priority with status OPEN. |
| failureNumber | Specifies the failures by failure number. |
| CLOSED | Lists only closed failures. |
| EXCLUDE FAILURE failureNumber | Excludes the specified failures from the list. |

-continued

| Syntax Element | Description |
| --- | --- |
| DETAIL | Lists failure by expanding the consolidated failure. For example, if multiple block corruptions existed in a file, then specifying the DETAIL repair option would list each of the block corruptions. |

Display of List of Failures

| Column | Indicates |
| --- | --- |
| Failure ID | The unique identifier for a failure. |
| Priority | The priority of the failure: CRITICAL, HIGH, or LOW. Failures with critical priority require immediate attention because they make the whole database unavailable. Typically, critical failures bring down the instance and are diagnosed during the subsequent startup. The database is not available until all critical failures are fixed (see ADVISE FAILURE). Failures with HIGH priority make a database partially unavailable or unrecoverable, and usually have to be repaired in a reasonably short time. Examples of such failures include physical data block corruptions, nonfatal I/O errors, missing archived redo log files or backup files, and so on. Failures with LOW priority can be ignored until more important failures are fixed. For example, a block corruption will be initially assigned a high priority, but if this block is not important for the database availability, you can use CHANGE FAILURE to change the priority to LOW. |
| STATUS | The repair status of the failure. The status of a failure is OPEN (not repaired) until the appropriate repair action is invoked. The failure status changes to CLOSED when the repair is completed. |
| Time Detected | The date when the failure was diagnosed. |
| Summary | Summary of the failure. |

Example of Listing Failures

This example lists all failures regardless of their priority. If you do not specify ALL, then LIST FAILURE output does not include failures with LOW priority. RMAN>LIST FAILURE ALL;

```
RMAN> LIST FAILURE ALL;
List of Database Failures
=========================
FailureID   Priority   Status   Time         Summary
---------   --------   ------   ----         -------
142         HIGH       OPEN     23-APR-07    One or more
non-system datafiles are missing
101         HIGH       OPEN     23-APR-07    Datafile 1:
'/disk1/oradata/prod /system01.dbf' contains one or
more corrupt blocks
```

Subsection C (of Detailed Description)
Change
Purpose
Use the CHANGE command to perform the following tasks:
  Update the availability status of backups and copies recorded in the Recovery Manager (RMAN) repository
  Change the priority of or close failures recorded in the automatic diagnostic repository
  Update the DB_UNIQUE_NAME recorded in the recovery catalog for the target database
  Associate the backup of a database in a Data Guard environment with a different database in the environment Prerequisites
  RMAN must be connected as TARGET to a database instance, which must be started.
Semantics
  This command enables you to change the status of failures. Use the LIST FAILURE command to show the list of failures.

| Syntax Element | Description |
| --- | --- |
| FAILURE | Enables you to change priority or close failures recorded in the Automatic Diagnostic Repository. By default RMAN prompts for confirmation before performing the requested change. The target database to which RMAN is connected must be a single-instance database and must not be a physical standby database. |
| ALL | Changes only open failures. |
| CRITICAL | Changes only critical failures. |
| HIGH | Changes only failures with HIGH priority. |
| LOW | Changes only failures with LOW priority. |
| failnum | Changes only the specified failure. |
| EXCLUDE FAILURE failnum | Excludes the specified failures from the change. |

Example of Changing the Status of a Failure
  In the following example, the LIST FAILURE command shows that a datafile has corrupt blocks. The failure number is 5 and has a priority of HIGH. You decide to change the priority of this failure to low.

```
RMAN> LIST FAILURE;
List of Database Failures
Failure ID    Priority    Status    Time Detected    Summary 5             HIGH        OPEN      11-DEC-06        datafile 8
contains corrupt blocks
RMAN> CHANGE FAILURE 5 PRIORITY LOW;
List of Database Failures
Failure ID    Priority    Status    Time Detected    Summary 5             HIGH        OPEN      11-DEC-06        datafile 8
contains corrupt blocks
Do you really want to change the above failures (enter
YES or NO)? YES
changed 1 failures to LOW priority
```

Subsection D(of Detailed Description)
Repair Failure
Purpose
  Use the REPAIR FAILURE command to repair database failures identified by the Data Recovery Advisor.
  The recommended workflow is to run LIST FAILURE to display failures, ADVISE FAILURE to display repair options, and REPAIR FAILURE to fix the failures.
Prerequisites
  The target database instance must be started. The database must be a single-instance database and must not be a physical standby database.
  Make sure that at most one RMAN session is running the REPAIR FAILURE command. The only exception is REPAIR FAILURE . . . PREVIEW, which is permitted in concurrent RMAN sessions.
  To perform an automated repair, the Data Recovery Advisor may require specific backups and archived redo logs. If the files needed for recovery are not available, then the recovery will not be possible.

Usage Notes

Repairs are consolidated when possible so that a single repair can fix multiple failures. The command performs an implicit ADVISE FAILURE if this command has not yet been executed in the current session.

RMAN always verifies that failures are still relevant and automatically closes fixed failures. RMAN does not attempt to repair a failure that has already been fixed, nor does it repair a failure that is obsolete because new failures have been introduced since ADVISE FAILURE was run.

By default, REPAIR FAILURE prompts for confirmation before it begins executing. After executing a repair, RMAN reevaluates all existing failures on the chance that they may also have been fixed.

Oracle RAC and Data Recovery Advisor

If a data failure brings down all instances of an Oracle RAC database, then you can mount the database in single-instance mode and use Data Recovery Advisor to detect and repair control file, SYSTEM datafile, and dictionary failures. You can also initiate health checks to test other database components for data failures. This approach will not detect data failures that are local to other cluster instances, for example, an inaccessible datafile.

Syntax

REPAIR FAILURE [USING ADVISE REPAIR OPTION integer][{{NOPROMPT|PREVIEW}}...]

Semantics

| Syntax Element | Description |
| --- | --- |
| REPAIR FAILURE | Repairs failures recorded in the Automated Diagnostic Repository. If you execute REPAIR FAILURE with no other command repair options, then RMAN uses the first repair option of the most recent ADVISE FAILURE command in the current session. The command performs an implicit ADVISE FAILURE if this command has not yet been executed in the current session. |
| USING ADVISE REPAIR OPTION integer | Specifies a repair option by its repair option number (not its failure number). You can obtain repair option numbers from the ADVISE FAILURE command. |
| NOPROMPT | Suppresses the confirmation prompt. This is the default repair option if you run REPAIR FAILURE in a command file. |
| PREVIEW | Does not make any repairs and generates a script with all repair actions and comments. By default the script is displayed to standard output. You can use the SPOOL command to write the script to an editable file (see example of previewing repair below) |

Example of Repairing Failures

This example repairs all failures known to the Recovery Data Advisor. The example repairs two failures: missing datafiles and a datafile with corrupt blocks. After the recovery, RMAN asks whether it should open the database.

RMAN> LIST FAILURE;
List of Database Failures

| Failure ID | Priority | Status | Time Detected | Summary |
| --- | --- | --- | --- | --- |
| 142 | HIGH | OPEN | 23-APR-07 | One or more non-system datafiles are missing |
| 101 | HIGH | OPEN | 23-APR-07 | Datafile 1: '/disk1/oradata/prod/system01.dbf' contains one or more corrupt blocks |

RMAN> ADVISE FAILURE;
List of Database Failures

| Failure ID | Priority | Status | Time Detected | Summary |
| --- | --- | --- | --- | --- |
| 142 | HIGH | OPEN | 23-APR-07 | One or more non-system datafiles are missing |
| 101 | HIGH | OPEN | 23-APR-07 | Datafile 1: '/disk1/oradata/prod/system01.dbf' contains one or more corrupt blocks | analyzing automatic repair options; this may take some time using channel ORA_DISK_1
analyzing automatic repair options complete
Mandatory Manual Actions no manual actions available
Repair optional Manual Actions 1. If file /disk1/oradata/prod/users01.dbf was unintentionally renamed or moved, restore it
Automated Repair options

| Repair | option Repair Description |
| --- | --- |
| 1 | Restore and recover datafile 28; Perform block media recovery of block 56416 in file 1 |

Strategy: The repair includes complete media recovery with no data loss
Repair script:
/disk1/oracle/log/diag/rdbms/prod/prod/hm/reco_66050018 4.hm
RMAN> REPAIR FAILURE;
Strategy: The repair includes complete media recovery with no data loss
Repair script:
/disk1/oracle/log/diag/rdbms/prod/prod/hm/reco_47554992 2.hm
contents of repair script:
 # restore and recover datafile
 sql 'alter database datafile 28 offline';
 restore datafile 28;
 recover datafile 28;
 sql 'alter database datafile 28 online';
 # block media recovery
 recover datafile 1 block 56416;
Do you really want to execute the above repair (enter YES or NO)? YES
executing repair script
sql statement: alter database datafile 28 offline
Starting restore at 23-APR-07 using channel ORA_DISK_1
channel ORA_DISK_1: starting datafile backup set restore
channel ORA_DISK_1: specifying datafile(s) to restore from backup set
channel ORA_DISK_1: restoring datafile 00028 to /disk1/oradata/prod/users01.dbf
channel ORA_DISK_1: reading from backup piece /disk2/PROD/backupset/2007_04_18/o1_mf_nnndf_TAG2007041 8T182042_32fjzd3z_.bkp
channel ORA_DISK_1: piece handle=/disk2/PROD/backupset/2007_04_18/o1_mf_nnndf_TAG 20070418T182042_32fjzd3z_.bkp tag=TAG20070418T182042
channel ORA_DISK_1: restored backup piece 1
channel ORA_DISK_1: restore complete, elapsed time: 00:00:03
Finished restore at 23-APR-07

-continued

```
Starting recover at 23-APR-07
using channel ORA_DISK_1
starting media recovery
media recovery complete, elapsed time: 00:00:01
Finished recover at 23-APR-07
sql statement: alter database datafile 28 online
Starting recover at 23-APR-07
using channel ORA_DISK_1
searching flashback logs for block images until SCN
429690
finished flashback log search, restored 1 blocks
starting media recovery
media recovery complete, elapsed time: 00:00:03
Finished recover at 23-APR-07
repair failure complete
```

Example of Previewing a Repair

The following example previews a repair of the first repair option of the most recent ADVISE FAILURE command in the current session. Note that the sample output for the LIST FAILURE and ADVISE FAILURE commands is not shown in the example.

RMAN>LIST FAILURE;

.

.

.

RMAN>ADVISE FAILURE;

.

.

.

RMAN>REPAIR FAILURE PREVIEW;
Strategy: The repair includes complete media recovery with no data loss
Repair script: /disk1/oracle/log/diag/rdbms/prod/prod/hm/reco_32009870 03.hm
contents of repair script:
  # block media recovery
  recover datafile 1 block 56416;

You can use SPOOL in conjunction with REPAIR FAILURE . . . PREVIEW to write a repair script to a file. You can then edit this script and execute it manually. The following example spools a log a repair preview to /tmp/repaircmd.dat.
RMAN>SPOOL LOG TO '/tmp/repaircmd.dat';
RMAN>REPAIR FAILURE PREVIEW;
RMAN>SPOOL LOG OFF;

What is claimed is:

1. A computer-implemented method to process errors related to a data storage system, the method comprising:
  one or more processors responding to occurrence of an error, during access of data in the data storage system, by automatically using the error with at least a map to identify from among a plurality of predetermined diagnostic procedures, a specific diagnostic procedure to check the data storage system;
  wherein each error in a plurality of errors is associated by at least the map with at least one diagnostic procedure among the plurality of predetermined diagnostic procedures;
  checking the data storage system by execution of at least the specific diagnostic procedure; and
  storing in a memory of a computer, a failure identified by the checking.

2. The method of claim 1 wherein the failure is hereinafter "first failure", the method further comprising:
  identifying a second failure; and
  automatically creating a third failure based at least partially on information related to each of the first failure and the second failure;
  wherein the third failure is identified in the memory as a parent of the first failure and the second failure.

3. The method of claim 2 wherein each failure has a type and each failure has at least one parameter and the method further comprises:
  checking whether the second failure is of same type as the first failure;
  wherein the third failure is created with a third value for said parameter based on a first value of the first failure and a second value of the second failure.

4. The method of claim 1 wherein:
  the storing of the failure comprises marking the failure as open and storing an identifier of revalidation software;
  the revalidation software comprises a portion of the first diagnostic procedure;
  the method further comprising executing the revalidation software to revalidate the failure and marking the failure as closed when execution of the revalidation software finds the failure no longer exists.

5. The method of claim 1 wherein:
  the checking checks relationships between blocks;
  the relationships comprise references, pointers or offsets from one block to another, existing in an index of a database; and
  the database is accessible through a relational database management system, via queries expressed in a structured query language.

6. The method of claim 1 wherein:
  the failure identified by the checking is pre-selected to be of a type that has known repairs.

7. The method of claim 1 further comprising:
  using a first type of the failure to identify a second type of a repair;
  wherein a plurality of failures including the failure are of the first type; and
  wherein a plurality of repairs including the repair are of the second type.

8. The method of claim 1 wherein:
  the checking checks integrity of data in the data storage system.

9. The method of claim 1 wherein said map is hereinafter a first map, the method further comprising:
  using the failure with at least a second map to determine a repair.

10. A computer-implemented method to process errors related to a data storage system, the method comprising:
  one or more processors responding to occurrence of a first error, during access of data in the data storage system, by checking the data storage system by execution of at least a specific diagnostic procedure;
  prior to the checking, determining whether a second error identical to the first error had occurred within a predetermined duration prior to the first error; and
  performing the checking only if a result of the determining is false;
  wherein the specific diagnostic procedure is identified from among a plurality of predetermined diagnostic procedures, based on the first error.

11. One or more non-transitory computer-readable storage media comprising instructions to be executed by one or more processors to process errors related to a data storage system, the one or more non-transitory computer-readable storage media comprising:

instructions responsive at least partially to occurrence of an error, during access of data in the data storage system, to automatically use the error with at least a map to identify from among a plurality of predetermined diagnostic procedures, a specific diagnostic procedure to check the data storage system;

wherein each error in a plurality of errors is associated by at least the map with at least one diagnostic procedure among the plurality of predetermined diagnostic procedures;

instructions to check the data storage system by execution of at least the first specific diagnostic procedure; and instructions to store in a memory of a computer, a failure identified by execution of the instructions to check.

12. The one or more non-transitory computer-readable storage media of claim 11 wherein the failure is hereinafter "first failure", the one or more non-transitory computer-readable storage media further comprising:

instructions to identify a second failure; and instructions to automatically create a third failure based at least partially on information related to each of the first failure and the second failure;

wherein the third failure is identified in the memory as a parent of the first failure and the second failure.

13. The one or more non-transitory computer-readable storage media of claim 12 wherein each failure has a type and each failure has at least one parameter and the non-transitory computer-readable storage medium further comprising:

instructions to check whether the second failure is of same type as the first failure;

wherein the third failure is created with a third value for the parameter based on a first value of the first failure and a second value of the second failure.

14. The one or more non-transitory computer-readable storage media of claim 11 further comprising:

instructions to determine an attribute that is indicative of impact of the failure; and instructions to store in the memory, the attribute for the failure.

15. The one or more non-transitory computer-readable storage media of claim 11 wherein:

the instructions to store the failure comprise instructions to mark the failure as open and store an identifier of revalidation software, the revalidation software comprising a portion of the first diagnostic procedure;

the one or more non-transitory computer-readable storage media further comprising instructions to execute the revalidation software to revalidate the failure and mark the failure as closed when execution of the revalidation software finds the failure no longer exists.

16. The non-transitory computer-readable storage medium of claim 11 wherein:

the instructions to check, when executed, check integrity of data in the data storage system.

17. The one or more non-transitory computer-readable storage media of claim 11 wherein said map is hereinafter a first map, the one or more non-transitory computer-readable storage media further comprising:

instructions to use the failure with at least a second map to determine a repair.

18. One or more non-transitory computer-readable storage media comprising instructions to be executed by one or more processors to process errors related to a data storage system, the instructions comprising:

instructions to respond to occurrence of a first error, during access of data in the data storage system, by executing instructions to check the data storage system by performing at least a specific diagnostic procedure;

instructions, to be executed prior to the instructions to check, to determine whether a second error identical to the first error had occurred within a predetermined duration prior to the first error; and instructions to invoke execution of the instructions to check only if a result of execution of the instructions to determine is false;

wherein the specific diagnostic procedure is identified from among a plurality of predetermined diagnostic procedures, based on the first error.

19. A system, implemented at least partially by a computer responsive to errors related to data storage in the computer, the system comprising:

means responsive at least partially to occurrence of an error, during access of data, by using the error with at least a map to identify from among a plurality of predetermined diagnostic procedures, a specific diagnostic procedure to check the data;

wherein each error in a plurality of errors is associated by at least the map with at least one diagnostic procedure among the plurality of predetermined diagnostic procedures;

means for checking the data by execution of at least the specific diagnostic procedure; and means for storing in a memory of the computer, a failure identified by said means for checking.

20. The database management system of claim 19 wherein said failure is hereinafter "first failure", the database management system further comprising:

means for identifying a second failure; and means for creating a third failure based at least partially on information related to each of said first failure and said second failure;

wherein said third failure is identified in said memory as a parent of the first failure and the second failure.

21. The system of claim 19 wherein:

the means for checking checks integrity of data.

22. The system of claim 19 further comprising:

means for using the failure with at least a second map to determine a repair.

23. A database management system, implemented at least partially by a computer responsive to a plurality of predetermined errors related to a data storage system in the computer, the database management system comprising:

means, responsive to occurrence of a first error, during access of data in the data storage system, for checking the data storage system by performing at least a specific diagnostic procedure;

means for determining whether a second error identical to said first error had occurred within a predetermined duration prior to said first error; and means for performing said checking only if a result from said means for determining is false;

wherein the specific diagnostic procedure is identified from among a plurality of predetermined diagnostic procedures, based on the first error.

* * * * *

UNITED STATES PATENT AND TRADEMARK OFFICE
CERTIFICATE OF CORRECTION

PATENT NO.         : 8,543,862 B2
APPLICATION NO.    : 13/304563
DATED              : September 24, 2013
INVENTOR(S)        : Dilman et al.

It is certified that error appears in the above-identified patent and that said Letters Patent is hereby corrected as shown below:

On the Title Page, item (56)

On page 2, column 2, under other publications, line 2, before "11 pages." insert -- (US Pub 2009-0106578 A1), --.

On page 2, column 2, under other publications, line 44, after "A1)" insert -- , pp. 32 --.

On page 2, column 2, under other publications, line 46, after "A1)" insert -- , pp. 13 --.

On page 2, column 2, under other publications, line 47, after "al." insert -- , pp. 121. --.

On page 2, column 2, under other publications, line 48, after "al." insert -- , pp. 121. --.

On page 2, column 2, under other publications, line 49, after "al." insert -- , pp. 122. --.

In the Drawings

On Sheet 8 of 37, in figure 3D, under reference numeral 357, line 2, delete "MULITPLE" and insert -- MULTIPLE --, therefor.

On Sheet 24 of 37, in figure 50, line 10, delete "reserverd." and insert -- reserved. --, therefor.

In the Specification

In column 6, line 53, delete "1941" and insert -- 194I --, therefor.

In column 6, line 57, delete "1941" and insert -- 194I --, therefor.

Signed and Sealed this
Eighth Day of September, 2015

Michelle K. Lee
*Director of the United States Patent and Trademark Office*

In column 6, line 58, delete "1941" and insert -- 194I --, therefor.

In column 6, line 63, delete "1941" and insert -- 194I --, therefor.

In column 6, line 65, delete "1941" and insert -- 194I --, therefor.

In column 8, line 12, delete "1941" and insert -- 194I --, therefor.

In column 8, line 14, delete "1941" and insert -- 194I --, therefor.

In column 17, line 36, delete "time" and insert -- time. --, therefor.

In column 17, line 38, delete "repaired" and insert -- repaired. --, therefor.

In column 17, line 41, delete "loss)" and insert -- loss). --, therefor.

In column 17, line 50, delete "systems" and insert -- systems. --, therefor.

In column 23, line 44, delete "11 g" and insert -- 11g --, therefor.

In column 24, line 15, delete "11 gR1)" and insert -- 11gR1) --, therefor.

In column 24, line 17, delete "11 gR1)" and insert -- 11gR1) --, therefor.

In column 24, line 46, delete "11 gR1," and insert -- 11gR1, --, therefor.

In column 25, line 4, delete "11 gR1." and insert -- 11gR1. --, therefor.

In column 27, line 26, delete "ORACLE))." and insert -- ORACLE®). --, therefor.

In column 32, line 3, delete "one" and insert -- once --, therefor.

In column 36, line 55, delete "a the" and insert -- a --, therefor.

In column 38, line 44, delete "comman" and insert -- command --, therefor.

In column 38, line 55, delete "exisiting" and insert -- existing --, therefor.

In column 39, line 4, delete "failure" and insert -- failures --, therefor.

In the Claims

In column 45, line 16, in Claim 11, before "specific" delete "first".

In column 45, line 55, in Claim 16, after "The" insert -- one or more --.

In column 46, line 44, in Claim 21, after "data" insert -- in the data storage system --.